United States Patent
Doujou et al.

(10) Patent No.: US 12,326,615 B2
(45) Date of Patent: Jun. 10, 2025

(54) OPTICAL SYSTEM INCLUDING NEGATIVE LENS AND POSITIVE LENS, IMAGING APPARATUS INCLUDING THE SAME, IN-VEHICLE SYSTEM INCLUDING THE SAME, AND MOVING APPARATUS INCLUDING THE SAME

(71) Applicant: CANON KABUSHIKI KAISHA, Tokyo (JP)

(72) Inventors: Naoto Doujou, Tochigi (JP); Kazuhiko Kajiyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 18/182,853

(22) Filed: Mar. 13, 2023

(65) Prior Publication Data

US 2023/0296862 A1    Sep. 21, 2023

(30) Foreign Application Priority Data

Mar. 17, 2022 (JP) .................... 2022-042501
Jan. 12, 2023 (JP) .................... 2023-003119

(51) Int. Cl.

| | | |
|---|---|---|
| G02B 9/64 | (2006.01) | |
| B60Q 9/00 | (2006.01) | |
| B60T 7/22 | (2006.01) | |
| B60T 8/171 | (2006.01) | |
| B60T 8/172 | (2006.01) | |
| G08G 1/16 | (2006.01) | |

(52) U.S. Cl.
CPC .............. *G02B 9/64* (2013.01); *B60Q 9/008* (2013.01); *B60T 7/22* (2013.01); *B60T 8/171* (2013.01); *B60T 8/172* (2013.01); *G08G 1/16* (2013.01); *B60T 2201/022* (2013.01)

(58) Field of Classification Search
CPC .... G02B 9/64; G02B 13/0045; G02B 13/006; B60Q 9/008; B60T 7/22; B60T 8/171; B60T 8/172; B60T 2201/022; B02B 7/028; G08G 1/16
USPC ..................................................... 701/70, 76
See application file for complete search history.

(56) References Cited

U.S. PATENT DOCUMENTS

2018/0252846 A1    9/2018   Yin

FOREIGN PATENT DOCUMENTS

| CN | 108437958 | * | 1/2019 | ............. G02B 13/00 |
|---|---|---|---|---|
| CN | 111 175 936 A | | 5/2020 | |
| CN | 111 929 861 A | | 11/2020 | |
| CN | 112 505 881 A | | 3/2021 | |
| JP | 2013033242 A | | 2/2013 | |
| JP | 2020052386 A | | 4/2020 | |
| JP | 2021071502 A | | 5/2021 | |
| JP | 2022011185 A | | 1/2022 | |

(Continued)

*Primary Examiner* — Hai H Huynh
(74) *Attorney, Agent, or Firm* — Canon U.S.A., Inc. IP Division

(57) ABSTRACT

An optical system includes a negative lens and a positive lens adjacent to each other, wherein the following inequalities are satisfied: 0.00≤DAB≤1.00, and 0.80≤RA/RB≤1.20, where DAB[mm] denotes a distance on an optical axis between the negative lens and the positive lens, and RA and RB denote curvature radii of facing lens surfaces of the negative lens and the positive lens, respectively, and wherein specific inequalities are satisfied.

20 Claims, 26 Drawing Sheets

(56) References Cited

FOREIGN PATENT DOCUMENTS

| TW | M368071 | * | 11/2009 | ............. | G02B 13/00 |
| TW | I345070 | * | 7/2011 | ............. | G02B 13/06 |

* cited by examiner

OPTICAL SYSTEM INCLUDING NEGATIVE LENS AND POSITIVE LENS, IMAGING APPARATUS INCLUDING THE SAME, IN-VEHICLE SYSTEM INCLUDING THE SAME, AND MOVING APPARATUS INCLUDING THE SAME

BACKGROUND OF THE INVENTION

Field of the Invention

The present invention relates to an optical system, and is suitable for an imaging apparatus, such as a digital still camera, a digital video camera, an in-vehicle camera, a mobile phone camera, a monitoring camera, a wearable camera, and a medical camera.

Description of the Related Art

An optical system of high optical performance irrespective of environmental temperature is demanded as an optical system used in an imaging apparatus. Japanese Patent Application Laid-Open No. 2021-71502 discusses an optical system that can control variation in focal position that is attributed to a change in environmental temperature, using a pair of a positive lens and a negative lens having large differences in refractive index and Abbe number.

Nevertheless, in the optical system discussed in Japanese Patent Application Laid-Open No. 2021-71502, it is necessary to employ a pair of a positive lens and a negative lens having large differences in refractive index and Abbe number, so that a degree of freedom in selection of the material of each lens is not high. Thus, it might be difficult to achieve both of the control of variation in focal position that is attributed to a change in environmental temperature and the correction of various aberrations, depending on the specification of an optical system.

SUMMARY OF THE INVENTION

According to an aspect of the present invention, an optical system includes a negative lens and a positive lens adjacent to each other, wherein the following inequalities are satisfied:

$$0.00 \leq DAB \leq 1.00, \text{ and}$$

$$0.80 \leq RA/RB \leq 1.20,$$

where DAB[mm] denotes a distance on an optical axis between the negative lens and the positive lens, and RA and RB denote curvature radii of facing lens surfaces of the negative lens and the positive lens, respectively, and wherein the following inequalities are satisfied:

$$0.00 \leq |NA-NB| \leq 0.20,$$

$$0.00 \leq |vA-vB| \leq 20.00, \text{ and}$$

$$4.2 \leq |dnA/dt - dnB/dt|,$$

where NA and NB denote refractive indices of the negative lens and the positive lens, respectively, with respect to a d-line, vA and vB denote Abbe numbers of the negative lens and the positive lens, respectively, with respect to the d-line, and $dnA/dt$ [10−6/° C.] and $dnB/dt$ [10−6/° C.] denote temperature coefficients of refractive indices of the negative lens and the positive lens, respectively, with respect to the d-line at 20° C. to 40° C., and either $dnA/dt$ or $dnB/dt$ has a negative sign.

Further features of the present invention will become apparent from the following description of exemplary embodiments with reference to the attached drawings.

DESCRIPTION OF THE EMBODIMENTS

Figure 1:
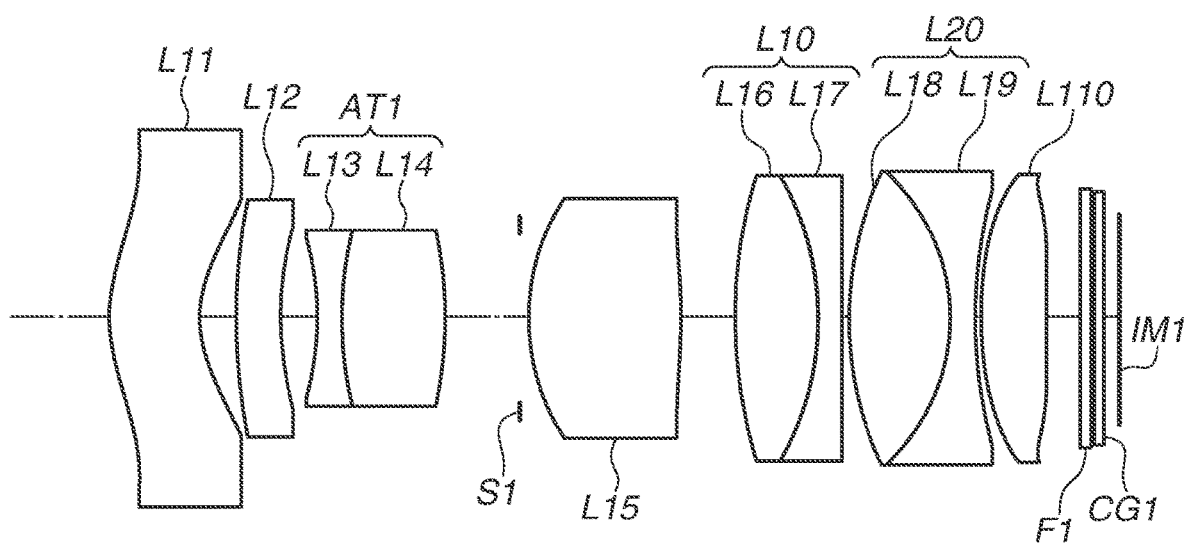
FIG. 1 is a main portion schematic diagram of an optical system according to Example 1.

Hereinafter, an exemplary embodiment of the present invention will be described with reference to the drawings. For the sake of convenience, the drawings are sometimes drawn in scale sizes different from actual scale sizes. In the drawings, a similar component is assigned the same reference numeral, and the redundant description will be omitted.

An optical system according to the present exemplary embodiment includes a negative lens and a positive lens adjacent to each other, an interval on an optical axis between the negative lens and the positive lens satisfies the following inequality (1), and curvature radii of facing lens surfaces of the negative lens and the positive lens satisfy the following inequality (2). Furthermore, the negative lens and the positive lens are made of material satisfying the following inequalities (3) to (5). Employment of such a configuration enables realization of an optical system that can control variation in focal position that is attributed to a change in environmental temperature.

The optical system according to the present exemplary embodiment produces an advantageous effect of the present invention as long as at least the above-described configurations are satisfied. The optical system may have a configuration including a plurality of positive lenses, or a configuration including a plurality of negative lenses, for example. The order of the negative lens and the positive lens that satisfies the inequalities is appropriately selectable depending on the specification of an optical system. An optical element such as an optical filter or a cover glass that does not contribute to the image formation of an optical system may be arranged at a position closer to an image plane than a lens (final lens) arranged closest to the image plane among lenses consisting of the optical system.

Hereinafter, examples of an optical system according to the present exemplary embodiment will be described in detail.

Example 1

Example 1 of the present invention will be described below. FIG. 1 is a main portion schematic diagram in a section including an optical axis of an optical system according to Example 1 of the present invention. In FIG. 1, the left side corresponds to an object side (front side) and the right side corresponds to an image side (rear side). The optical system according to this example is an image forming optical system that forms an image of an object on an image plane IM1 by condensing light from an object (subject) (not illustrated). In other words, the optical system according to this example has positive refractive power in the entire system. In a case where the optical system according to this example is applied to an imaging apparatus, an imaging plane (light receiving surface) of an image sensor (light receiving element) is arranged at the position of the image plane IM1.

The optical system according to this example is an optical system having a focal length of 11.10 mm and a half field angle of 60°. The optical system according to this example includes a negative lens L11, negative lens L12, a first cemented lens AT1, an aperture stop S1, a positive lens L15, a cemented lens L10, a cemented lens L20, and a positive lens L110 that are arranged in order from the object side to the image side. The first cemented lens AT1 consists of a negative lens L13 and a positive lens L14 which are arranged in order from the object side to the image side, and the cemented lens L10 consists of a positive lens L16 and a negative lens L17 which are arranged in order from the object side to the image side. The cemented lens L20 consists of a positive lens L18 and a negative lens L19 which are arranged in order from the object side to the image side. A positive lens and a negative lens in each cemented lens are cemented to each other by a cementing member, such as an adhesive. An infrared (IR) cut filter F1 serving as an optical filter and a cover glass CG1 are arranged on the image side of the positive lens L110 which is a final lens.

As described above, an optical system to be used in an imaging apparatus is to be capable of controlling variation in focal position that is attributed to a change in environmental temperature. It is known that the following equality (A) is satisfied:

$$\Delta f = \beta \times \Delta T \times f \qquad (A),$$

where $\Delta f$ denotes a variation amount of a focal length with a change in an environmental temperature, $\beta$ denotes a coefficient, $\Delta T$ denotes a change amount of an environmental temperature, and f denotes a focal length set before an environmental temperature changes, for one lens (single lens) in the optical system.

The coefficient $\beta$ in Equality (A) is represented by the following equality (B):

$$\beta = \alpha - dndt/(N-1) \qquad (B),$$

where N denotes a refractive index for a d-line (wavelength of 587.56 nm), $\alpha$ denotes a linear expansion coefficient, and dndt denotes a temperature coefficient of a refractive index, for a single lens.

According to Equality (A), in a case where an environmental temperature rises, if the coefficient $\beta$ has a positive value, a focal length of the positive lens positively varies, and a focal length of the negative lens negatively varies. In the optical system discussed in Japanese Patent Application Laid-Open No. 2021-71502 described above, a pair of a negative lens and a positive lens of which the respective coefficients $\beta$ have positive values is employed, so that a variation in focal position that is attributed to a change in environmental temperature is controlled.

Nevertheless, materials of which coefficients $\beta$ have positive values are limited to materials of which the temperature coefficient dndt of a refractive index has a negative value, and materials of which the linear expansion coefficient $\alpha$ has a very large value. Thus, compared with materials of which coefficients $\beta$ have negative values, materials of which coefficients $\beta$ have positive values are few in number. It is known that many of materials of which coefficients $\beta$ have positive values have an anomalous dispersion property and a low refractive index. For this reason, in a case where a pair of a negative lens and a positive lens of which coefficients $\beta$ have positive values are used to control variation in focal position that is attributed to a change in environmental temperature, it might be difficult to correct various aberrations depending on the material of each lens. That is to say, it might be difficult to achieve both of the control (temperature compensation) of variation in focal position that is attributed to a change in environmental temperature, and the correction of various aberrations.

In view of the foregoing, in this example, the relative positions and the shapes of a negative lens and a positive lens adjacent to each other, and the condition of material are appropriately set. This enables the control of variation in focal position that is attributed to a change in environmental temperature, irrespective of the sign of a value of the coefficient $\beta$ of each lens. It is therefore possible to enhance a degree of freedom in selection of the material for each lens. This facilitates achievement of both of temperature compensation and the correction of various aberrations in the optical system. Hereinafter, features of the optical system according to this example will be described in detail.

Initially, the optical system according to this example includes the negative lens L13 and the positive lens L14 as a pair of a negative lens and a positive lens for performing temperature compensation. The optical system according to this example satisfies the following inequalities (1) and (2):

$$0.00 \leq DAB \leq 1.00 \quad (1), \text{ and}$$

$$0.80 \leq RA/RB \leq 1.20 \quad (2),$$

where DAB [mm] denotes a distance on an optical axis between the negative lens L13 and the positive lens L14, and RA and RB respectively denote curvature radii of facing lens surfaces of the negative lens L13 and the positive lens L14, respectively. Each value in these inequalities is assumed to be a value at room temperature (25° C.).

By Inequality (1) being satisfied, it is possible to arrange the negative lens L13 and the positive lens L14 closely to each other, thus facilitating achievement of both of temperature compensation and the correction of various aberrations. In a case where Inequality (1) is not satisfied, an interval between the negative lens L13 and the positive lens L14 becomes too large, which makes it difficult to achieve both of temperature compensation and the correction of various aberrations even with the following inequalities (3) to (5) satisfied. In this example, since the negative lens L13 and the positive lens L14 are cemented to each other, DAB=0.00 is obtained.

Satisfying Inequality (2) enables the shapes of facing lens surfaces of the negative lens L13 and the positive lens L14 to be approximately identical. With this configuration, even in a case where the negative lens L13 and the positive lens L14 are not cemented to each other, a pair of the negative lens L13 and the positive lens L14 can have a function equivalent to the function of a cemented lens. In a case where Inequality (2) is not satisfied, a difference in curvature radius between the facing lens surfaces of the negative lens L13 and the positive lens L14 becomes too large. This makes it difficult to arrange the negative lens L13 and the positive lens L14 closely to each other in such a manner as to satisfy Inequality (1). Thus, achievement of both of temperature compensation and the correction of various aberrations becomes difficult. In this example, since the negative lens L13 and the positive lens L14 are cemented to each other, RA/RB=1.00 is obtained.

The optical system according to this example satisfies the following inequalities (3) to (5):

$$0.00 \leq |NA-NB| \leq 0.20 \quad (3),$$

$$0.00 \leq |\nu A-\nu B| \leq 20.00 \quad (4), \text{ and}$$

$$4.20 \leq |dnA/dt - dnB/dt| \quad (5),$$

where NA and NB denote refractive indices of the negative lens L13 and the positive lens L14, respectively, with respect to the d-line, νA and νB denote Abbe numbers of the negative lens L13 and the positive lens L14, respectively, with respect to the d-line, and dnA/dt [$10^{-6}$/° C.] and dnB/dt [$10^{-6}$/° C.] denote temperature coefficients of refractive indices of the negative lens L13 and the positive lens L14, respectively, with respect to the d-line at 20° C. to 40° C. Each value in these inequalities is assumed to be a value at room temperature (25° C.).

Inequalities (3) to (5) represent that the negative lens L13 and the positive lens L14 are made of mutually-different materials, a refractive index difference and a dispersion difference between the materials are small, and a difference in temperature coefficient of refractive index is large. A general cemented lens obtains a function of correcting chromatic aberration and a field curvature by being consisted of a negative lens and a positive lens having a large refractive index difference and a large dispersion difference. In contrast to this, in this example, a refractive index difference and a dispersion difference between the negative lens L13 and the positive lens L14 is reduced to satisfy Inequalities (3) and (4), so that the first cemented lens AT1 has a function equivalent to the function of a single lens at the room temperature. This reduces the influence on an aberration variation of the optical system that is exerted by the first cemented lens AT1 when an environmental temperature changes from the room temperature.

A difference in temperature coefficient of refractive index between the negative lens L13 and the positive lens L14 is increased to satisfy Inequality (5), so that the first cemented lens AT1 functions as a cemented lens for temperature compensation in a case where an environmental temperature changes from the room temperature. More specifically, in a case where an environmental temperature changes from the room temperature, a refracting angle of light on cemented surfaces of the negative lens L13 and the positive lens L14 becomes larger than a refracting angle at the room temperature. By utilizing this, it is possible to control a convergence degree (divergence degree) of light rays and controls variation in focal position using the first cemented lens AT1.

In a case where Inequalities (3) and (4) are not satisfied, a refractive index difference and a dispersion difference between the negative lens L13 and the positive lens L14 become too large, and it becomes difficult to control an aberration variation of the optical system resulting from an environmental temperature change from the room temperature. In a case where Inequality (5) is not satisfied, a difference in temperature coefficient of refractive index between the negative lens L13 and the positive lens L14 becomes too small, and it becomes difficult to control variation in focal position of the optical system resulting from an environmental temperature change from the room temperature.

In the optical system according to this example, material of which a temperature coefficient of a refractive index has a negative sign is employed as the material of either one of a positive lens or a negative lens. That is to say, a sign of either nA/dt or dnB/dt is negative. This configuration increases a difference in coefficient β between the positive lens and the negative lens, which enhances the effect of controlling variation in focal position that is attributed to a change in environmental temperature with the above-described inequalities (1) to (5) satisfied.

In such a manner, the optical system according to this example is characterized in that Inequalities (1) to (5) are simultaneously satisfied together. This enables an appropriate setting of the relative positions and the shapes of the negative lens L13 and the positive lens L14 as well as the condition of material, so that a variation in focal position that is attributed to a change in environmental temperature is controlled, irrespective of the sign of the value of the coefficient β of each lens. Furthermore, it is preferable to satisfy the following inequalities (1a) to (5a), and more preferable to satisfy Inequalities (1b) to (5b).

$$0.00 \leq DAB \leq 0.80 \quad (1a)$$

$$0.85 \leq RA/RB \leq 1.15 \quad (2a)$$

$$0.00 \leq |NA-NB| \leq 0.17 \quad (3a)$$

$$0.00 \leq |\nu A-\nu B| \leq 17.2 \quad (4a)$$

$$4.5 \leq |dnA/dt - dnB/dt| \leq 12.1 \quad (5a)$$

$$0.00 \leq DAB \leq 0.60 \quad (1b)$$

$$0.90 \leq RA/RB \leq 1.10 \quad (2b)$$

$$0.00 \leq |NA-NB| \leq 0.14 \quad (3b)$$

$$0.00 \leq |vA-vB| \leq 14.6 \quad (4b)$$

$$4.5 \leq |dnA/dt - dnB/dt| \leq 10.23 \quad (5b)$$

The negative lens L13 and the positive lens L14 are only required to be adjacent to each other, and may be separated from each other as necessary. Even in a case where the negative lens L13 and the positive lens L14 are separated from each other, by reducing a distance and a shape difference between the negative lens L13 and the positive lens L14 to satisfy Inequalities (1) and (2), it is possible to produce an effect similar to that produce in a case where the negative lens L13 and the positive lens L14 are cemented to each other. In other words, a similar effect is producible without the first cemented lens AT1 in the optical system, if the optical system instead includes a pair of the negative lens L13 and the positive lens L14 (such a pair is referred to as a lens unit) that satisfy Inequalities (1) to (5). An arrangement order of the negative lens L13 and the positive lens L14 or the arrangement thereof in the optical system may be changed as necessary.

The optical system according to this example desirably satisfies the following inequality (6):

$$0.00 \leq |\beta A - \beta B| \quad (6),$$

where αA [$10^{-6}$/° C.] and αB [$10^{-6}$/° C.] denote linear expansion coefficients of the negative lens L13 and the positive lens L14, respectively. According to the above-described equality (B), βA=αA−dnA/dt/(NA−1) and βB=αB−dnB/dt/(NB−1) are obtained. The linear expansion coefficients in this inequality are average linear expansion coefficients at −30° C. to 70° C.

Satisfying Inequality (6) brings about a difference between the values of the coefficients β of the negative lens L13 and the positive lens L14. This facilitates control of variation in focal position due to an environmental temperature change from the room temperature. In a case where Inequality (6) is not satisfied, a difference in coefficient β between the negative lens L13 and the positive lens L14 becomes too small, so that it is difficult to provide the function of temperature compensation to the negative lens L13 and the positive lens L14, which is undesirable.

A larger value of Inequality (6) is desirable for temperature compensation, but if the value of Inequality (6) is too large, it might become difficult to procure the materials of the negative lens L13 and the positive lens L14. Thus, in a case where a procurement difficulty level of each material is considered, it is desirable to sequentially satisfy the following inequalities (6a) to (6c):

$$2.9 < |\beta A - \beta B| < 21.0 \quad (6a),$$

$$4.1 < |\beta A - \beta B| < 18.2 \quad (6b), \text{ and}$$

$$5.3 < |\beta A - \beta B| < 15.4 \quad (6c).$$

To increase a control amount of a variation in focal position that is attributed to a change in environmental temperature, the largest value of βA or βB is desirably greater than or equal to 8.0. This facilitates increasing a difference in coefficient β between a positive lens and a negative lens.

In a case where the negative lens L13 and the positive lens L14 are cemented to each other as in this example, the optical system desirably satisfies the following inequality (7):

$$0.10 \times 10^{-3} < |Dk/R| < 1.00 \quad (7)$$

where R denotes a curvature radius of a cemented surface of each lens, and Dk denotes an effective diameter. In this inequality, the curvature radius R is equal to the curvature radii RA and RB described above (R=RA=RB). In this inequality, the effective diameter is a radius of an effective region on a cemented surface through which effective light rays contributing to image formation pass.

Satisfying Inequality (7) facilitates process and cement of the facing lens surfaces of the negative lens L13 and the positive lens L14, resulting in the facilitation of manufacture of the first cemented lens AT1. In a case where Inequality (7) is not satisfied, it becomes difficult to process and cement the facing lens surfaces of the negative lens L13 and the positive lens L14, which is not desirable. Furthermore, it is desirable to satisfy the following inequality (7a), and more desirable to satisfy Inequality (7b):

$$0.01 < |Dk/R| < 1.00 \quad (7a)$$

$$0.10 < |Dk/R| < 1.00 \quad (7b).$$

In the first cemented lens AT1, for the cemented lens L10 (positive lens L16, negative lens L17), and the cemented lens L20 (positive lens L18, negative lens L19), all of facing lens surfaces (cemented surfaces) of negative lenses and positive lenses desirably have convex shapes protruding toward the object side, or are planes. With this configuration, aberration correction and the downsizing of the entire system become easier. The negative lens L13 and the positive lens L14 in the first cemented lens AT1 desirably have convex shapes protruding toward the object side, or are planes. With this configuration, temperature compensation and the downsizing of the entire system become easier. A similar configuration is applied to a case where the negative lens L13 and the positive lens L14 in the first cemented lens AT1 are separated from each other.

Figure 2:
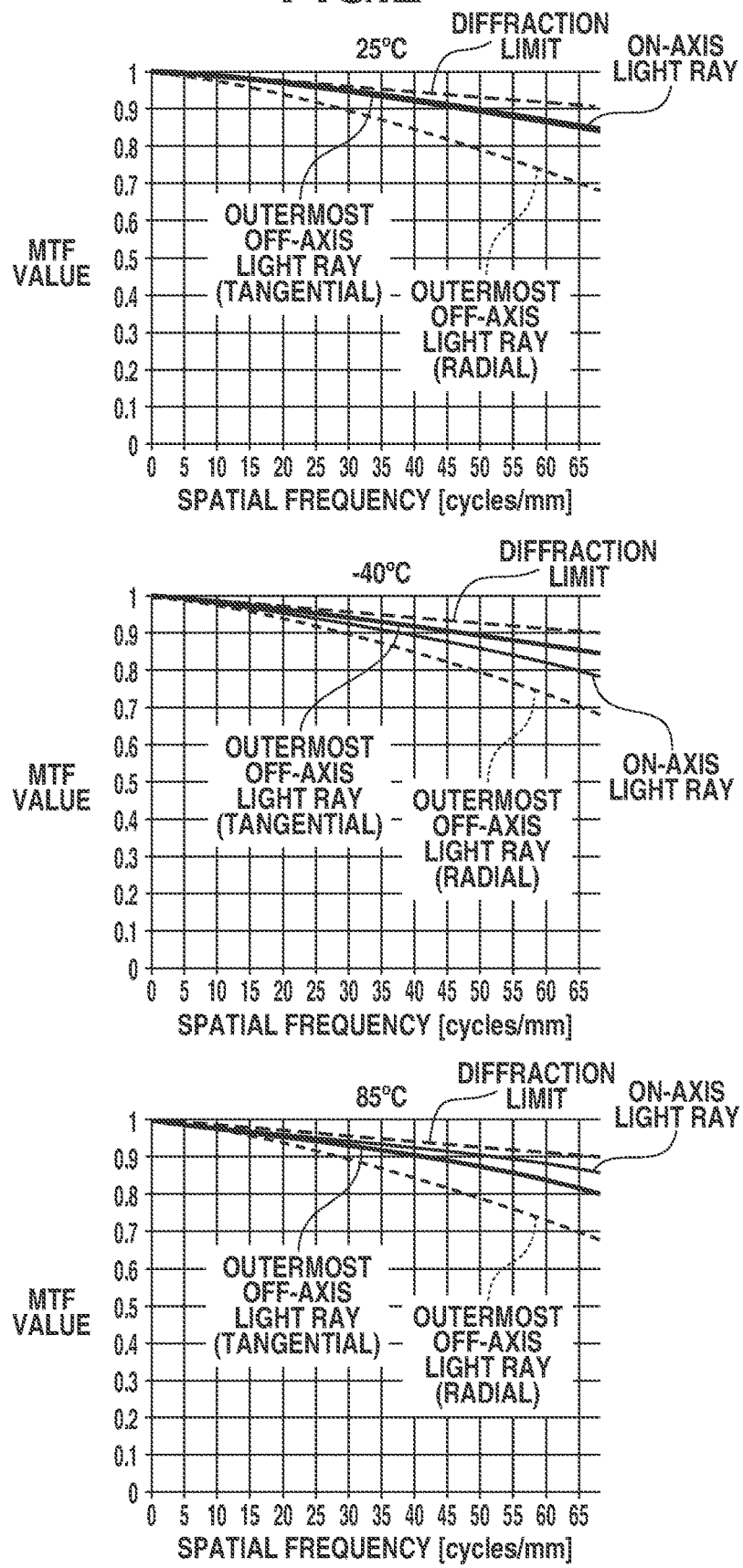
FIG. 2 is a modulation transfer function (MTF) diagram of the optical system according to Example 1.

FIG. 2 is a diagram illustrating a modulation transfer function (MTF) curve of the optical system according to this example. FIG. 2 illustrates three patterns corresponding to a case where an environmental temperature of an environment in which the optical system is arranged is a room temperature (25° C.), a case where the environmental temperature is a low temperature (−40° C.), and a case where the environmental temperature is a high temperature (85° C.). In FIG. 2, a horizontal axis indicates a spatial frequency [cycles/mm], and a vertical axis indicates an MTF value (contrast value). FIG. 2 illustrates a curve indicating a diffraction limit, an MTF curve of an on-axis light ray (light ray with a central field angle of 0°) reaching an on-axis image height, and an MTF curve of an outermost off-axis light ray (light ray with a half field angle of 60°) reaching an outermost off-axis image height.

The optical system according to this example includes a pair of the negative lens L13 and the positive lens L14 satisfying the above-described inequalities. More specifically, the optical system includes the first cemented lens AT1 consisting of the negative lens L13 consisting of S-LAH60V made by Ohara Inc, and the positive lens L14 consisting of S-LAH60MQ made by Ohara Inc. As illustrated in FIG. 2, at the room temperature (25° C.), the smallest value of an MTF value at a spatial frequency of 83 cycles/mm, which corresponds to a half value of a Nyquist frequency, is about 68%, good image forming performance is achieved. At the low temperature (−40° C.) and the high temperature (85° C.), the smallest values of MTF values at a spatial frequency of 68 cycles/mm are about 68%. In other words, it can be seen that, the temperature compensation of the first cemented lens AT maintains good image forming performance even with a change in an environmental temperature.

Example 2

Figure 3:
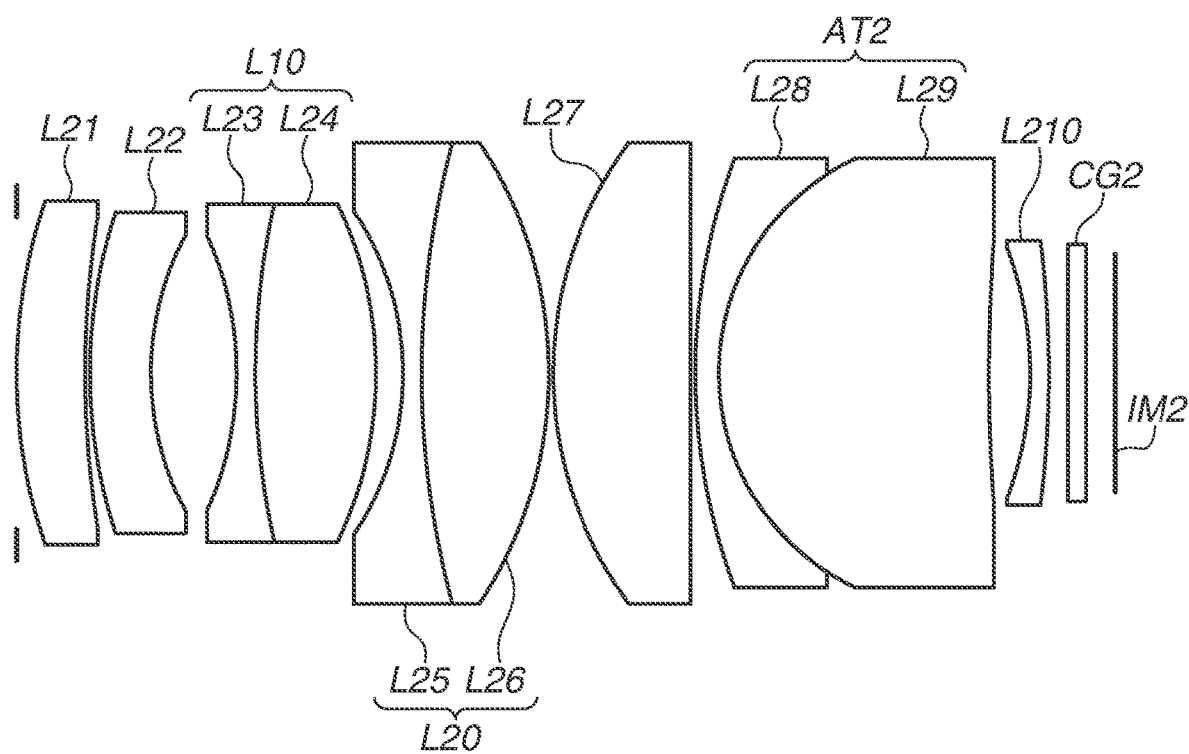
FIG. 3 is a main portion schematic diagram of an optical system according to Example 2.

Example 2 of the present invention will be described. FIG. 3 is a schematic diagram of a main portion in a section including an optical axis of an optical system according to Example 2. Descriptions of components in the optical system according to this example that are equivalent to those in the above-described optical system according to Example 1 will be omitted.

The optical system according to this example is an optical system having a focal length of 16.15 mm and a half field angle of 17.5°. The optical system according to this example includes an aperture stop S2, a first positive lens L21, a first negative lens L22, a first cemented lens L10, a second cemented lens L20, a second positive lens L27, a third cemented lens AT2, and a second negative lens L210 that are arranged in order from the object side to the image side. The first cemented lens L10 consists of a negative lens L23 and a positive lens L24 that are arranged in order from the object side to the image side, and the second cemented lens L20 consists of a negative lens L25 and a positive lens L26 that are arranged in order from the object side to the image side. The third cemented lens AT2 consists of a negative lens L28 having a convex shape protruding toward the object side, and a positive lens L29 cemented to a surface on the image side of the negative lens L28. A cover glass CG2 is arranged between the second negative lens L210, which is a final lens, and an image plane IM2.

The optical system according to this example employs a configuration (front stop type) in which the aperture stop S2 that determines an F-number (Fno) by restricting light from an object is arranged at a position closest to the object. This configuration causes light restricted by the aperture stop S2 to enter all the lenses, thus downsizing the lenses, which leads to downsizing of the entire optical system. In this example, the negative lens L28 and the positive lens L29 in the third cemented lens AT2 satisfy the above-described inequalities. With this configuration, the third cemented lens AT2 functions as a cemented lens for temperature compensation, thus achieving both of the control of variation in focal position that is attributed to a change in environmental temperature, and the correction of various aberrations.

In this example, the shapes and the arrangement of the lenses are contrived in such a manner that high optical performance is obtained with the optical system of the front stop type employed. More specifically, the optical system according to this example employs a configuration in which the first cemented lens L10 and the second cemented lens L20 are consecutively arranged on the image side of the aperture stop S2 in order from the object side to the image side. Furthermore, each cemented lens includes a negative lens having a concave surface on the object side, and a positive lens cemented to a surface on the image side of the negative lens. More specifically, the first cemented lens L10 includes the negative lens L23 having a concave surface on the object side, and the positive lens L24 cemented to a surface on the image side of the negative lens L23. The second cemented lens L20 includes the negative lens L25 having a concave surface on the object side, and the positive lens L26 cemented to a surface on the image side of the negative lens L25.

In this manner, the two cemented lenses each having a concave surface on the object side are consecutively arranged, so that the arrangement of lenses on the image side of the aperture stop S2 is appropriately set in the present example. This enables suitable correction of various aberrations with the lenses on the image side of the aperture stop S2, while the aperture stop S2 is arranged at a position closest to the object. It is further desirable that a first positive lens having a convex shape protruding toward the object side, and a first negative lens having a convex shape protruding toward the object side are arranged on the object side of the two cemented lenses. With these configurations, it is possible to achieve both of the downsizing of the entire system and high optical performance without using a large number of aspherical surfaces.

Figure 4:
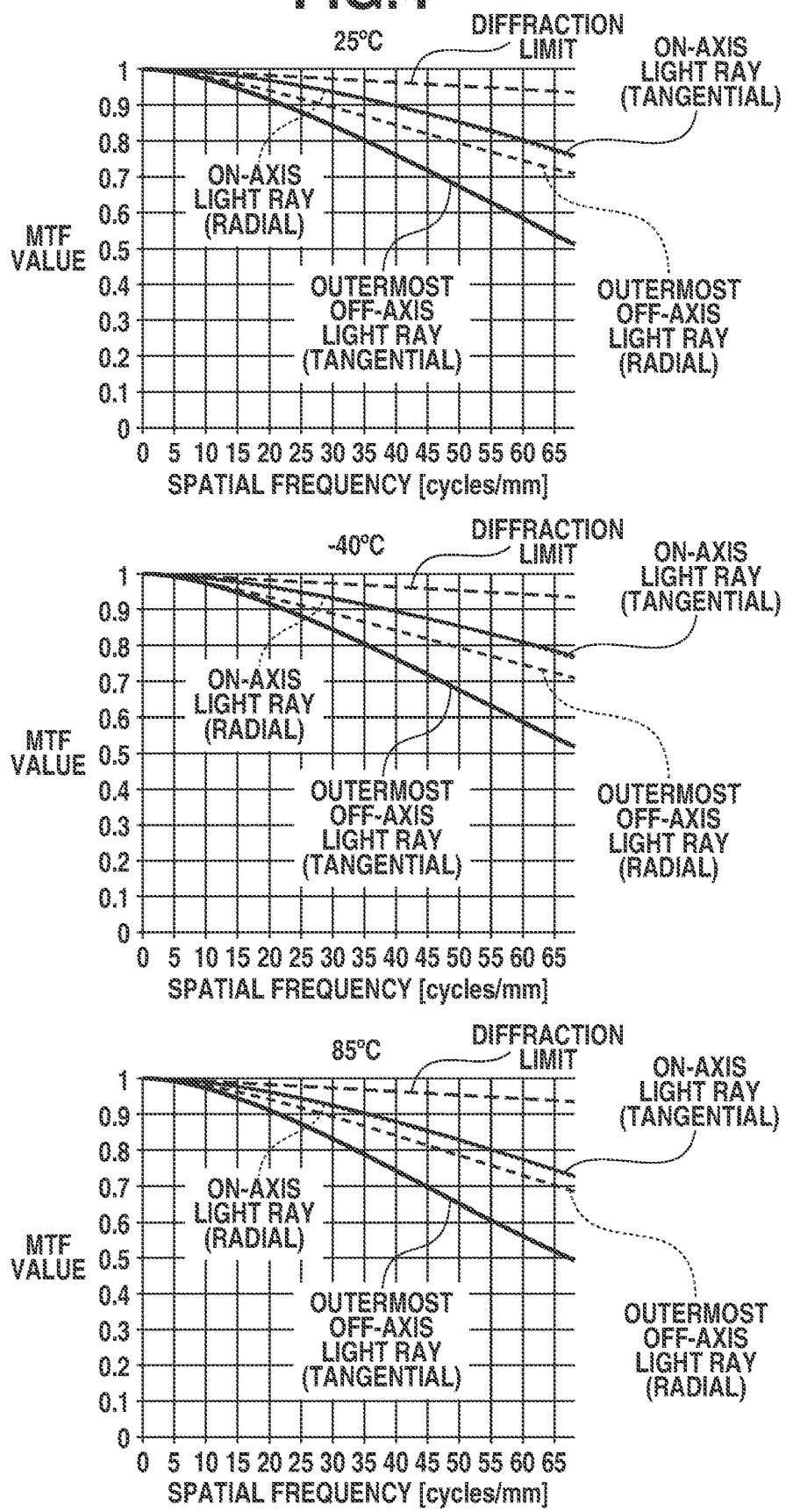
FIG. 4 is an MTF diagram of the optical system according to Example 2.

FIG. 4 is a diagram illustrating an MTF curve of the optical system according to this example. As illustrated in FIG. 4, at the room temperature (25° C.), the smallest value of an MTF value at a spatial frequency of 68 cycles/mm, which corresponds to a half value of a Nyquist frequency, is about 53%, so that good image forming performance is achieved. At the low temperature (−40° C.) and the high temperature (85° C.), the smallest values of MTF values at a spatial frequency of 68 cycles/mm are about 54% and about 51%, respectively. In other words, it can be seen that, by the temperature compensation performed by the third cemented lens AT2, good image forming performance can be maintained even in a case where an environmental temperature changes.

Example 3

Figure 5:
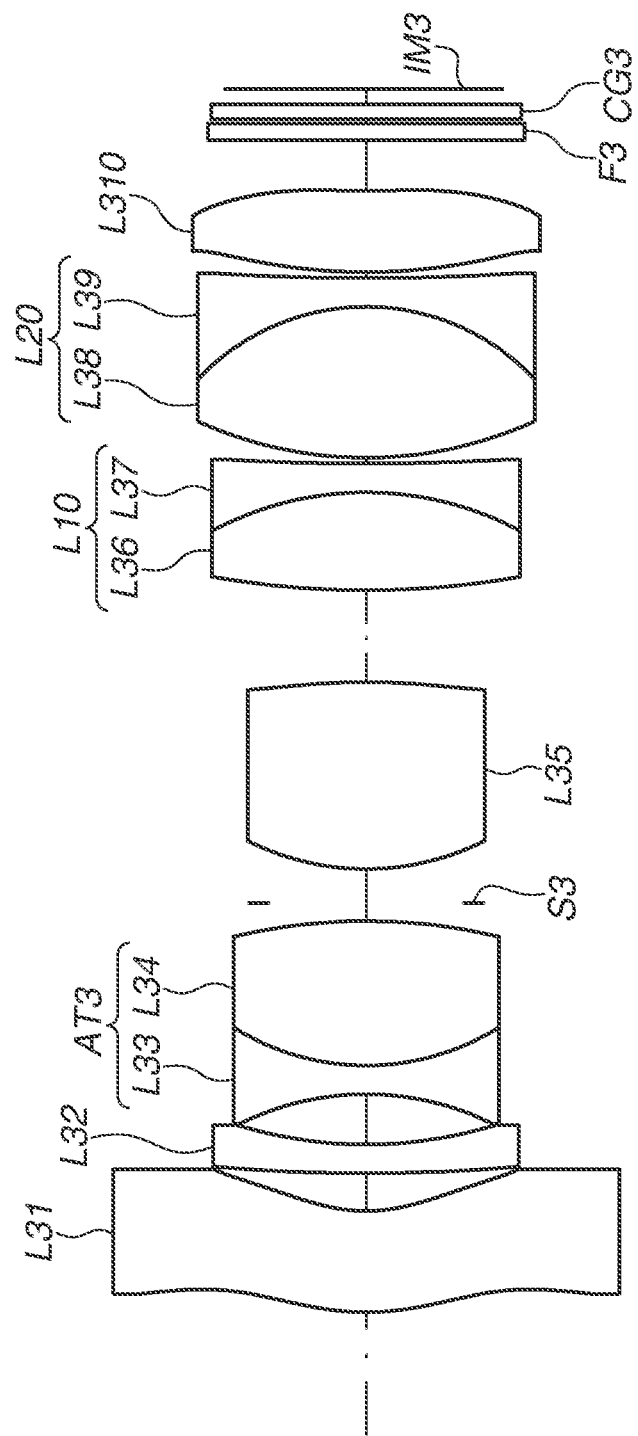
FIG. 5 is a main portion schematic diagram of an optical system according to Example 3.

Example 3 of the present invention will be described below. FIG. 5 is a main portion schematic diagram in a section including an optical axis of an optical system according to Example 3. Descriptions of components in the optical system according to this example that are equivalent to those in the above-described optical system according to Example 1 will be omitted.

The optical system according to this example is an optical system having a focal length of 8.70 mm and a half field angle of 60°. The optical system according to this example includes a negative lens L31, a negative lens L32, a cemented lens AT3, an aperture stop S3, a positive lens L35, a cemented lens L10, a cemented lens L20, and a negative lens L310 that are arranged in order from the object side to the image side. The cemented lens AT3 consists of a negative lens L33 and a positive lens L34 that are arranged in order from the object side to the image side, and the cemented lens L10 consists of a positive lens L36 and a negative lens L37 that are arranged in order from the object side to the image side. The cemented lens L20 consists of a positive lens L38 and a negative lens L39 that are arranged in order from the object side to the image side. A positive lens and a negative lens in each cemented lens are cemented to each other by a cementing member, such as an adhesive. An infrared cut filter F3 serving as an optical filter and a cover glass CG3 are arranged on the image side of the second negative lens L310 serving as a final lens. In this example, the cemented lens AT3 functions as a cemented lens for temperature compensation, thus achieving both of the control of variation in focal position that is attributed to a change in environmental temperature, and the correction of various aberrations.

Figure 6:
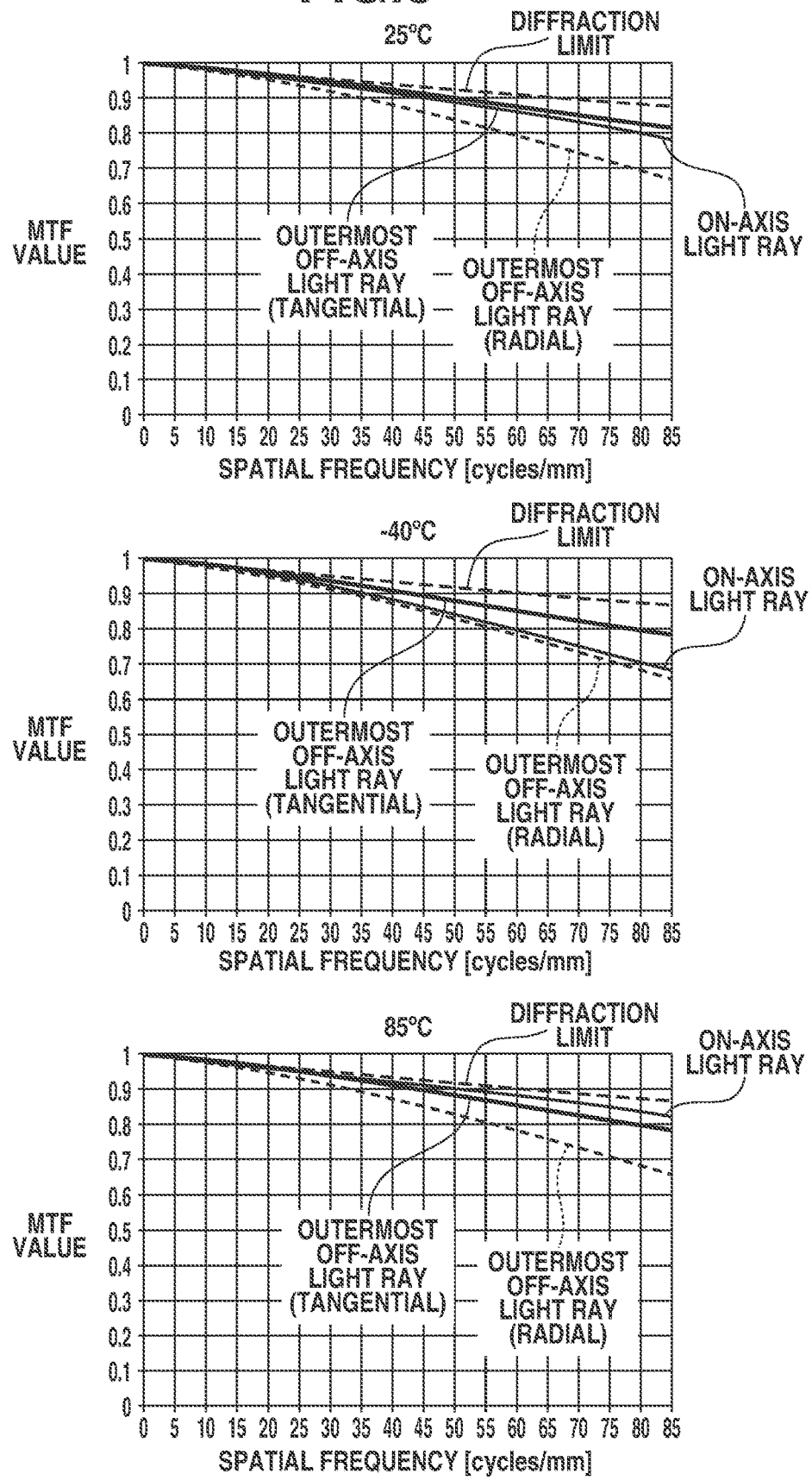
FIG. 6 is an MTF diagram of the optical system according to Example 3.

FIG. 6 is a diagram illustrating an MTF curve of the optical system according to this example. As illustrated in FIG. 6, at the room temperature (25° C.), the smallest value of an MTF value at a spatial frequency of 83 cycles/mm, which corresponds to a half value of a Nyquist frequency, is about 63%, so that good image forming performance is achieved. At the low temperature (−40° C.) and the high temperature (85° C.), the smallest values of MTF values at a spatial frequency of 83 cycles/mm are about 65% and about 66%, respectively. In other words, it can be seen that, by the temperature compensation performed by the cemented lens AT3, good image forming performance can be maintained even in a case where an environmental temperature changes.

Example 4

Figure 7:
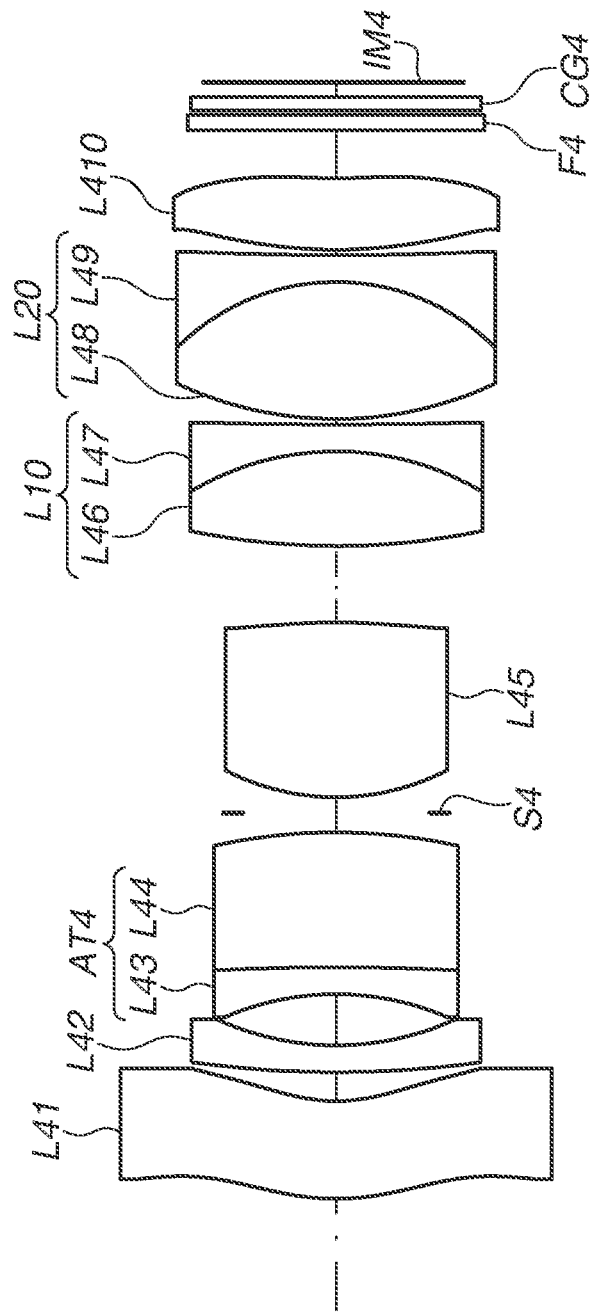
FIG. 7 is a main portion schematic diagram of an optical system according to Example 4.

Example 4 of the present invention will be described. FIG. 7 is a schematic diagram of a main portion in a section including an optical axis of an optical system according to Example 4. Descriptions of components in the optical system according to the present example that are equivalent to those in the above-described optical system according to Example 1 will be omitted.

The optical system according to this example is an optical system having a focal length of 8.69 mm and a half field angle of 60°. The optical system according to this example includes a negative lens L41, a negative lens L42, a cemented lens AT4, an aperture stop S4, a positive lens L45, a cemented lens L10, a cemented lens L20, and a negative lens L410 that are arranged in order from the object side to the image side. The cemented lens AT4 consists of a negative lens L43 and a positive lens L44 that are arranged in order from the object side to the image side, and the cemented lens L10 consists of a positive lens L46 and a negative lens L47 that are arranged in order from the object side to the image side. The cemented lens L20 consists of a positive lens L48 and a positive lens L49 that are arranged in order from the object side to the image side. A positive lens and a negative lens in each cemented lens are cemented to each other by a cementing member, such as an adhesive. An infrared cut filter F4 serving as an optical filter and a cover glass CG4 are arranged on the image side of the second negative lens L410, which is a final lens. In this example, the cemented lens AT4 functions as a cemented lens for temperature compensation, thus achieving both of the control of a variation in focal position that is attributed to a change in environmental temperature, and the correction of various aberrations.

Figure 8:
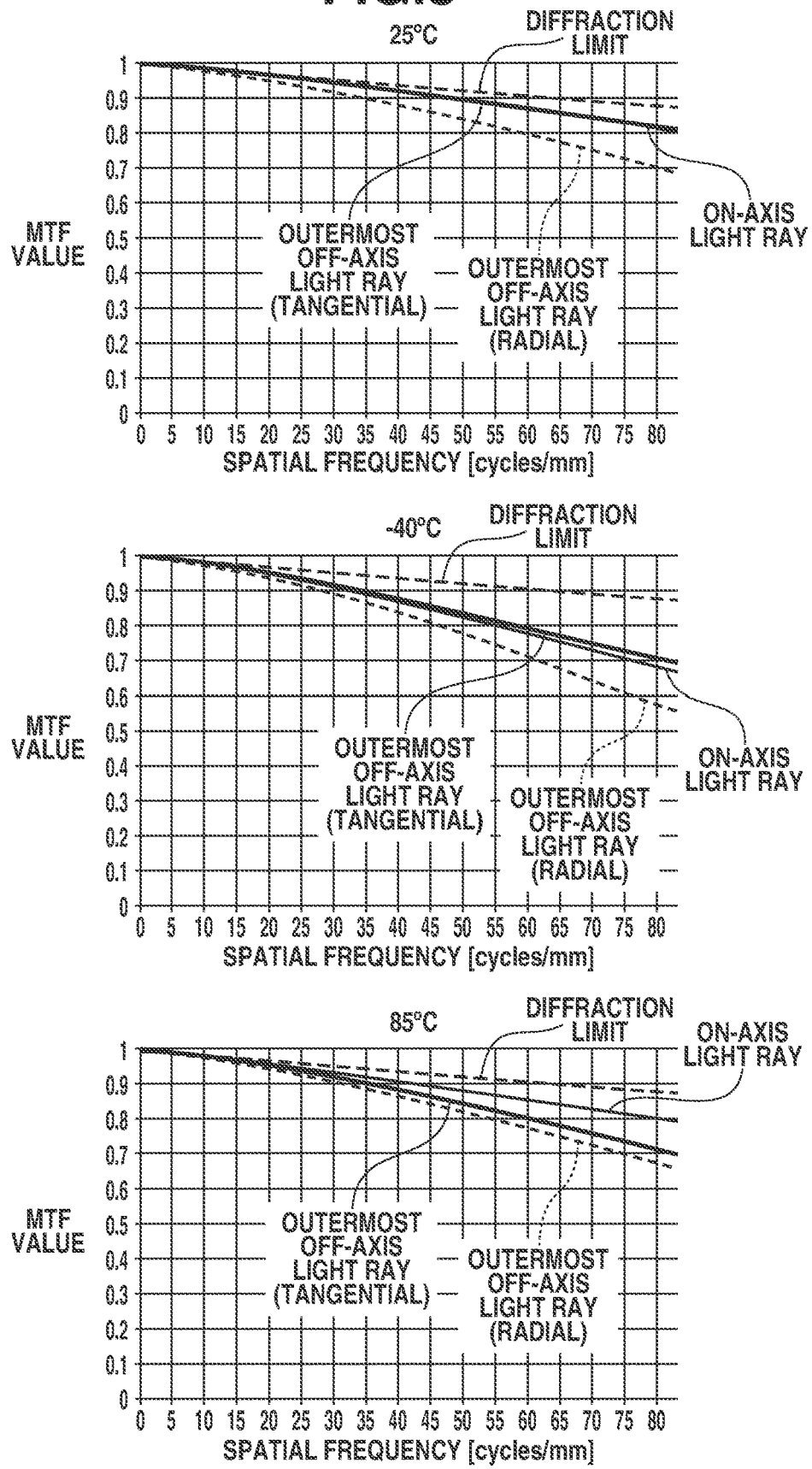
FIG. 8 is an MTF diagram of the optical system according to Example 4.

FIG. 8 is a diagram illustrating an MTF curve of the optical system according to this example. As illustrated in FIG. 8, the smallest value of an MTF value at a spatial frequency of 83 cycles/mm, which corresponds to a half value of a Nyquist frequency, is about 69% at the room temperature (25° C.), so that good image forming performance is achieved. At the low temperature (−40° C.) and the high temperature (85° C.), the smallest values of MTF values at a spatial frequency of 83 cycles/mm are about 57% and about 66%, respectively. In other words, it can be seen that, by the temperature compensation performed by the cemented lens AT4, good image forming performance can be maintained even in a case where an environmental temperature changes.

Example 5

Figure 9:
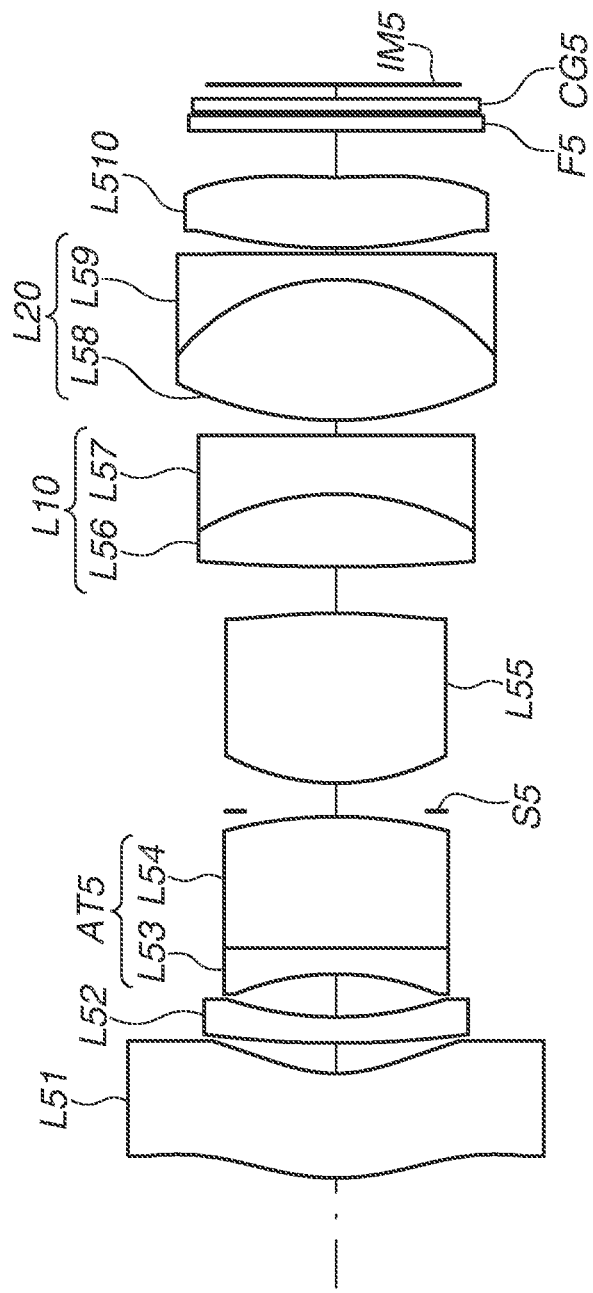
FIG. 9 is a main portion schematic diagram of an optical system according to Example 5.

Example 5 of the present invention will be described. The optical system according to the present example has a focal length of 9.00 mm and a half field angle of 60°. FIG. 9 is a schematic diagram of a main portion in a section including an optical axis of an optical system according to Example 5. Descriptions of components in the optical system according to the present example that are equivalent to those in the above-described optical system according to Example 1 will be omitted.

The optical system according to this example includes a negative lens L51, a negative lens L52, a cemented lens AT5, an aperture stop S5, a positive lens L55, a cemented lens L10, a cemented lens L20, and a negative lens L510 that are arranged in order from the object side to the image side. The cemented lens AT5 consists of a negative lens L53 and a positive lens L54 that are arranged in order from the object side to the image side, and the cemented lens L10 consists of a positive lens L56 and a negative lens L57 that are arranged in order from the object side to the image side. The cemented lens L20 consists of a positive lens L58 and a negative lens L59 that are arranged in order from the object side to the image side. A positive lens and a negative lens in each cemented lens are cemented to each other by a cementing member, such as an adhesive. An infrared cut filter F5 serving as an optical filter and a cover glass CG5 are arranged on the image side of the second negative lens L510, which is a final lens. In this example, the cemented lens AT5 functions as a cemented lens for temperature compensation, thus achieving both of the suppression of a variation in focal position that is attributed to a change in environmental temperature, and the correction of various aberrations.

Figure 10:
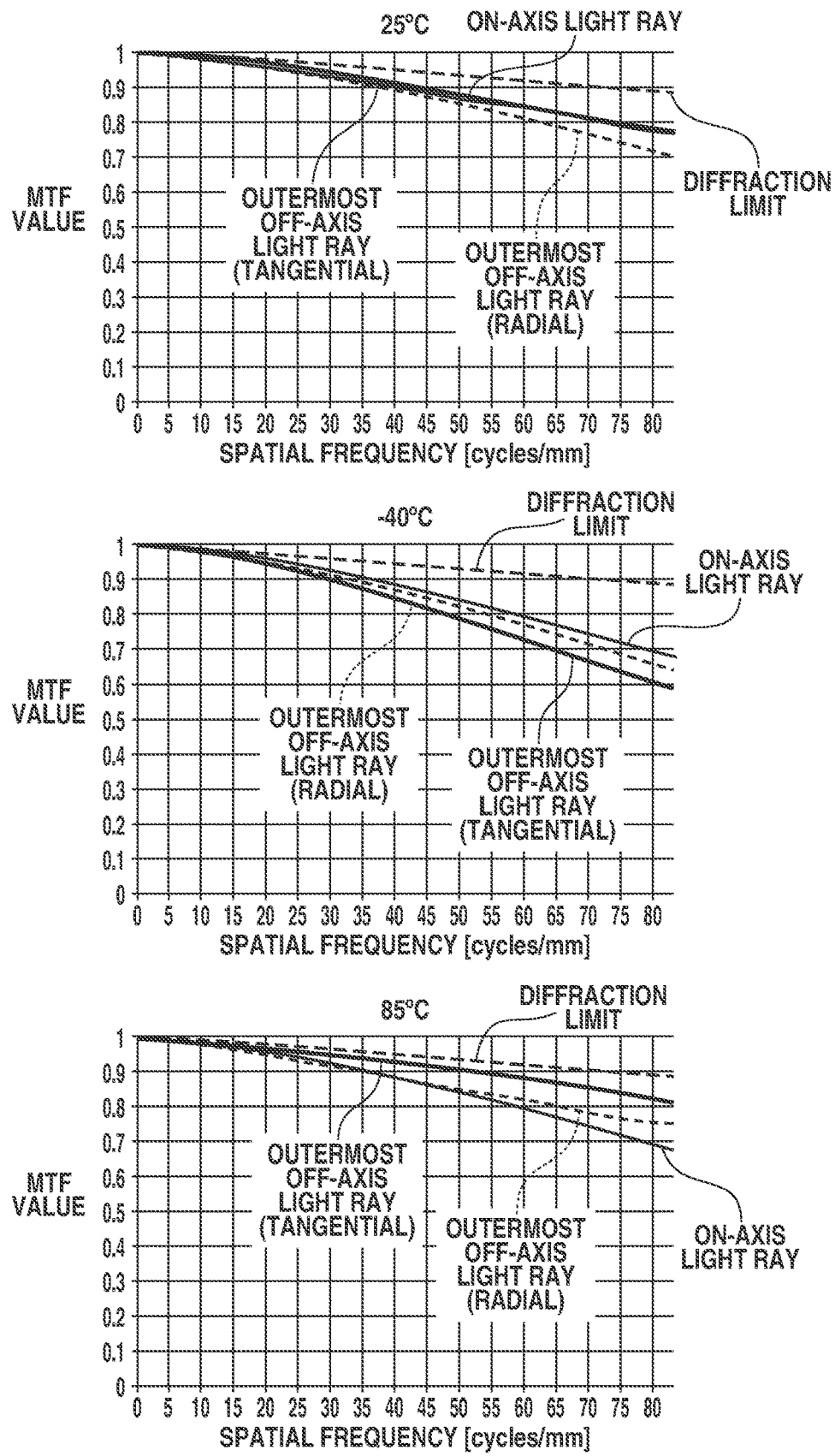
FIG. 10 is an MTF diagram of the optical system according to Example 5.

FIG. 10 is a diagram illustrating an MTF curve of the optical system according to this example. As illustrated in FIG. 10, the smallest value of an MTF value at a spatial frequency of 83 cycles/mm, which corresponds to a half value of a Nyquist frequency, is about 69% at the room temperature (25° C.), so that good image forming performance is achieved. At the low temperature (−40° C.) and the high temperature (85° C.), the smallest values of MTF values at a spatial frequency of 83 cycles/mm are about 60% and about 68%, respectively. In other words, it can be seen that, by the temperature compensation performed by the cemented lens AT5, good image forming performance can be maintained even in a case where an environmental temperature changes.

Example 6

Figure 11:
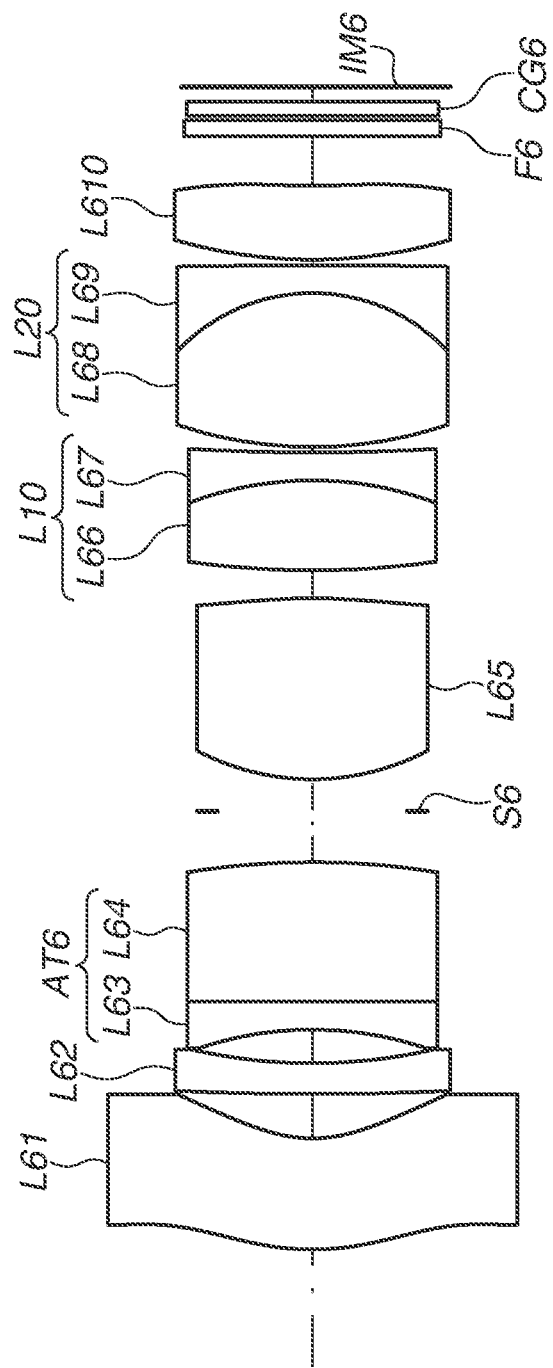
FIG. 11 is a main portion schematic diagram of an optical system according to Example 6.

Example 6 of the present invention will be described. FIG. 11 is a schematic diagram of a main portion in a section including an optical axis of an optical system according to Example 6. Descriptions of components in the optical system according to the present example that are equivalent to those in the above-described optical system according to Example 1 will be omitted.

The optical system according to this example has a focal length of 8.25 mm and a half field angle of 60°. The optical system according to this example includes a negative lens L61, a negative lens L62, a cemented lens AT6, an aperture stop S6, a positive lens L65, a cemented lens L10, a cemented lens L20, a negative lens L610 that are arranged in order from the object side to the image side. The cemented lens AT6 consists of a negative lens L63 and a positive lens L64 that are arranged in order from the object side to the image side, and the cemented lens L10 consists of a positive lens L66 and a negative lens L67 that are arranged in order from the object side to the image side. The cemented lens L20 consists of a positive lens L68 and a negative lens L69 that are arranged in order from the object side to the image side. A positive lens and a negative lens in each cemented lens are cemented to each other by a cementing member, such as an adhesive. An infrared cut filter F6 serving as an optical filter and a cover glass CG6 are arranged on the image side of the second negative lens L610, which is a final lens. In this example, the cemented lens AT6 functions as a cemented lens for temperature compensation, thus achieving both of the control of variation in focal position that is attributed to a change in environmental temperature, and the correction of various aberrations.

Figure 12:
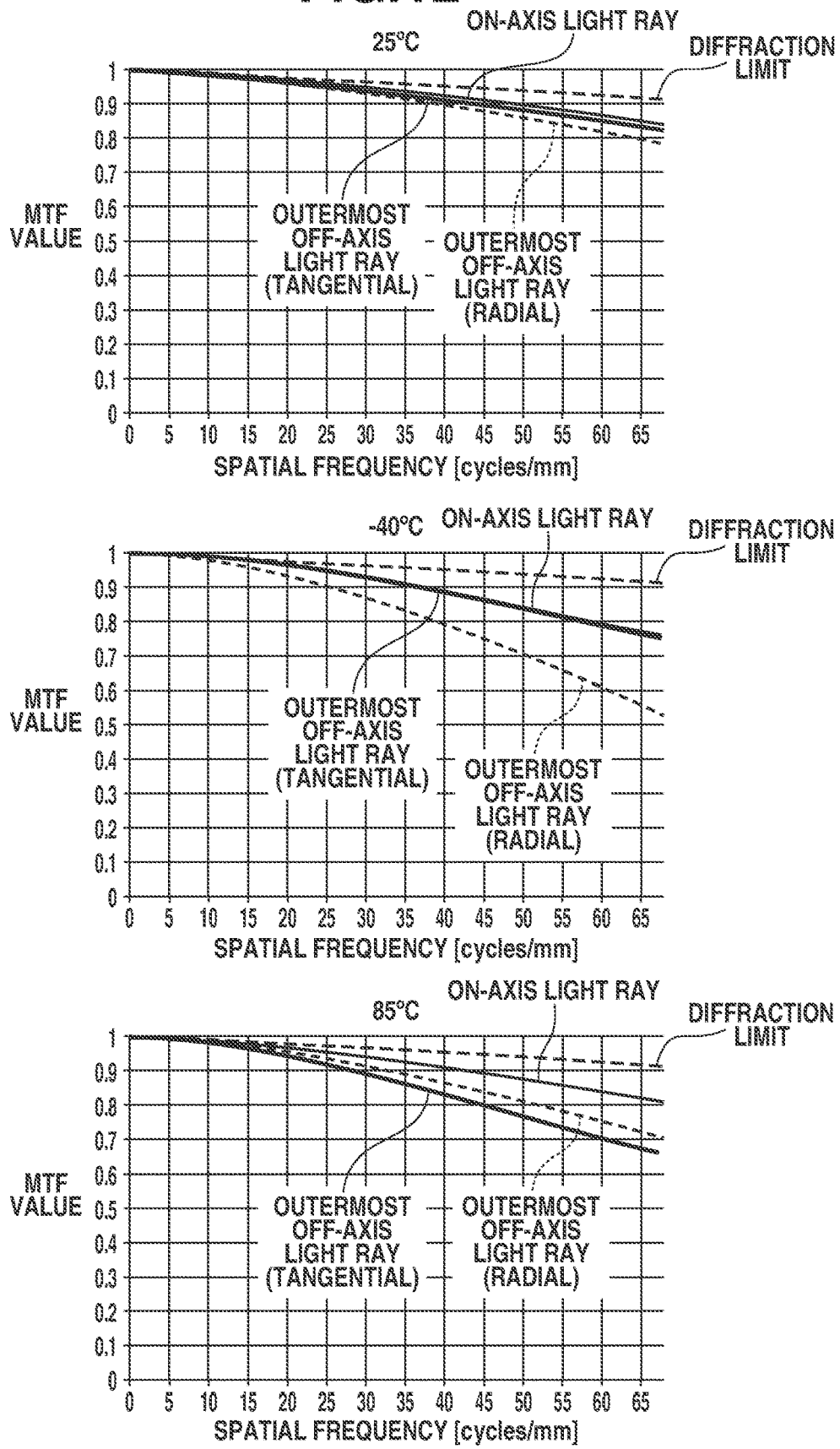
FIG. 12 is an MTF diagram of the optical system according to Example 6.

FIG. 12 is a diagram illustrating an MTF curve of the optical system according to this example. As illustrated in FIG. 12, the smallest value of an MTF value at a spatial frequency of 83 cycles/mm, which corresponds to a half value of a Nyquist frequency, is about 72% at the room temperature (25° C.), so that good image forming performance is achieved. At the low temperature (−40° C.) and the high temperature (85° C.), the smallest values of MTF values at a spatial frequency of 83 cycles/mm are about 51% and about 62%, respectively. In other words, it can be seen that, by the temperature compensation performed by the cemented lens AT6, good image forming performance can be maintained even in a case where an environmental temperature changes.

Example 7

Figure 13:
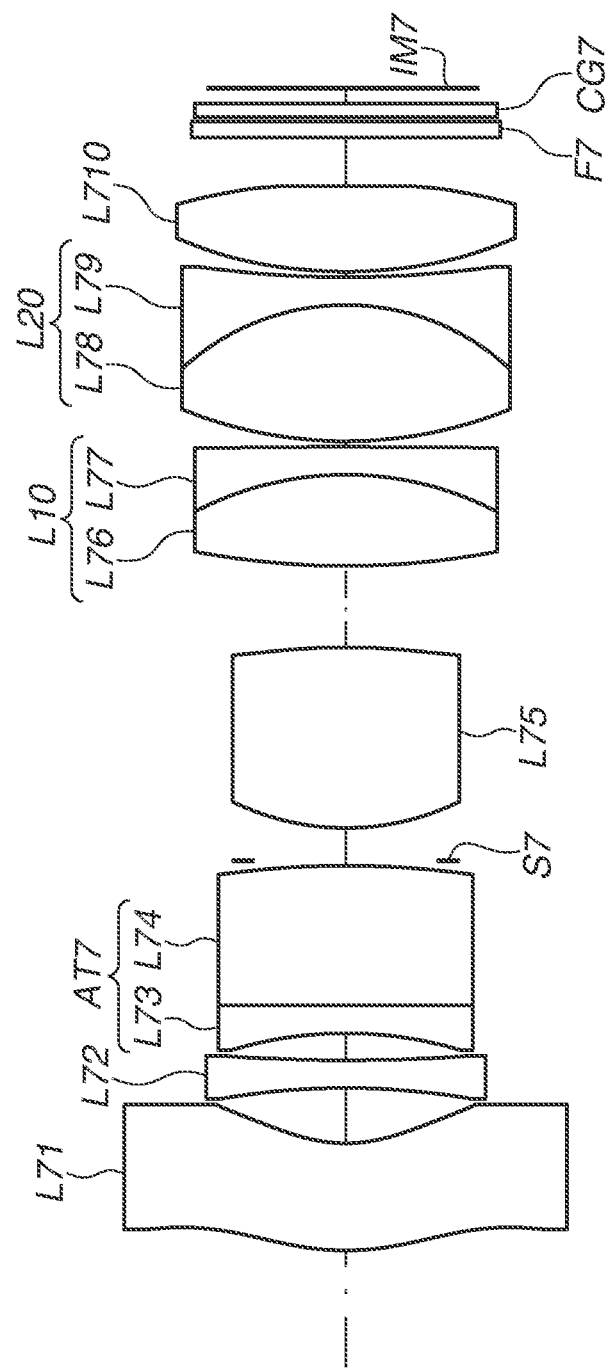
FIG. 13 is a main portion schematic diagram of an optical system according to Example 7.

Example 7 of the present invention will be described below. FIG. 13 is a schematic diagram of a main portion in a section including an optical axis of an optical system according to Example 7. Descriptions of components in the optical system according to the present example that are equivalent to those in the above-described optical system according to Example 1 will be omitted.

The optical system according to this example has a focal length of 9.00 mm and a half field angle of 60°. The optical system according to this example includes a negative lens L71, a negative lens L72, a cemented lens AT7, an aperture stop S7, a positive lens L75, a cemented lens L10, a cemented lens L20, and a negative lens L710 that are arranged in order from the object side to the image side. The cemented lens AT7 consists of a negative lens L73 and a positive lens L74 that are arranged in order from the object side to the image side, and the cemented lens L10 consists of a positive lens L76 and a negative lens L77 that are arranged in order from the object side to the image side. The cemented lens L20 consists of a positive lens L78 and a negative lens L79 that are arranged in order from the object side to the image side. A positive lens and a negative lens in each cemented lens are cemented to each other by a cementing member such as an adhesive. An infrared cut filter F7 serving as an optical filter and a cover glass CG7 are arranged on the image side of the second negative lens L710, which is a final lens. In this example, the cemented lens AT7 functions as a cemented lens for temperature compensation, thus achieving both of the control of variation in focal position that is attributed to a change in environmental temperature, and the correction of various aberrations.

Figure 14:
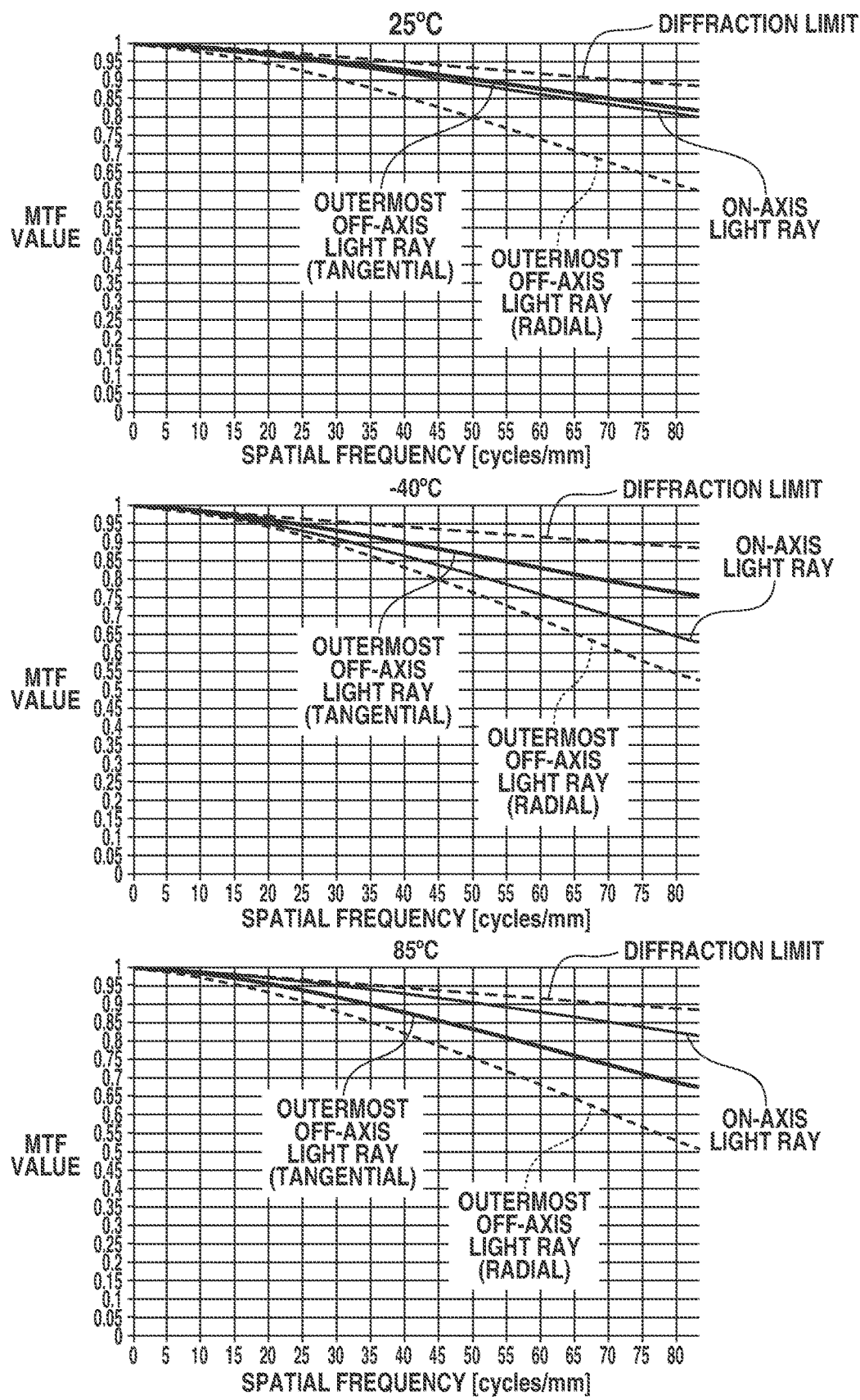
FIG. 14 is an MTF diagram of the optical system according to Example 7.

FIG. 14 is a diagram illustrating an MTF curve of the optical system according to this example. As illustrated in FIG. 14, the smallest value of an MTF value at a spatial frequency of 83 cycles/mm, which corresponds to a half value of a Nyquist frequency, is about 77% at the room temperature (25° C.), so that good image forming performance is achieved. At the low temperature (−40° C.) and the high temperature (85° C.), the smallest values of MTF values at a spatial frequency of 83 cycles/mm are about 51% and about 67%, respectively. In other words, it can be seen that, by the temperature compensation performed by the cemented lens AT7, good image forming performance can be maintained even in a case where an environmental temperature changes.

Example 8

Figure 15:
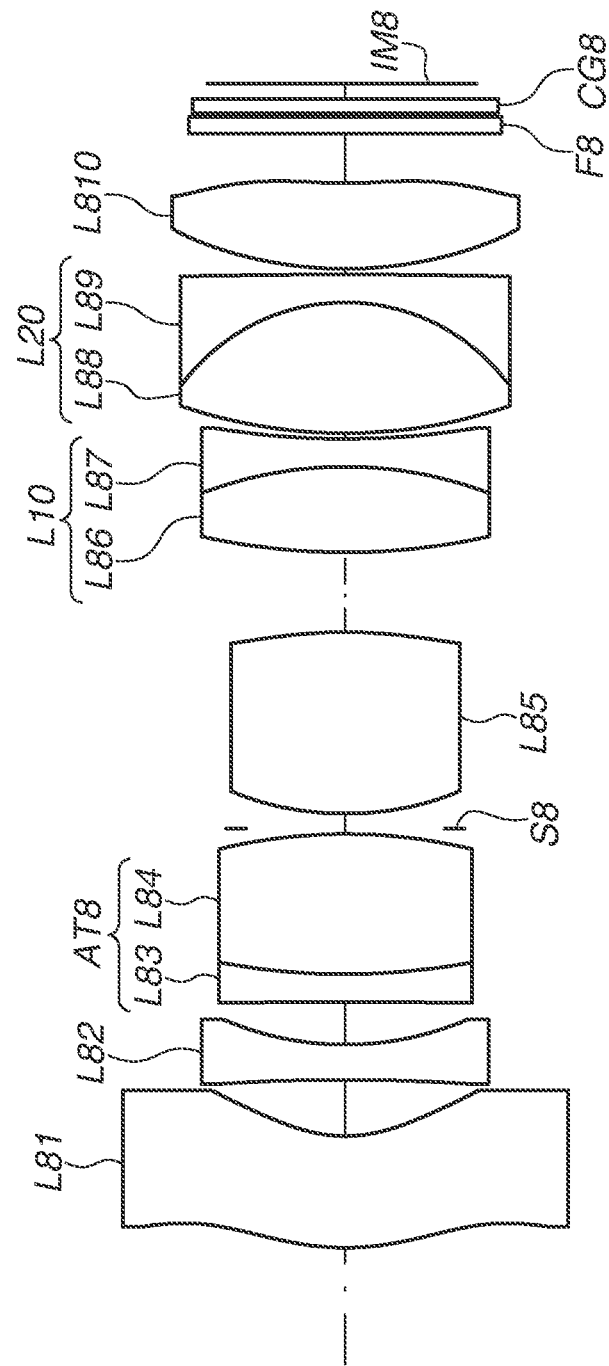
FIG. 15 is a main portion schematic diagram of an optical system according to Example 8.

Example 8 of the present invention will be described below. FIG. 15 is a schematic diagram of a main portion in a section including an optical axis of an optical system according to Example 8. Descriptions of components in the optical system according to the present example that are equivalent to those in the above-described optical system according to Example 1 will be omitted.

The optical system according to this example has a focal length of 9.00 mm and a half field angle of 60°. The optical system according to this example includes a negative lens L81, a negative lens L82, a cemented lens AT8, an aperture stop S8, a positive lens L85, a cemented lens L10, a cemented lens L20, and a negative lens L810 that are arranged in order from the object side to the image side. The cemented lens AT8 consists of a negative lens L83 and a positive lens L84 that are arranged in order from the object side to the image side, and the cemented lens L10 consists of a positive lens L86 and a negative lens L87 that are arranged in order from the object side to the image side. The cemented lens L20 consists of a positive lens L88 and a negative lens L89 that are arranged in order from the object side to the image side. A positive lens and a negative lens in each cemented lens are cemented to each other by a cementing member, such as an adhesive. An infrared cut filter F8 serving as an optical filter and a cover glass CG8 are arranged on the image side of the second negative lens L810, which is a final lens. In this example, the cemented lens AT8 functions as a cemented lens for temperature compensation, thus achieving both of the control of variation in focal position that is attributed to a change in environmental temperature, and the correction of various aberrations.

Figure 16:
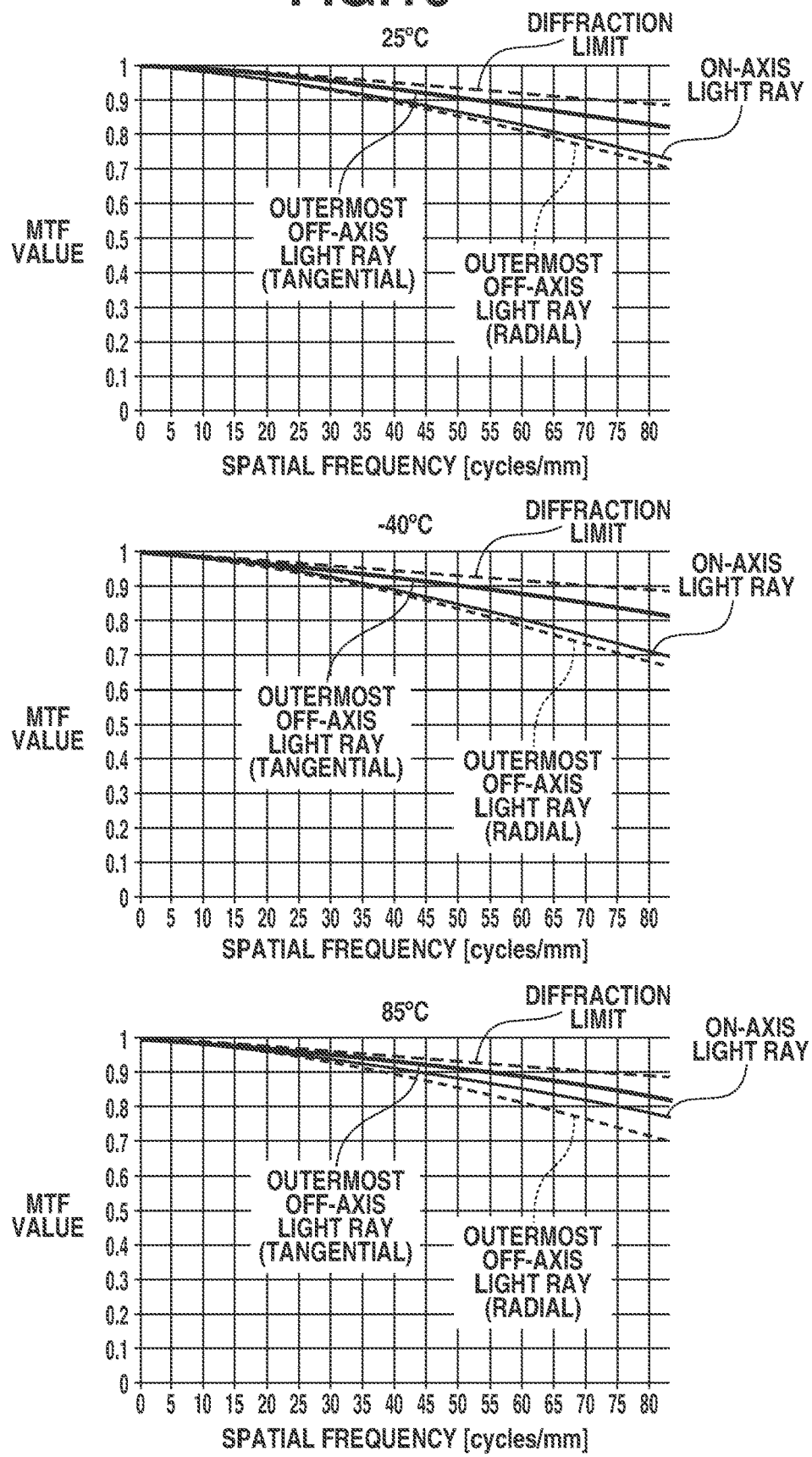
FIG. 16 is an MTF diagram of the optical system according to Example 8.

FIG. 16 is a diagram illustrating an MTF curve of the optical system according to this example. As illustrated in FIG. 16, the smallest value of an MTF value at a spatial frequency of 83 cycles/mm, which corresponds to a half value of a Nyquist frequency, is about 70% at the room temperature (25° C.), so that good image forming performance is achieved. At the low temperature (−40° C.) and the high temperature (85° C.), the smallest values of MTF values at a spatial frequency of 83 cycles/mm are about 67% and about 70%, respectively. In other words, it can be seen that, by the temperature compensation performed by the cemented lens AT8, good image forming performance can be maintained even in a case where an environmental temperature changes.

Example 9

Figure 17:
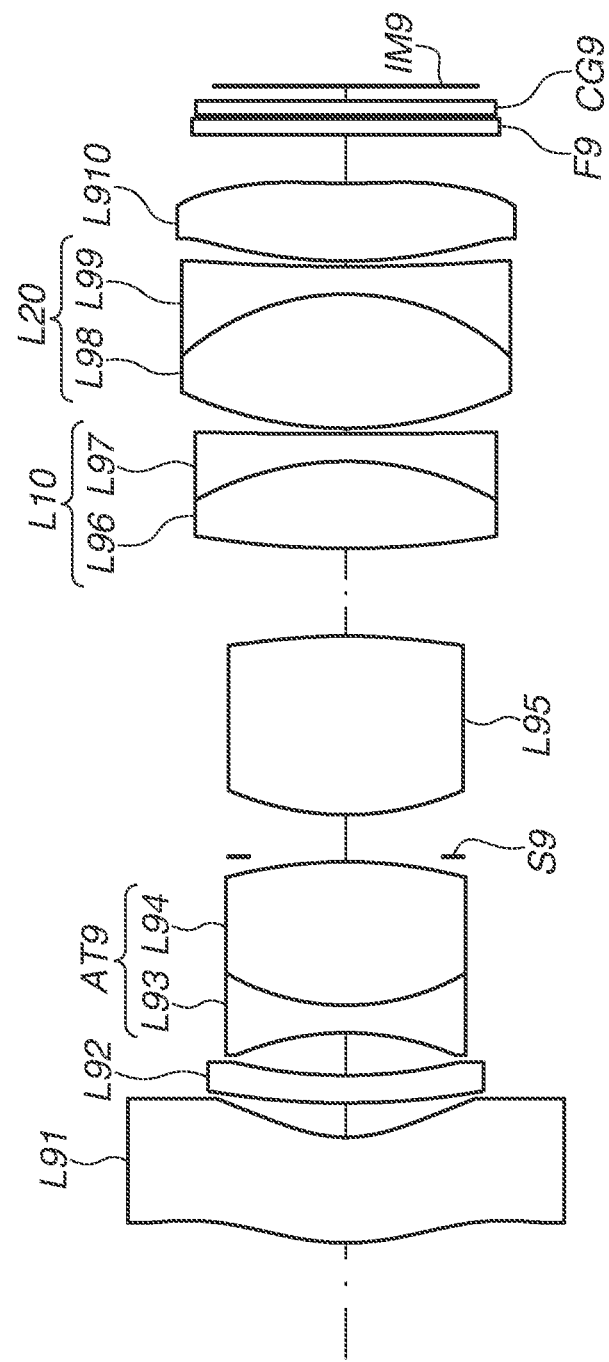
FIG. 17 is a main portion schematic diagram of an optical system according to Example 9.

Example 9 of the present invention will be described below. FIG. 17 is a schematic diagram of a main portion in a section including an optical axis of an optical system according to Example 9. Descriptions of components in the optical system according to the present example that are equivalent to those in the above-described optical system according to Example 1 will be omitted.

The optical system according to this example has a focal length of 9.00 mm and a half field angle of 60°. The optical system according to this example includes a negative lens L91, a negative lens L92, a cemented lens AT9, an aperture stop S9, a positive lens L95, a cemented lens L10, a cemented lens L20, and a negative lens L910 that are arranged in order from the object side to the image side. The cemented lens AT9 consists of a negative lens L93 and a positive lens L94 that are arranged in order from the object side to the image side, and the cemented lens L10 consists of a positive lens L96 and a negative lens L97 that are arranged in order from the object side to the image side. The cemented lens L20 consists of a positive lens L98 and a negative lens L99 that are arranged in order from the object side to the image side. A positive lens and a negative lens in each cemented lens are cemented to each other by a cementing member, such as an adhesive. An infrared cut filter F9 serving as an optical filter and a cover glass CG9 are arranged on the image side of the second negative lens L910, which is a final lens.

In this example, the cemented lens AT9 functions as a cemented lens for temperature compensation, thus achieving both of the control of variation in focal position that is attributed to a change in environmental temperature, and the correction of various aberrations.

Figure 18:
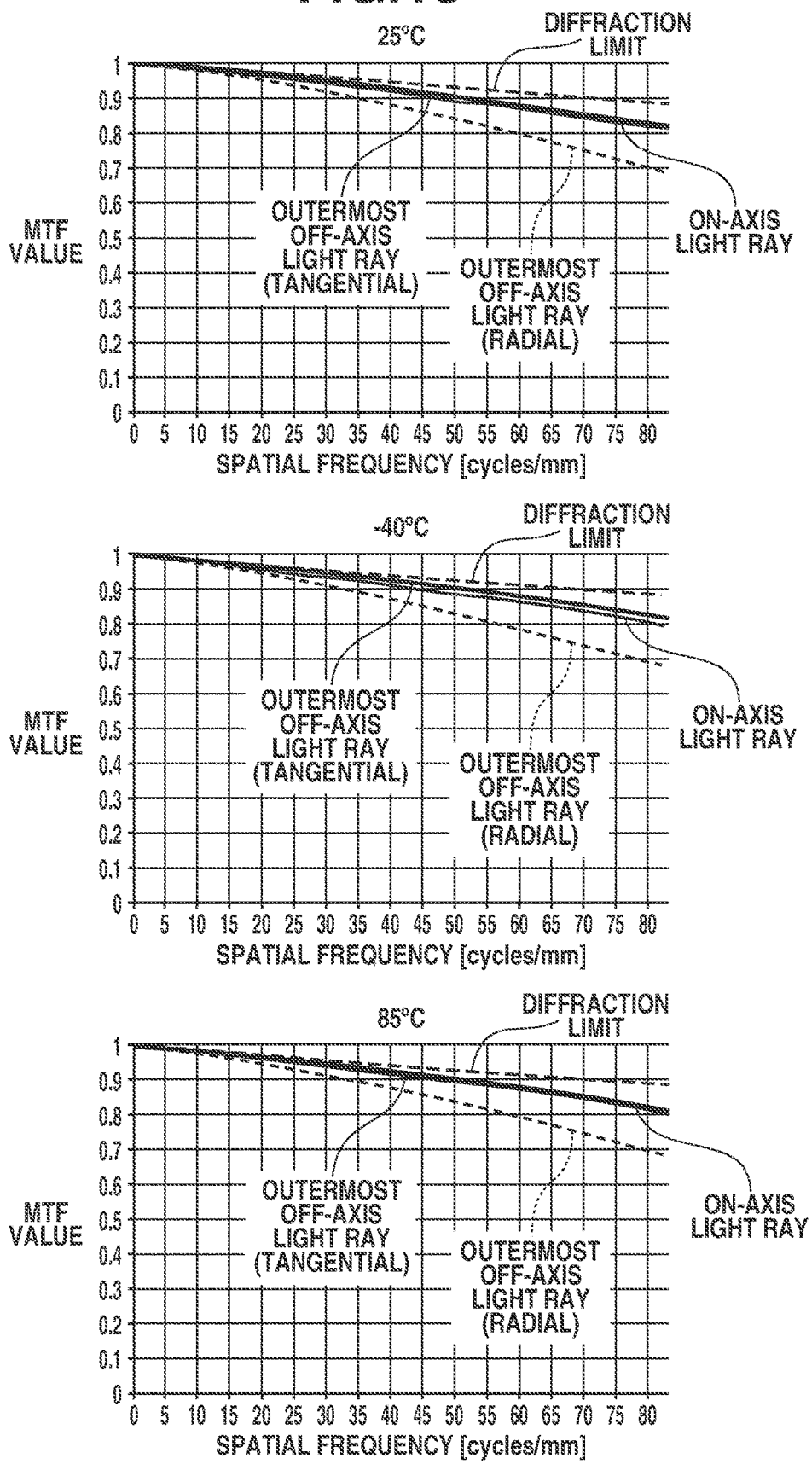
FIG. 18 is an MTF diagram of the optical system according to Example 9.

FIG. 18 is a diagram illustrating an MTF curve of the optical system according to this example. As illustrated in FIG. 18, the smallest value of an MTF value at a spatial frequency of 83 cycles/mm, which corresponds to a half value of a Nyquist frequency, is about 70% at the room temperature (25° C.), so that good image forming performance is achieved. At the low temperature (−40° C.) and the high temperature (85° C.), the smallest values of MTF values at a spatial frequency of 83 cycles/mm are about 69% and about 69%, respectively. In other words, it can be seen that, by the temperature compensation performed by the cemented lens AT9, good image forming performance can be maintained even in a case where an environmental temperature changes.

Reference Example 1

Figure 19:
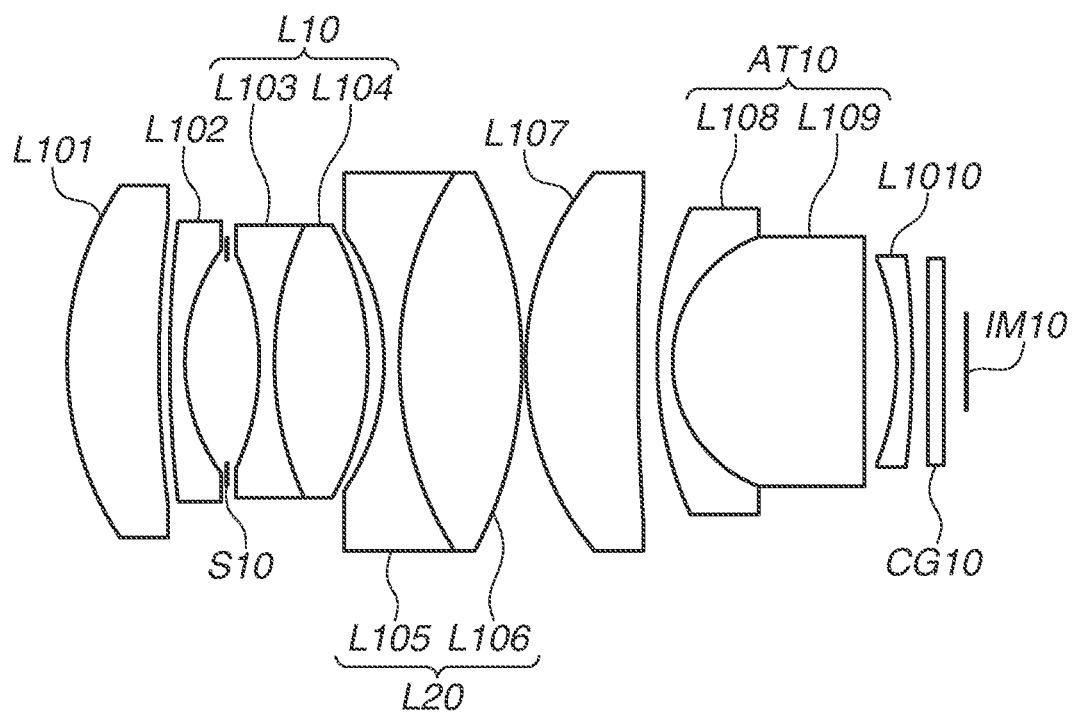
FIG. 19 is a main portion schematic diagram of an optical system according to Reference Example 1.

FIG. 19 is a schematic diagram of a main portion in a section including an optical axis of an optical system according to Reference Example 1. Descriptions of components in the optical system according to this reference example that are equivalent to those in the above-described optical system according to Example 1 will be omitted.

The optical system according to this reference example has a focal length of 16.15 mm and a half field angle of 17.5°. The optical system according to this reference example includes a first positive lens L101, a first negative lens L102, an aperture stop S10, a first cemented lens L10, a second cemented lens L20, a second positive lens L107, a third cemented lens AT10, and a second negative lens L1010 that are arranged in order from the object side to the image side. The first cemented lens L10 consists of a negative lens L103 and a positive lens L104 that are arranged in order from the object side to the image side, and the second cemented lens L20 consists of a negative lens L105 and a positive lens L106 that are arranged in order from the object side to the image side. The third cemented lens AT10 consists of a negative lens L108 and a positive lens L109 that are arranged in order from the object side to the image side. A positive lens and a negative lens in each cemented lens are cemented to each other by a cementing member, such as an adhesive. A cover glass CG1 is arranged on the image side of the second negative lens L1010, which is a final lens.

Figure 20:
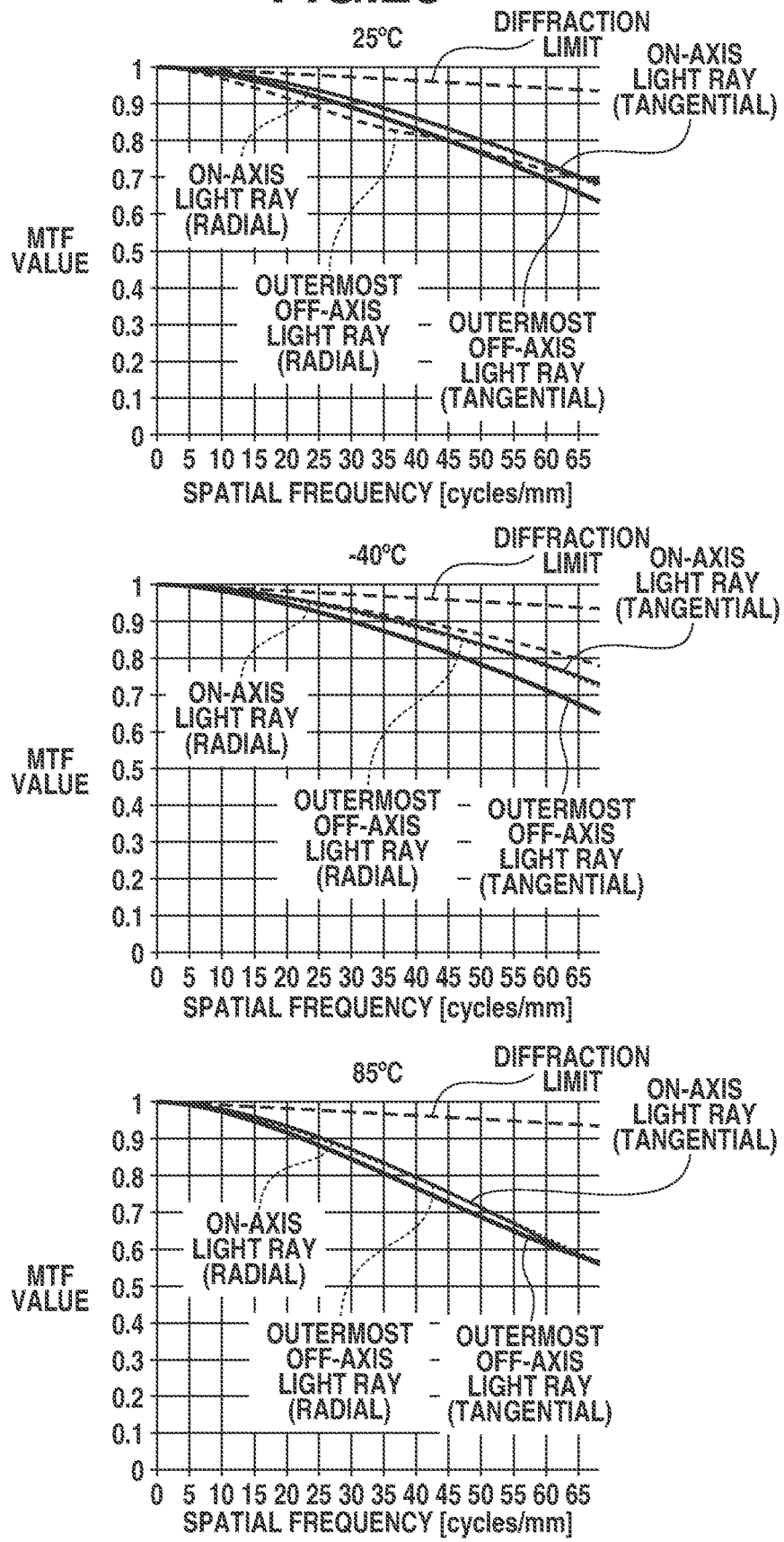
FIG. 20 is an MTF diagram of the optical system according to Reference Example 1.

FIG. 20 is a diagram illustrating an MTF curve of the optical system according to this reference example. As illustrated in FIG. 20, the smallest value of an MTF value at a spatial frequency of 68 cycles/mm, which corresponds to a half value of a Nyquist frequency, is about 68% at the room temperature (25° C.). At the low temperature (−40° C.) and the high temperature (85° C.), the smallest values of MTF values at a spatial frequency of 68 cycles/mm are about 65% and about 56%, respectively.

Reference Example 2

Figure 21:
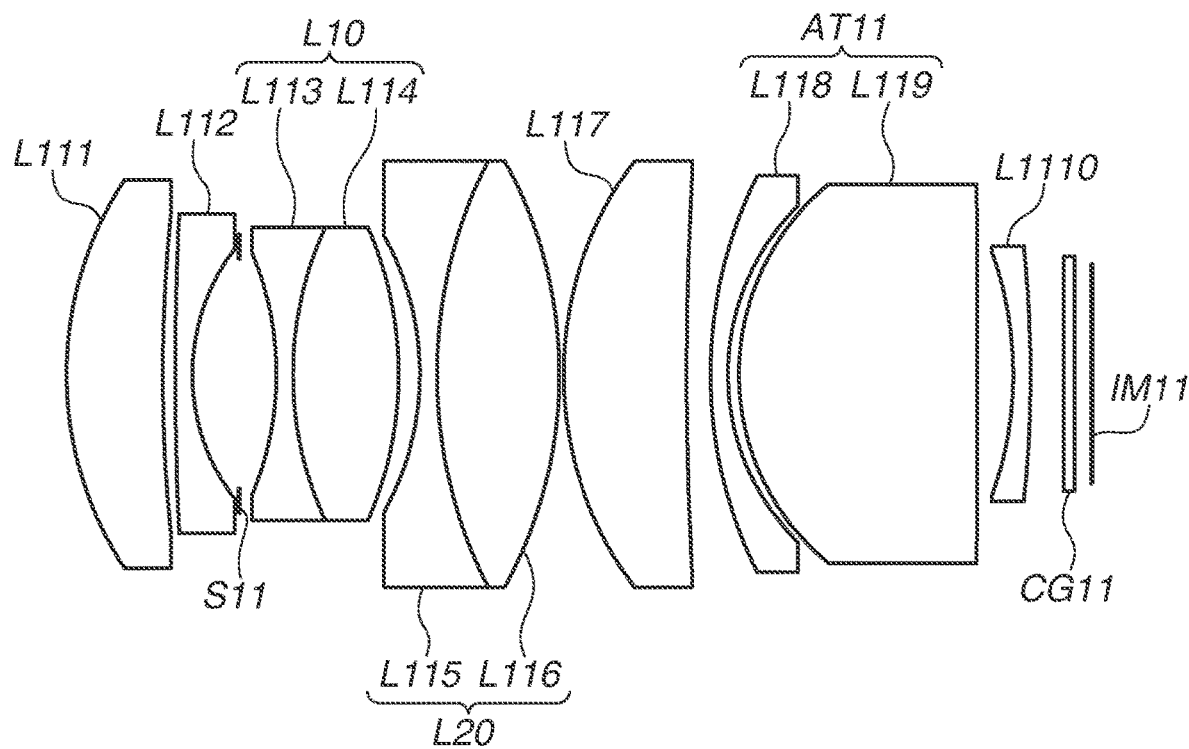
FIG. 21 is a main portion schematic diagram of an optical system according to Reference Example 2.

FIG. 21 is a schematic diagram of a main portion in a section including an optical axis of an optical system according to Reference Example 2. Descriptions of components in the optical system according to this reference example that are equivalent to those in the above-described optical system according to Example 1 will be omitted.

The optical system according to this reference example has a focal length of 16.15 mm and a half field angle of 17.5°. The optical system according to this reference example includes a first positive lens L111, a first negative lens L112, an aperture stop S11, a first cemented lens L10, a second cemented lens L20, a second positive lens L117, a lens unit AT11, and a fourth negative lens L1110 that are arranged in order from the object side to the image side. The first cemented lens L10 consists of a negative lens L113 and a positive lens L114 that are arranged in order from the object side to the image side, and the second cemented lens L20 consists of a negative lens L115 and a positive lens L116 that are arranged in order from the object side to the image side. The lens unit AT11 consists of a second negative lens L118 and a third positive lens L119 that are arranged in order from the object side to the image side. A cover glass CG3 is arranged between the fourth negative lens L1110, which is a final lens, and an image plane IM11.

Figure 22:
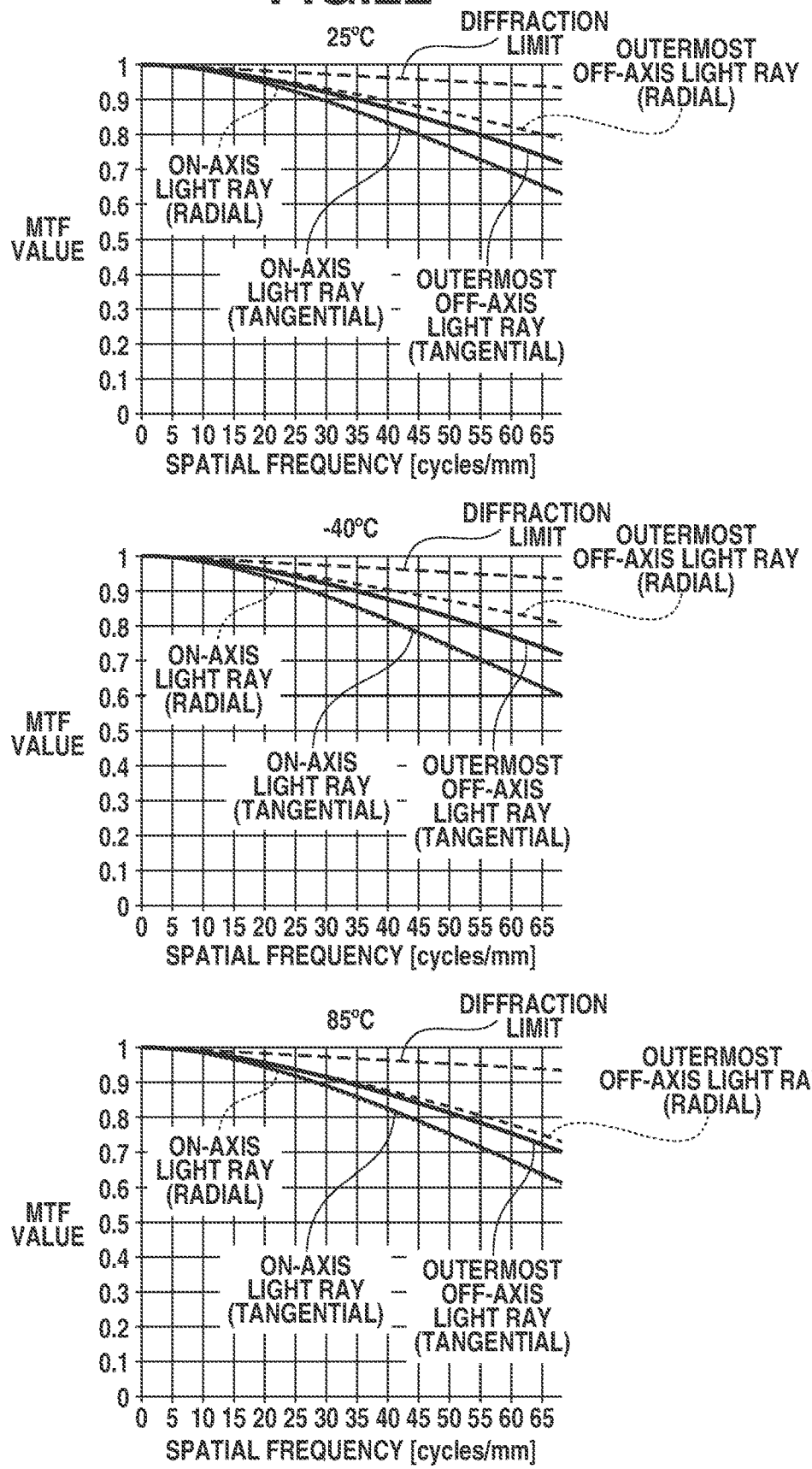
FIG. 22 is an MTF diagram of the optical system according to Reference Example 2.

FIG. 22 is a diagram illustrating an MTF curve of the optical system according to this reference example. As illustrated in FIG. 22, the smallest value of an MTF value at a spatial frequency of 68 cycles/mm, which corresponds to a half value of a Nyquist frequency, is about 63% at the room temperature (25° C.). At the low temperature (−40° C.) and the high temperature (85° C.), the smallest values of MTF values at a spatial frequency of 68 cycles/mm are about 60% and about 61%, respectively.

Numerical Examples

Hereinafter, Numerical Examples 1 to 11 corresponding to Examples 1 to 9 and Reference Examples 1 and 2, respectively, described above will be indicated. In each numerical example, a surface number indicates the number of each optical surface that is counted from an object surface, r[mm] denotes a curvature radius of an i-th optical surface, and d[mm] denotes an interval between the i-th optical surface and an (i+1)th optical surface. As the material (lens material) of each lens in each numerical example, other materials that have equivalent physicality may be used.

In each numerical example, "E±P" means "×10$^{±P}$". The shape of each aspherical surface is represented by the following equality (aspherical surface equality):

$$z = \frac{ch^2}{1 + \sqrt{1 - (1+k)c^2h^2}} + Ah^4 + Bh^6 + Ch^8 + Dh^{10} + Eh^{12} + Fh^{14}$$

where z denotes an amount of displacement from a surface vertex in an optical axis direction of each aspherical surface (such an amount is referred to as sagittal amount), h denotes a height from an optical axis in a radial direction, c denotes a curvature on the optical axis (such a curvature is an inverse of the curvature radius r), k denotes a conic coefficient, and A, B, C, D, E, and F denote aspherical surface coefficients. As represented by the aspherical surface equality, each aspherical surface in this example has a shape rotationally symmetric about an optical axis AX. A first term in the aspherical surface equality represents a sagittal amount of a base spherical surface (reference spherical surface) of which a curvature radius is R=1/c. Second and subsequent terms represent sagittal amounts of aspherical surface components to be added onto the base spherical surface.

Numerical Example 1

|  |  | r | d | Material |
|---|---|---|---|---|
| Surface data (−40° C.) | | | | |
| Object surface | | — | ∞ | |
| L11 | Aspherical surface 11 | 9.677 | 4.718 | MBACD12 |
|  | Aspherical surface 12 | 5.890 | 1.897 | |
| L12 | | 31.679 | 2.299 | STIH6 |
| L13 | | −14.740 | 1.230 | S-LAH60V |
| L14 | | 19.698 | 5.407 | S-LAH60MQ |
|  | | −22.592 | 3.895 | |
| S1 | | ∞ | 0.441 | |
| L15 | Aspherical surface 13 | 11.753 | 7.997 | MBACD12 |
|  | Aspherical surface 14 | −38.918 | 2.831 | |
| L16 | | 26.975 | 4.328 | SPHM53 |
| L17 | | −15.391 | 1.239 | STIM35 |
|  | | −2869.750 | 0.353 | |
| L18 | | 18.425 | 5.397 | SPHM52 |
| L19 | | −10.583 | 1.229 | STIH18 |
|  | | 26.596 | 0.297 | |
| L110 | Aspherical surface 15 | 17.192 | 3.399 | MBACD12 |
|  | Aspherical surface 16 | 27.162 | 1.780 | |
| F1 | | ∞ | 0.580 | NBK7 |
|  | | ∞ | 0.149 | |
| CG1 | | ∞ | 0.500 | NBK7 |
|  | | ∞ | 0.809 | |
| IM1 | | ∞ | — | — |
| Surface data (25° C.) | | | | |
| Object surface | | — | ∞ | |
| L11 | Aspherical surface 11 | 9.677 | 4.720 | MBACD12 |
|  | Aspherical surface 12 | 5.890 | 1.900 | |
| L12 | | 31.679 | 2.300 | STIH6 |
|  | | 16.518 | 2.030 | |
| L13 | | −14.740 | 1.230 | S-LAH60V |
| L14 | | 19.698 | 5.410 | S-LAH60MQ |
|  | | −22.592 | 3.900 | |
| S1 | | ∞ | 0.450 | |
| L15 | Aspherical surface 13 | 11.753 | 8.000 | MBACD12 |
|  | Aspherical surface 14 | −38.918 | 2.840 | |
| L16 | | 26.975 | 4.330 | SPHM53 |
| L17 | | −15.391 | 1.240 | STIM35 |
|  | | −2869.750 | 0.360 | |
| L18 | | 18.425 | 5.400 | SPHM52 |
| L19 | | −10.583 | 1.230 | STIH18 |
|  | | 26.596 | 0.300 | |
| L110 | Aspherical surface 15 | 17.192 | 3.400 | MBACD12 |
|  | Aspherical surface 16 | 27.162 | 1.784 | |
| F1 | | ∞ | 0.580 | NBK7 |
|  | | ∞ | 0.150 | |
| CG1 | | ∞ | 0.500 | NBK7 |
|  | | ∞ | 0.810 | |
| IM1 | | ∞ | — | — |
| Surface data (85° C.) | | | | |
| Object surface | | — | ∞ | |
| L11 | Aspherical surface 11 | 9.677 | 4.722 | MBACD12 |
|  | Aspherical surface 12 | 5.890 | 1.903 | |
| L12 | | 31.679 | 2.301 | STIH6 |
|  | | 16.518 | 2.039 | |
| L13 | | −14.740 | 1.230 | S-LAH60V |
| L14 | | 19.698 | 5.413 | S-LAH60MQ |
|  | | −22.592 | 3.905 | |
| S1 | | ∞ | 0.458 | |
| L15 | Aspherical surface 13 | 11.753 | 8.004 | MBACD12 |
|  | Aspherical surface 14 | −38.918 | 2.849 | |
| L16 | | 26.975 | 4.333 | SPHM53 |
| L17 | | −15.391 | 1.241 | STIM35 |
|  | | −2869.750 | 0.366 | |

-continued

| | | r | d | Material |
|---|---|---|---|---|
| L18 | | 18.425 | 5.404 | SPHM52 |
| L19 | | −10.583 | 1.231 | STIH18 |
| | | 26.596 | 0.303 | |
| L110 | Aspherical surface 15 | 17.192 | 3.402 | MBACD12 |
| | Aspherical surface 16 | 27.162 | 1.787 | |
| F1 | | ∞ | 0.580 | NBK7 |
| | | ∞ | 0.151 | |
| CG1 | | ∞ | 0.500 | NBK7 |
| | | ∞ | 0.811 | |
| IM1 | | ∞ | — | — |

Aspherical surface data

| | Aspherical surface 11 | Aspherical surface 12 | Aspherical surface 13 | Aspherical surface 14 | Aspherical surface 15 | Aspherical surface 16 |
|---|---|---|---|---|---|---|
| −40° C. | | | | | | |
| k | −5.628E+00 | −7.962E−01 | −4.536E−01 | −7.672E+00 | −9.275E+00 | 1.516E+00 |
| A | 3.068E−04 | −9.189E−04 | −9.825E−06 | 9.639E−05 | −1.440E−04 | −2.419E−03 |
| B | −1.684E−05 | −1.207E−05 | 1.536E−06 | 3.300E−06 | 3.760E−05 | 1.356E−04 |
| C | 2.353E−07 | 5.964E−07 | −5.751E−08 | −1.618E−07 | −1.887E−06 | −5.225E−06 |
| D | −1.584E−09 | −9.700E−09 | 2.729E−09 | 8.106E−09 | 5.013E−08 | 1.231E−07 |
| E | 5.206E−12 | 7.744E−11 | −6.536E−11 | −1.866E−10 | −6.924E−10 | −1.582E−09 |
| F | −6.181E−15 | −1.175E−13 | 7.261E−13 | 1.698E−12 | 3.897E−12 | 8.470E−12 |
| +25° C. | | | | | | |
| k | −5.628E+00 | −7.962E−01 | −4.536E−01 | −7.672E+00 | −9.275E+00 | 1.516E+00 |
| A | 3.064E−04 | −9.177E−04 | −9.813E−06 | 9.628E−05 | −1.438E−04 | −2.416E−03 |
| B | −1.681E−05 | −1.204E−05 | 1.532E−06 | 3.293E−06 | 3.752E−05 | 1.353E−04 |
| C | 2.346E−07 | 5.947E−07 | −5.735E−08 | −1.614E−07 | −1.881E−06 | −5.210E−06 |
| D | −1.578E−09 | −9.664E−09 | 2.719E−09 | 8.076E−09 | 4.994E−08 | 1.227E−07 |
| E | 5.183E−12 | 7.709E−11 | −6.507E−11 | −1.857E−10 | −6.893E−10 | −1.575E−09 |
| F | −6.148E−15 | −1.169E−13 | 7.223E−13 | 1.689E−12 | 3.877E−12 | 8.425E−12 |
| +85° C. | | | | | | |
| k | −5.628E+00 | −7.962E−01 | −4.536E−01 | −7.672E+00 | −9.275E+00 | 1.516E+00 |
| A | 3.060E−04 | −9.165E−04 | −9.799E−06 | 9.614E−05 | −1.436E−04 | −2.413E−03 |
| B | −1.677E−05 | −1.201E−05 | 1.529E−06 | 3.286E−06 | 3.744E−05 | 1.350E−04 |
| C | 2.339E−07 | 5.928E−07 | −5.717E−08 | −1.609E−07 | −1.875E−06 | −5.194E−06 |
| D | −1.571E−09 | −9.625E−09 | 2.708E−09 | 8.043E−09 | 4.974E−08 | 1.222E−07 |
| E | 5.156E−12 | 7.670E−11 | −6.474E−11 | −1.848E−10 | −6.858E−10 | −1.567E−09 |
| F | −6.112E−15 | −1.162E−13 | 7.180E−13 | 1.679E−12 | 3.854E−12 | 8.375E−12 |

Numerical Example 2

| | r | d | Material |
|---|---|---|---|
| Surface data (−40° C.) | | | |
| Object surface | — | ∞ | |
| S2 | — | 0.000 | |
| L21 | 22.748 | 2.929 | S-LAH99 |
| | 41.711 | 0.193 | |
| L22 | 22.091 | 2.603 | S-NSL36 |
| | 12.512 | 3.642 | |
| L23 | −14.408 | 0.800 | S-TIL26 |
| L24 | 32.620 | 5.182 | S-LAM73 |
| | −16.766 | 1.135 | |
| L25 | −12.498 | 0.800 | S-NBH56 |
| L26 | 37.698 | 5.432 | S-LAH89 |
| | −17.954 | 0.198 | |
| L27 | 16.674 | 5.875 | S-FPM2 |
| | 3299.746 | 0.187 | |
| L28 | 26.136 | 1.000 | S-NBH58 |
| L29 | 10.182 | 11.565 | S-LAH60MQ |
| | 79.032 | 1.750 | |
| L210 | −15.098 | 0.800 | S-LAH99 |
| | −44.743 | 0.948 | |
| CG2 | ∞ | 1.079 | N-BK7 |
| | ∞ | 0.809 | |
| IM2 | — | | |

-continued

| | r | d | Material |
|---|---|---|---|
| Surface data (25° C.) | | | |
| Object surface | — | ∞ | |
| S2 | — | 0.000 | |
| L21 | 22.758 | 2.930 | S-LAH99 |
| | 41.730 | 0.200 | |
| L22 | 22.102 | 2.604 | S-NSL36 |
| | 12.518 | 3.650 | |
| L23 | −14.415 | 0.800 | S-TIL26 |
| L24 | 32.637 | 5.185 | S-LAM73 |
| | −16.775 | 1.140 | |
| L25 | −12.504 | 0.800 | S-NBH56 |
| L26 | 37.715 | 5.434 | S-LAH89 |
| | −17.961 | 0.200 | |
| L27 | 16.686 | 5.879 | S-FPM2 |
| | 3302.081 | 0.200 | |
| L28 | 26.150 | 1.001 | S-NBH58 |
| L29 | 10.187 | 11.571 | S-LAH60MQ |
| | 79.052 | 1.750 | |
| L210 | −15.104 | 0.800 | S-LAH99 |
| | −44.763 | 0.950 | |
| CG2 | ∞ | 1.080 | N-BK7 |
| | ∞ | 0.810 | |
| IM2 | — | | |

|  | r | d | Material |
|---|---|---|---|
| Surface data (85° C.) | | | |
| Object surface | — | ∞ | |
| S2 | — | 0.000 | |
| L21 | 22.770 | 2.931 | S-LAH99 |
|  | 41.751 | 0.206 | |
| L22 | 22.113 | 2.605 | S-NSL36 |
|  | 12.525 | 3.663 | |
| L23 | −14.422 | 0.800 | S-TIL26 |
| L24 | 32.655 | 5.188 | S-LAM73 |
|  | −16.785 | 1.150 | |
| L25 | −12.511 | 0.800 | S-NBH56 |
| L26 | 37.732 | 5.437 | S-LAH89 |
|  | −17.968 | 0.202 | |

|  | r | d | Material |
|---|---|---|---|
| L27 | 16.699 | 5.884 | S-FPM2 |
|  | 3304.586 | 0.217 | |
| L28 | 26.165 | 1.001 | S-NBH58 |
| L29 | 10.192 | 11.577 | S-LAH60MQ |
|  | 79.074 | 1.757 | |
| L210 | −15.112 | 0.800 | S-LAH99 |
|  | −44.785 | 0.952 | |
| CG2 | ∞ | 1.081 | N-BK7 |
|  | ∞ | 0.811 | |
| IM2 | — | | |

Numerical Example 3

|  |  | r | d | Material |
|---|---|---|---|---|
| Surface data (−40° C.) | | | | |
| Object surface | | — | ∞ | |
| L31 | Aspherical surface 11 | 8.930 | 3.517 | MBACD12 |
|  | Aspherical surface 12 | 5.491 | 1.312 | |
| L32 |  | 61.371 | 1.000 | NBH53V |
|  |  | 15.236 | 1.710 | |
| L33 |  | −9.884 | 0.999 | PHM52Q |
| L34 |  | 8.702 | 5.018 | SFPM2 |
|  |  | −19.840 | 0.657 | |
| S3 |  | ∞ | 1.164 | |
| L35 | Aspherical surface 13 | 8.957 | 6.497 | MBACD12 |
|  | Aspherical surface 14 | −22.205 | 3.180 | |
| L36 |  | 30.640 | 3.403 | SPHM53 |
| L37 |  | −11.359 | 1.000 | STIM35 |
|  |  | 82.090 | 0.195 | |
| L38 |  | 14.157 | 5.245 | SPHM52 |
| L39 |  | −8.055 | 1.000 | STIH18 |
|  |  | 84.504 | 0.197 | |
| L310 | Aspherical surface 15 | 17.214 | 0.459 | MBACD12 |
|  | Aspherical surface 16 | 26.636 | 1.761 | |
| F3 |  | ∞ | 0.580 | NBK7 |
|  |  | ∞ | 0.149 | |
| CG3 |  | ∞ | 0.500 | NBK7 |
|  |  | ∞ | 0.539 | |
| IM3 |  | ∞ | — | — |
| Surface data (25° C.) | | | | |
| Object surface |  | — | ∞ | |
| L31 | Aspherical surface 11 | 8.934 | 3.518 | MBACD12 |
|  | Aspherical surface 12 | 5.493 | 1.314 | |
| L32 |  | 61.397 | 1.000 | NBH53V |
|  |  | 15.242 | 1.729 | |
| L33 |  | 9.890 | 1.000 | PHM52Q |
| L34 |  | 8.708 | 5.021 | SFPM2 |
|  |  | −19.855 | 0.644 | |
| S3 |  | ∞ | 1.172 | |
| L35 | Aspherical surface 13 | 8.960 | 6.500 | MBACD12 |
|  | Aspherical surface 14 | −22.214 | 3.188 | |
| L36 |  | 30.663 | 3.405 | SPHM53 |
| L37 |  | −11.365 | 1.000 | STIM35 |
|  |  | 82.091 | 0.200 | |
| L38 |  | 14.168 | 5.249 | SPHM52 |
| L39 |  | −8.059 | 1.000 | STIH18 |
|  |  | 84.395 | 0.200 | |
| L310 | Aspherical surface 15 | 17.221 | 0.460 | MBACD12 |
|  | Aspherical surface 16 | 26.647 | 1.764 | |
| F3 |  | ∞ | 0.580 | NBK7 |
|  |  | ∞ | 0.150 | |
| CG3 |  | ∞ | 0.500 | NBK7 |
|  |  | ∞ | 0.540 | |
| IM3 |  | ∞ | — | — |

-continued

| | | Surface data (85° C.) | | | |
|---|---|---|---|---|---|
| Object surface | | | — | ∞ | |
| L31 | | Aspherical surface 11 | 8.938 | 3.520 | MBACD12 |
| | | Aspherical surface 12 | 5.496 | 1.317 | |
| L32 | | | 61.426 | 1.000 | NBH53V |
| | | | 15.249 | 1.749 | |
| L33 | | | −9.895 | 1.001 | PHM52Q |
| L34 | | | 8.713 | 5.025 | SFPM2 |
| | | | −19.869 | 0.631 | |
| S3 | | | ∞ | 1.181 | |
| L35 | | Aspherical surface 13 | 8.964 | 6.503 | MBACD12 |
| | | Aspherical surface 14 | −22.224 | 3.196 | |
| L36 | | | 30.686 | 3.407 | SPHM53 |
| L37 | | | −11.371 | 1.000 | STIM35 |
| | | | 82.092 | 0.205 | |
| L38 | | | 14.178 | 5.252 | SPHM52 |
| L39 | | | −8.064 | 1.001 | STIH18 |
| | | | 84.284 | 0.203 | |
| L310 | | Aspherical surface 15 | 17.229 | 0.460 | MBACD12 |
| | | Aspherical surface 16 | 26.659 | 1.768 | |
| F3 | | | ∞ | 0.580 | NBK7 |
| | | | ∞ | 0.151 | |
| CG3 | | | ∞ | 0.500 | NBK7 |
| | | | ∞ | 0.541 | |
| IM3 | | | ∞ | — | — |

| | Aspherical surface data | | | | |
|---|---|---|---|---|---|
| Aspherical surface 11 | Aspherical surface 12 | Aspherical surface 13 | Aspherical surface 14 | Aspherical surface 15 | Aspherical surface 16 |
| −40° C. | | | | | |
| k  −9.154E+00 | −6.532E−01 | −5.764E−01 | −6.767E+00 | −1.000E+01 | −4.816E+00 |
| A  5.206E−04 | −2.225E−03 | −4.986E−05 | 1.993E−04 | −4.540E−04 | −3.867E−03 |
| B  −7.401E−05 | −4.528E−05 | 1.008E−05 | 1.117E−05 | 5.780E−05 | 2.226E−04 |
| C  2.358E−06 | 5.720E−06 | −8.182E−07 | −7.183E−07 | −3.007E−06 | −8.964E−06 |
| D  −3.751E−08 | −2.150E−07 | 5.726E−08 | 5.243E−08 | 8.347E−08 | 2.375E−07 |
| E  3.137E−10 | 4.084E−09 | −1.925E−09 | −1.686E−09 | −1.201E−09 | −3.719E−09 |
| F  −1.104E−12 | −2.922E−11 | 2.522E−11 | 2.196E−11 | 4.962E−12 | 2.434E−11 |
| +25° C. | | | | | |
| k  −5.628E+00 | −7.962E−01 | −4.536E−01 | −7.672E+00 | −9.275E+00 | 1.516E+00 |
| A  3.064E−04 | −9.177E−04 | −9.813E−06 | 9.628E−05 | −1.438E−04 | −2.416E−03 |
| B  −1.681E−05 | −1.204E−05 | 1.532E−06 | 3.293E−06 | 3.752E−05 | 1.353E−04 |
| C  2.346E−07 | 5.947E−07 | −5.735E−08 | −1.614E−07 | −1.881E−06 | −5.210E−06 |
| D  −1.578E−09 | −9.664E−09 | 2.719E−09 | 8.076E−09 | 4.994E−08 | 1.227E−07 |
| E  5.183E−12 | 7.709E−11 | −6.507E−11 | −1.857E−10 | −6.893E−10 | −1.575E−09 |
| F  −6.148E−15 | −1.169E−13 | 7.223E−13 | 1.689E−12 | 3.877E−12 | 8.425E−12 |
| +85° C. | | | | | |
| k  −5.628E+00 | −7.962E−01 | −4.536E−01 | −7.672E+00 | −9.275E+00 | 1.516E+00 |
| A  3.060E−04 | −9.165E−04 | −9.799E−06 | 9.614E−05 | −1.436E−04 | −2.413E−03 |
| B  −1.677E−05 | −1.201E−05 | 1.529E−06 | 3.286E−06 | 3.744E−05 | 1.350E−04 |
| C  2.339E−07 | 5.928E−07 | −5.717E−08 | −1.609E−07 | −1.875E−06 | −5.194E−06 |
| D  −1.571E−09 | −9.625E−09 | 2.708E−09 | 8.043E−09 | 4.974E−08 | 1.222E−07 |
| E  5.156E−12 | 7.670E−11 | −6.474E−11 | −1.848E−10 | −6.858E−10 | −1.567E−09 |
| F  −6.112E−15 | −1.162E−13 | 7.180E−13 | 1.679E−12 | 3.854E−12 | 8.375E−12 |

Numerical Example 4

| | | | r | d | Material |
|---|---|---|---|---|---|
| | | Surface data (−40° C.) | | | |
| Object surface | | | — | ∞ | |
| L41 | | Aspherical surface 11 | 8.970 | 3.633 | MBACD12 |
| | | Aspherical surface 12 | 6.061 | 1.071 | |
| L42 | | | 39.360 | 1.000 | NBH53V |
| | | | 10.668 | 1.847 | |
| L43 | | | −10.461 | 0.999 | SLAL20 |
| L44 | | | −88.715 | 5.019 | SBAH27 |
| | | | −20.765 | 0.760 | |
| S4 | | | ∞ | 0.570 | |

-continued

| | | | | | |
|---|---|---|---|---|---|
| L45 | Aspherical surface 13 | 8.757 | 6.497 | MBACD12 | |
| | Aspherical surface 14 | −25.669 | 2.837 | | |
| L46 | | 26.717 | 3.515 | SPHM53 | |
| L47 | | −10.573 | 1.000 | STIM35 | |
| | | 179.856 | 0.195 | | |
| L48 | | 13.910 | 5.092 | SPHM52 | |
| L49 | | −8.384 | 1.000 | STIH18 | |
| | | 116.593 | 0.197 | | |
| L410 | Aspherical surface 15 | 16.391 | 0.328 | MBACD12 | |
| | Aspherical surface 16 | 20.091 | 1.778 | | |
| F4 | | ∞ | 0.580 | NBK7 | |
| | | ∞ | 0.149 | | |
| CG4 | | ∞ | 0.500 | NBK7 | |
| | | ∞ | 0.539 | | |
| IM4 | | ∞ | — | — | |

Surface data (25° C.)

| | | | | | |
|---|---|---|---|---|---|
| Object surface | | — | ∞ | | |
| L41 | Aspherical surface 11 | 8.973 | 3.635 | MBACD12 | |
| | Aspherical surface 12 | 6.064 | 1.073 | | |
| L42 | | 39.376 | 1.000 | NBH53V | |
| | | 10.672 | 1.874 | | |
| L43 | | −10.467 | 1.000 | SLAL20 | |
| L44 | | −88.757 | 5.021 | SBAH27 | |
| | | −20.774 | 0.741 | | |
| S4 | | ∞ | 0.577 | | |
| L45 | Aspherical surface 13 | 8.760 | 6.500 | MBACD12 | |
| | Aspherical surface 14 | −25.679 | 2.845 | | |
| L46 | | 26.737 | 3.51 | SPHM53 | |
| L47 | | −10.578 | 1.000 | STIM35 | |
| | | 179.575 | 0.200 | | |
| L48 | | 13.920 | 5.095 | SPHM52 | |
| L49 | | −8.389 | 1.000 | STIH18 | |
| | | 116.293 | 0.200 | | |
| L410 | Aspherical surface 15 | 20.099 | 0.329 | MBACD12 | |
| | Aspherical surface 16 | 16.398 | 1.781 | | |
| F4 | | ∞ | 0.580 | NBK7 | |
| CG4 | | ∞ | 0.150 | | |
| | | ∞ | 0.500 | NBK7 | |
| | | ∞ | 0.540 | | |
| IM4 | | ∞ | — | — | |

Surface data (85° C.)

| | | | | | |
|---|---|---|---|---|---|
| Object surface | | — | ∞ | | |
| L41 | Aspherical surface 11 | 8.978 | 3.636 | MBACD12 | |
| | Aspherical surface 12 | 6.067 | 1.075 | | |
| L42 | | 39.395 | 1.000 | NBH53V | |
| | | 10.677 | 1.902 | | |
| L43 | | −10.473 | 1.001 | SLAL20 | |
| L44 | | −88.800 | 5.023 | SBAH27 | |
| | | −20.782 | 0.722 | | |
| S4 | | ∞ | 0.584 | | |
| L45 | Aspherical surface 13 | 8.764 | 6.503 | MBACD12 | |
| | Aspherical surface 14 | −25.691 | 2.853 | | |
| L46 | | 26.757 | 3.519 | SPHM53 | |
| L47 | | −10.584 | 1.000 | STIM35 | |
| | | 179.291 | 0.205 | | |
| L48 | | 13.930 | 5.099 | SPHM52 | |
| L49 | | −8.394 | 1.001 | STIH18 | |
| | | 115.991 | 0.203 | | |
| L410 | Aspherical surface 15 | 16.406 | 0.329 | MBACD12 | |
| | Aspherical surface 16 | 20.109 | 1.784 | | |
| F4 | | ∞ | 0.580 | NBK7 | |
| | | ∞ | 0.151 | | |
| CG4 | | ∞ | 0.500 | NBK7 | |
| | | ∞ | 0.541 | | |
| IM4 | | ∞ | — | — | |

Aspherical surface data

| | Aspherical surface 11 | Aspherical surface 12 | Aspherical surface 13 | Aspherical surface 14 | Aspherical surface 15 | Aspherical surface 16 |
|---|---|---|---|---|---|---|
| | | | −40° C. | | | |
| k | −9.190E+00 | −7.335E−01 | −5.922E−01 | −7.381E+00 | −1.000E+01 | −5.917E+00 |
| A | 5.949E−04 | −2.058E−03 | −5.546E−05 | 2.180E−04 | −5.403E−04 | −3.862E−03 |
| B | −6.879E−05 | −3.744E−05 | 9.601E−06 | 1.051E−05 | 6.704E−05 | 2.319E−04 |
| C | 1.936E−06 | 4.544E−06 | −7.724E−07 | −6.763E−07 | −3.488E−06 | −9.891E−06 |

-continued

|   |   |   |   |   |   |   |
|---|---|---|---|---|---|---|
| D | −2.673E−08 | −1.505E−07 | 5.323E−08 | 5.427E−08 | 9.752E−08 | 2.787E−07 |
| E | 1.874E−10 | 2.432E−09 | −1.712E−09 | −1.896E−09 | −1.391E−09 | −4.626E−09 |
| F | −5.242E−13 | −1.423E−11 | 2.203E−11 | 2.557E−11 | 5.265E−12 | 3.192E−11 |
|   |   |   | +25° C. |   |   |   |
| k | −9.190E+00 | −7.335E−01 | −5.922E−01 | −7.381E+00 | −1.000E+01 | −5.917E+00 |
| A | 5.942E−04 | −2.055E−03 | −5.539E−05 | 2.177E−04 | −5.396E−04 | −3.857E−03 |
| B | −6.865E−05 | −3.737E−05 | 9.582E−06 | 1.049E−05 | 6.690E−05 | 2.314E−04 |
| C | 1.930E−06 | 4.531E−06 | −7.702E−07 | −6.743E−07 | −3.478E−06 | −9.863E−06 |
| D | −2.663E−08 | −1.499E−07 | 5.303E−08 | 5.407E−08 | 9.716E−08 | 2.777E−07 |
| E | 1.865E−10 | 2.421E−09 | −1.705E−09 | −1.887E−09 | −1.385E−09 | −4.606E−09 |
| F | −5.215E−13 | −1.415E−11 | 2.191E−11 | 2.544E−11 | 5.238E−12 | 3.176E−11 |
|   |   |   | +85° C. |   |   |   |
| k | −9.190E+00 | −7.335E−01 | −5.922E−01 | −7.381E+00 | −1.000E+01 | −5.917E+00 |
| A | 5.934E−04 | −2.053E−03 | −5.531E−05 | 2.174E−04 | −5.389E−04 | −3.851E−03 |
| B | −6.849E−05 | 3.728E−05 | 9.560E−06 | 1.046E−05 | 6.675E−05 | 2.309E−04 |
| C | 1.924E−06 | 4.517E−06 | −7.677E−07 | −6.722E−07 | −3.467E−06 | −9.831E−06 |
| D | −2.652E−08 | −1.493E−07 | 5.282E−08 | 5.385E−08 | 9.676E−08 | 2.765E−07 |
| E | 1.856E−10 | 2.409E−09 | −1.696E−09 | −1.878E−09 | −1.378E−09 | −4.583E−09 |
| F | −5.184E−13 | −1.407E−11 | 2.178E−11 | 2.528E−11 | 5.206E−12 | 3.157E−11 |

Numerical Example 5

|   |   | r | d | Material |
|---|---|---|---|---|
|   | Surface data (−40° C.) |   |   |   |
| Object surface |   | — | ∞ |   |
| L51 | Aspherical surface 11 | 8.996 | 3.998 | MBACD12 |
|   | Aspherical surface 12 | 5.493 | 1.156 |   |
| L52 |   | 37.845 | 0.999 | SLAM2 |
|   |   | 13.269 | 1.605 |   |
| L53 |   | −10.112 | 1.000 | SNBH56 |
| L54 |   | 2651.954 | 5.019 | SNPH1W |
|   |   | −16.951 | 0.244 |   |
| S5 |   | ∞ | 1.053 |   |
| L55 | Aspherical surface 13 | 8.718 | 6.497 | MBACD12 |
|   | Aspherical surface 14 | −24.273 | 1.763 |   |
| L56 |   | 64.958 | 2.777 | SPHM53 |
| L57 |   | −10.579 | 2.241 | STIM35 |
|   |   | 21812.038 | 0.580 |   |
| L58 |   | 13.835 | 5.375 | SPHM52 |
| L59 |   | −7.819 | 1.000 | STIH18 |
|   |   | −435.051 | 0.197 |   |
| L510 | Aspherical surface 15 | 17.977 | 0.417 | MBACD12 |
|   | Aspherical surface 16 | 21.120 | 1.766 |   |
| F5 |   | ∞ | 0.580 | NBK7 |
|   |   | ∞ | 0.149 |   |
| CG5 |   | ∞ | 0.500 | NBK7 |
|   |   | ∞ | 0.539 |   |
| IM5 |   | ∞ | — | — |
|   | Surface data (25° C.) |   |   |   |
| Object surface |   | — | ∞ |   |
| L51 | Aspherical surface 11 | 9.000 | 4.000 | MBACD12 |
|   | Aspherical surface 12 | 5.495 | 1.158 |   |
| L52 |   | 37.862 | 0.999 | SLAM2 |
|   |   | 13.275 | 1.626 |   |
| L53 |   | −10.116 | 1.000 | SNBH56 |
| L54 |   | 2653.270 | 5.021 | SNPH1W |
|   |   | −16.960 | 0.230 |   |
| S5 |   | ∞ | 1.061 |   |
| L55 | Aspherical surface 13 | 8.721 | 6.500 | MBACD12 |
|   | Aspherical surface 14 | −24.282 | 1.770 |   |
| L56 |   | 65.018 | 2.778 | SPHM53 |
| L57 |   | −10.584 | 2.242 | STIM35 |
|   |   | 19570.571 | 0.586 |   |
| L58 |   | 13.845 | 5.378 | SPHM52 |
| L59 |   | −7.824 | 1.000 | STIH18 |
|   |   | −436.630 | 0.200 |   |
| L510 | Aspherical surface 15 | 17.985 | 0.418 | MBACD12 |
|   | Aspherical surface 16 | 21.129 | 1.769 |   |
| F5 |   | ∞ | 0.580 | NBK7 |
|   |   | ∞ | 0.150 |   |

-continued

| | | r | d | Material |
|---|---|---|---|---|
| CG5 | | ∞ | 0.500 | NBK7 |
| | | ∞ | 0.540 | |
| IM5 | | ∞ | — | — |

Surface data (85° C.)

| | | r | d | Material |
|---|---|---|---|---|
| Object surface | | — | ∞ | |
| L51 | Aspherical surface 11 | 9.004 | 4.002 | MBACD12 |
| | Aspherical surface 12 | 5.498 | 1.161 | |
| L52 | | 37.881 | 1.000 | SLAM2 |
| | | 13.281 | 1.648 | |
| L53 | | −10.121 | 1.001 | SNBH56 |
| L54 | | 2654.607 | 5.024 | SNPH1W |
| | | −16.969 | 0.216 | |
| S5 | | ∞ | 1.069 | |
| L55 | Aspherical surface 13 | 8.725 | 6.503 | MBACD12 |
| | Aspherical surface 14 | −24.294 | 1.776 | |
| L56 | | 65.079 | 2.780 | SPHM53 |
| L57 | | −10.590 | 2.243 | STIM35 |
| | | 17721.983 | 0.592 | |
| L58 | | 13.855 | 5.382 | SPHM52 |
| L59 | | −7.828 | 1.001 | STIH18 |
| | | −438.245 | 0.203 | |
| L510 | Aspherical surface 15 | 17.993 | 0.418 | MBACD12 |
| | Aspherical surface 16 | 21.138 | 1.773 | |
| F5 | | ∞ | 0.580 | NBK7 |
| | | ∞ | 0.151 | |
| CG5 | | ∞ | 0.500 | NBK7 |
| | | ∞ | 0.541 | |
| IM5 | | ∞ | — | — |

Aspherical surface data

| | Aspherical surface 11 | Aspherical surface 12 | Aspherical surface 13 | Aspherical surface 14 | Aspherical surface 15 | Aspherical surface 16 |
|---|---|---|---|---|---|---|
| | | | −40° C. | | | |
| k | −8.959E+00 | −7.507E−01 | −7.012E−01 | −4.836E+00 | −1.000E+01 | −2.707E+00 |
| A | 5.884E−04 | −2.099E−03 | −2.784E−05 | 2.487E−04 | −4.308E−04 | −3.900E−03 |
| B | −6.399E−05 | −3.974E−05 | 1.124E−05 | 1.120E−05 | 5.308E−05 | 2.213E−04 |
| C | 1.792E−06 | 5.055E−06 | −1.090E−06 | −8.474E−07 | −2.446E−06 | −8.876E−06 |
| D | −2.527E−08 | −1.793E−07 | 7.785E−08 | 6.723E−08 | 5.376E−08 | 2.390E−07 |
| E | 1.858E−10 | 3.187E−09 | −2.554E−09 | −2.371E−09 | −4.124E−10 | −3.939E−09 |
| F | −5.681E−13 | −2.155E−11 | 3.174E−11 | 3.148E−11 | −4.598E−12 | 2.711E−11 |
| | | | +25° C. | | | |
| k | −8.959E+00 | −7.507E−01 | −7.012E−01 | −4.836E+00 | −1.000E+01 | −2.707E+00 |
| A | 5.877E−04 | −2.096E−03 | −2.781E−05 | 2.484E−04 | −4.303E−04 | −3.895E−03 |
| B | −6.386E−05 | −3.966E−05 | 1.122E−05 | 1.118E−05 | 5.297E−05 | 2.209E−04 |
| C | 1.787E−06 | 5.040E−06 | −1.087E−06 | −8.449E−07 | −2.439E−06 | −8.851E−06 |
| D | −2.518E−08 | −1.787E−07 | 7.757E−08 | 6.698E−08 | 5.357E−08 | 2.381E−07 |
| E | 1.850E−10 | 3.173E−09 | −2.543E−09 | −2.360E−09 | −4.106E−10 | −3.921E−09 |
| F | −5.651E−13 | −2.144E−11 | 3.157E−11 | 3.131E−11 | −4.574E−12 | 2.697E−11 |
| | | | +85° C. | | | |
| k | −8.959E+00 | −7.507E−01 | −7.012E−01 | −4.836E+00 | −1.000E+01 | −2.707E+00 |
| A | 5.869E−04 | −2.093E−03 | −2.777E−05 | 2.480E−04 | −4.297E−04 | −3.890E−03 |
| B | −6.371E−05 | −3.957E−05 | 1.119E−05 | 1.115E−05 | 5.285E−05 | 2.204E−04 |
| C | 1.781E−06 | 5.024E−06 | −1.083E−06 | −8.422E−07 | −2.431E−06 | −8.822E−06 |
| D | −2.508E−08 | −1.780E−07 | 7.725E−08 | 6.671E−08 | 5.335E−08 | 2.371E−07 |
| E | 1.841E−10 | 3.157E−09 | −2.530E−09 | −2.348E−09 | −4.085E−10 | −3.901E−09 |
| F | −5.618E−13 | −2.131E−11 | 3.138E−11 | 3.113E−11 | −4.547E−12 | 2.681E−11 |

Numerical Example 6

| | | r | d | Material |
|---|---|---|---|---|
| | | Surface data (−40° C.) | | |
| Object surface | | — | ∞ | |
| L61 | Aspherical surface 11 | 8.925 | 3.998 | MBACD12 |
| | Aspherical surface 12 | 4.942 | 1.590 | |
| L62 | | 107.935 | 1.108 | NBH53V |
| | | 19.469 | 1.184 | |
| L63 | | −12.803 | 0.999 | SBAL3 |

-continued

| | | | | |
|---|---|---|---|---|
| L64 | | −6855.330 | 5.019 | SBAH27 |
| | | −27.780 | 1.836 | |
| S6 | | ∞ | 1.132 | |
| L65 | Aspherical surface 13 | 8.689 | 6.497 | MBACD12 |
| | Aspherical surface 14 | −23.652 | 1.004 | |
| L66 | | 32.008 | 3.228 | SPHM53 |
| L67 | | −12.654 | 1.000 | STIM35 |
| | | 68.868 | 0.194 | |
| L68 | | 15.183 | 5.524 | SPHM52 |
| L69 | | 6.712 | 1.000 | STIH18 |
| | | −276.765 | 0.197 | |
| L610 | Aspherical surface 15 | 16.027 | 0.164 | MBACD12 |
| | Aspherical surface 16 | 20.105 | 1.779 | |
| F6 | | ∞ | 0.580 | NBK7 |
| | | ∞ | 0.149 | |
| CG6 | | ∞ | 0.500 | NBK7 |
| | | ∞ | 0.539 | |
| IM6 | | ∞ | — | — |
| Surface data (25° C.) | | | | |
| Object surface | | — | ∞ | |
| L61 | Aspherical surface 11 | 8.929 | 4.000 | MBACD12 |
| | Aspherical surface 12 | 4.944 | 1.593 | |
| L62 | | 107.980 | 1.108 | NBH53V |
| | | 19.477 | 1.195 | |
| L63 | | −12.811 | 1.000 | SBAL3 |
| L64 | | −6858.709 | 5.021 | SBAH27 |
| | | −27.791 | 1.834 | |
| S6 | | ∞ | 1.141 | |
| L65 | Aspherical surface 13 | 8.693 | 6.500 | MBACD12 |
| | Aspherical surface 14 | −23.661 | 1.009 | |
| L66 | | 32.032 | 3.230 | SPHM53 |
| L67 | | −12.661 | 1.000 | STIM35 |
| | | 68.864 | 0.200 | |
| L68 | | 15.194 | 5.528 | SPHM52 |
| L69 | | −6.715 | 1.000 | STIH18 |
| | | −277.226 | 0.200 | |
| L610 | Aspherical surface 15 | 16.033 | 0.164 | MBACD12 |
| | Aspherical surface 16 | 20.113 | 1.782 | |
| F6 | | ∞ | 0.580 | NBK7 |
| | | ∞ | 0.150 | |
| CG6 | | ∞ | 0.500 | NBK7 |
| | | ∞ | 0.540 | |
| IM6 | | ∞ | — | — |
| Surface data (85° C.) | | | | |
| Object surface | | — | ∞ | |
| L61 | Aspherical surface 11 | 8.933 | 4.002 | MBACD12 |
| | Aspherical surface 12 | 4.946 | 1.595 | |
| L62 | | 108.031 | 1.109 | NBH53V |
| | | 19.487 | 1.206 | |
| L63 | | −12.818 | 1.00 | SBAL3 |
| L64 | | −6862.145 | 5.023 | SBAH27 |
| | | −27.802 | 1.833 | |
| S6 | | ∞ | 1.149 | |
| L65 | Aspherical surface 13 | 8.697 | 6.503 | MBACD12 |
| | Aspherical surface 14 | −23.672 | 1.014 | |
| L66 | | 32.056 | 3.232 | SPHM53 |
| L67 | | −12.668 | 1.000 | STIM35 |
| | | 68.859 | 0.205 | |
| L68 | | 15.206 | 5.531 | SPHM52 |
| L69 | | −6.719 | 1.001 | STIH18 |
| | | −277.696 | 0.203 | |
| L610 | Aspherical surface 15 | 16.041 | 0.164 | MBACD12 |
| | Aspherical surface 16 | 20.122 | 1.785 | |
| F6 | | ∞ | 0.580 | NBK7 |
| | | ∞ | 0.151 | |
| CG6 | | ∞ | 0.500 | NBK7 |
| | | ∞ | 0.541 | |
| IM6 | | ∞ | — | — |

Aspherical surface data

| | Aspherical surface 11 | Aspherical surface 12 | Aspherical surface 13 | Aspherical surface 14 | Aspherical surface 15 | Aspherical surface 16 |
|---|---|---|---|---|---|---|
| | | | −40° C. | | | |
| k | −8.801E+00 | −6.671E−01 | −4.324E−01 | −1.315E+01 | −1.000E+01 | 5.597E−02 |
| A | 5.902E−04 | −2.053E−03 | −6.468E−05 | 1.717E−04 | −3.750E−04 | −3.659E−03 |
| B | −6.283E−05 | −4.449E−05 | 6.817E−06 | 9.379E−06 | 5.852E−05 | 2.173E−04 |
| C | 1.746E−06 | 4.880E−06 | −3.776E−07 | −3.342E−07 | −2.846E−06 | −8.988E−06 |
| D | −2.485E−08 | −1.699E−07 | 2.648E−08 | 2.248E−08 | 7.298E−08 | 2.480E−07 |
| E | 1.881E−10 | 3.028E−09 | −9.735E−10 | −6.519E−10 | −9.169E−10 | −4.148E−09 |
| F | −6.055E−13 | −2.029E−11 | 1.498E−11 | 9.849E−12 | 1.559E−12 | 2.920E−11 |
| | | | +25° C. | | | |
| k | −8.801E+00 | −6.671E−01 | −4.324E−01 | −1.315E+01 | −1.000E+01 | 5.597E−02 |
| A | 5.895E−04 | −2.051E−03 | −6.460E−05 | 1.715E−04 | −3.746E−04 | −3.655E−03 |
| B | −6.270E−05 | −4.440E−05 | 6.803E−06 | 9.360E−06 | 5.841E−05 | 2.169E−04 |
| C | 1.741E−06 | 4.866E−06 | −3.765E−07 | −3.332E−07 | −2.838E−06 | −8.962E−06 |
| D | −2.476E−08 | −1.692E−07 | 2.638E−08 | 2.240E−08 | 7.272E−08 | 2.471E−07 |
| E | 1.872E−10 | 3.015E−09 | −9.692E−10 | −6.490E−10 | −9.128E−10 | −4.129E−09 |
| F | −6.023E−13 | −2.018E−11 | 1.490E−11 | 9.797E−12 | 1.551E−12 | 2.905E−11 |
| | | | +85° C. | | | |
| k | −8.801E+00 | −6.671E−01 | −4.324E−01 | −1.315E+01 | −1.000E+01 | 5.597E−02 |
| A | 5.886E−04 | −2.048E−03 | −6.451E−05 | 1.713E−04 | −3.741E−04 | −3.650E−03 |
| B | −6.255E−05 | −4.430E−05 | 6.787E−06 | 9.339E−06 | 5.827E−05 | 2.164E−04 |
| C | 1.736E−06 | 4.851E−06 | −3.753E−07 | −3.322E−07 | −2.829E−06 | −8.933E−06 |
| D | −2.466E−08 | −1.685E−07 | 2.627E−08 | 2.231E−08 | 7.242E−08 | 2.461E−07 |
| E | 1.863E−10 | 2.999E−09 | −9.643E−10 | −6.457E−10 | −9.082E−10 | −4.109E−09 |
| F | −5.988E−13 | −2.006E−11 | 1.481E−11 | 9.739E−12 | 1.542E−12 | 2.887E−11 |

Numerical Example 7

| | | r | d | Material |
|---|---|---|---|---|
| | Surface data (−40° C.) | | | |
| Object surface | | — | ∞ | |
| L71 | Aspherical surface 11 | 8.996 | 3.849 | MBACD12 |
| | Aspherical surface 12 | 5.113 | 1.982 | |
| L72 | | −26.532 | 1.000 | NBH53V |
| | | 63.841 | 0.927 | |
| L73 | | −14.289 | 1.000 | LBAL35 |
| L74 | | ∞ | 5.019 | SLAM3 |
| | | −32.466 | 0.214 | |
| S7 | | ∞ | 1.152 | |
| L75 | Aspherical surface 13 | 8.961 | 6.497 | MBACD12 |
| | Aspherical surface 14 | −21.467 | 2.907 | |
| L76 | | 28.705 | 3.275 | SPHM53 |
| L77 | | −11.746 | 1.000 | STIM35 |
| | | −369.013 | 0.195 | |
| L78 | | 15.673 | 4.893 | SPHM52 |
| L79 | | −8.706 | 1.000 | STIH18 |
| | | 37.864 | 0.197 | |
| L710 | Aspherical surface 15 | 16.338 | 0.504 | MBACD12 |
| | Aspherical surface 16 | 29.041 | 1.749 | |
| F7 | | ∞ | 0.580 | NBK7 |
| | | ∞ | 0.149 | |
| CG7 | | ∞ | 0.500 | NBK7 |
| | | ∞ | 0.539 | |
| IM7 | | ∞ | — | — |
| | Surface data (25° C.) | | | |
| Object surface | | — | ∞ | |
| L71 | Aspherical surface 11 | 9.000 | 3.851 | MBACD12 |
| | Aspherical surface 12 | 5.115 | 1.985 | |
| L72 | | −26.543 | 1.000 | NBH53V |
| | | 63.867 | 0.948 | |
| L73 | | −14.295 | 1.000 | LBAL35 |
| L74 | | ∞ | 5.021 | SLAM3 |
| | | −32.482 | 0.200 | |
| S7 | | ∞ | 1.160 | |
| L75 | Aspherical surface 13 | 8.965 | 6.500 | MBACD12 |

-continued

|  |  |  |  |  |
|---|---|---|---|---|
|  | Aspherical surface 14 | −21.476 | 2.915 |  |
| L76 |  | 28.725 | 3.277 | SPHM53 |
| L77 |  | −11.752 | 1.000 | STIM35 |
|  |  | −369.833 | 0.200 |  |
| L78 |  | 15.684 | 4.896 | SPHM52 |
| L79 |  | −8.711 | 1.000 | STIH18 |
|  |  | 37.874 | 0.200 |  |
| L710 | Aspherical surface 15 | 16.345 | 0.504 | MBACD12 |
|  | Aspherical surface 16 | 29.053 | 1.752 |  |
| F7 |  | ∞ | 0.580 | NBK7 |
|  |  | ∞ | 0.150 |  |
| CG7 |  | ∞ | 0.500 | NBK7 |
|  |  | ∞ | 0.540 |  |
| IM7 |  | ∞ | — | — |

Surface data (85° C.)

|  |  |  |  |  |
|---|---|---|---|---|
| Object surface |  | — | ∞ |  |
| L71 | Aspherical surface 11 | 9.004 | 3.853 | MBACD12 |
|  | Aspherical surface 12 | 5.118 | 1.987 |  |
| L72 |  | −26.556 | 1.000 | NBH53V |
|  |  | 63.898 | 0.970 |  |
| L73 |  | −14.301 | 1.000 | LBAL35 |
| L74 |  | ∞ | 5.024 | SLAM3 |
|  |  | −32.498 | 0.186 |  |
| S7 |  | ∞ | 1.168 |  |
| L75 | Aspherical surface 13 | 8.969 | 6.503 | MBACD12 |
|  | Aspherical surface 14 | −21.486 | 2.923 |  |
| L76 |  | 28.746 | 3.279 | SPHM53 |
| L77 |  | −11.758 | 1.000 | STIM35 |
|  |  | −370.669 | 0.205 |  |
| L78 |  | 15.696 | 4.899 | SPHM52 |
| L79 |  | −8.716 | 1.001 | STIH18 |
|  |  | 37.885 | 0.203 |  |
| L710 | Aspherical surface 15 | 16.352 | 0.505 | MBACD12 |
|  | Aspherical surface 16 | 29.066 | 1.756 |  |
| F7 |  | ∞ | 0.580 | NBK7 |
|  |  | ∞ | 0.151 |  |
| CG7 |  | ∞ | 0.500 | NBK7 |
|  |  | ∞ | 0.541 |  |
| IM7 |  | ∞ | — | — |

Aspherical surface data

| | Aspherical surface 11 | Aspherical surface 12 | Aspherical surface 13 | Aspherical surface 14 | Aspherical surface 15 | Aspherical surface 16 |
|---|---|---|---|---|---|---|
| −40° C. | | | | | | |
| k | −9.972E+00 | −5.898E−01 | −6.155E−01 | −7.976E+00 | −1.000E+01 | 9.846E−02 |
| A | 5.926E−04 | −2.393E−03 | −6.767E−05 | 1.611E−04 | −2.182E−04 | −3.919E−03 |
| B | −7.262E−05 | −3.738E−05 | 8.501E−06 | 1.154E−05 | 5.758E−05 | 2.416E−04 |
| C | 2.274E−06 | 5.318E−06 | −6.445E−07 | −7.464E−07 | −3.548E−06 | −1.061E−05 |
| D | −3.656E−08 | −2.022E−07 | 4.268E−08 | 5.415E−08 | 1.290E−07 | 3.254E−07 |
| E | 3.145E−10 | 3.990E−09 | −1.320E−09 | −1.784E−09 | −2.555E−09 | −5.935E−09 |
| F | −1.156E−12 | −3.028E−11 | 1.726E−11 | 2.360E−11 | 2.048E−11 | 4.626E−11 |
| +25° C. | | | | | | |
| k | −9.972E+00 | −5.898E−01 | −6.155E−01 | −7.976E+00 | −1.000E+01 | 9.846E−02 |
| A | 5.919E−04 | −2.390E−03 | −6.759E−05 | 1.609E−04 | −2.179E−04 | −3.914E−03 |
| B | −7.247E−05 | −3.731E−05 | 8.484E−06 | 1.151E−05 | 5.746E−05 | 2.411E−04 |
| C | 2.267E−06 | 5.302E−06 | −6.427E−07 | −7.443E−07 | −3.538E−06 | −1.058E−05 |
| D | −3.643E−08 | −2.015E−07 | 4.252E−08 | 5.395E−08 | 1.285E−07 | 3.242E−07 |
| E | 3.130E−10 | 3.972E−09 | −1.314E−09 | −1.776E−09 | −2.543E−09 | −5.909E−09 |
| F | −1.150E−12 | −3.012E−11 | 1.717E−11 | 2.347E−11 | 2.037E−11 | 4.602E−11 |
| +85° C. | | | | | | |
| k | −9.972E+00 | −5.898E−01 | −6.155E−01 | −7.976E+00 | −1.000E+01 | 9.846E−02 |
| A | 5.911E−04 | 2.387E−03 | −6.750E−05 | 1.607E−04 | −2.176E−04 | −3.909E−03 |
| B | −7.230E−05 | −3.722E−05 | 8.465E−06 | 1.149E−05 | 5.733E−05 | 2.405E−04 |
| C | 2.260E−06 | 5.285E−06 | −6.406E−07 | −7.419E−07 | −3.527E−06 | −1.055E−05 |
| D | −3.628E−08 | −2.006E−07 | 4.235E−08 | 5.373E−08 | 1.280E−07 | 3.229E−07 |
| E | 3.115E−10 | 3.952E−09 | −1.307E−09 | −1.768E−09 | −2.530E−09 | −5.879E−09 |
| F | −1.143E−12 | −2.994E−11 | 1.707E−11 | 2.333E−11 | 2.025E−11 | 4.575E−11 |

Numerical Example 8

|  |  | r | d | Material |
|---|---|---|---|---|
| Surface data (−40° C.) | | | | |
| Object surface |  | — | ∞ |  |
| L81 | Aspherical surface 11 | 9.050 | 3.998 | MBACD12 |
|  | Aspherical surface 12 | 4.971 | 2.009 |  |
| L82 |  | −71.186 | 1.260 | NBH53V |
|  |  | 11.073 | 1.514 |  |
| L83 |  | −333.033 | 0.999 | SNPH7 |
| L84 |  | ∞ | 5.019 | STIM35 |
|  |  | −19.111 | 0.200 |  |
| S8 |  | ∞ | 0.514 |  |
| L85 | Aspherical surface 13 | 11.235 | 6.497 | MBACD12 |
|  | Aspherical surface 14 | −17.047 | 2.846 |  |
| L86 |  | 23.474 | 3.065 | SPHM53 |
| L87 |  | −14.486 | 1.000 | STIM35 |
|  |  | 29.307 | 0.195 |  |
| L88 |  | 18.269 | 4.677 | SPHM52 |
| L89 |  | −7.298 | 1.000 | STIH18 |
|  |  | −262.548 | 0.197 |  |
| L810 | Aspherical surface 15 | 13.483 | 0.369 | MBACD12 |
|  | Aspherical surface 16 | 17.566 | 1.777 |  |
| F8 |  | ∞ | 0.580 | NBK7 |
|  |  | ∞ | 0.149 |  |
| CG8 |  | ∞ | 0.500 | NBK7 |
|  |  | ∞ | 0.539 |  |
| IM8 |  | ∞ | — | — |
| Surface data (25° C.) | | | | |
| Object surface |  | — | ∞ |  |
| L81 | Aspherical surface 11 | 9.054 | 4.000 | MBACD12 |
|  | Aspherical surface 12 | 4.974 | 2.012 |  |
| L82 |  | −71.216 | 1.260 | NBH53V |
|  |  | 11.077 | 1.521 |  |
| L83 |  | −333.259 | 1.000 | SNPH7 |
| L84 |  | ∞ | 5.021 | STIM35 |
|  |  | −19.120 | 0.200 |  |
| S8 |  | ∞ | 0.522 |  |
| L85 | Aspherical surface 13 | 11.240 | 6.500 | MBACD12 |
|  | Aspherical surface 14 | −17.054 | 2.854 |  |
| L86 |  | 23.493 | 3.067 | SPHM53 |
| L87 |  | −14.494 | 1.000 | STIM35 |
|  |  | 29.067 | 0.200 |  |
| L88 |  | 18.282 | 4.680 | SPHM52 |
| L89 |  | −7.302 | 1.000 | STIH18 |
|  |  | −262.596 | 0.200 |  |
| L810 | Aspherical surface 15 | 13.489 | 0.369 | MBACD12 |
|  | Aspherical surface 16 | 17.574 | 1.781 |  |
| F8 |  | ∞ | 0.580 | NBK7 |
|  |  | ∞ | 0.150 |  |
| CG8 |  | ∞ | 0.500 | NBK7 |
|  |  | ∞ | 0.540 |  |
| IM8 |  | ∞ | — | — |
| Surface data (85° C.) | | | | |
| Object surface |  | — | ∞ |  |
| L81 | Aspherical surface 11 | 9.058 | 4.002 | MBACD12 |
|  | Aspherical surface 12 | 4.976 | 2.016 |  |
| L82 |  | −71.250 | 1.261 | NBH53V |
|  |  | 11.083 | 1.528 |  |
| L83 |  | −333.487 | 1.001 | SNPH7 |
| L84 |  | ∞ | 5.024 | STIM35 |
|  |  | −19.129 | 0.200 |  |
| S8 |  | ∞ | 0.529 |  |
| L85 | Aspherical surface 13 | 11.245 | 6.503 | MBACD12 |
|  | Aspherical surface 14 | −17.062 | 2.861 |  |
| L86 |  | 23.512 | 3.069 | SPHM53 |
| L87 |  | −14.501 | 1.000 | STIM35 |
|  |  | 28.827 | 0.205 |  |
| L88 |  | 18.296 | 4.683 | SPHM52 |
| L89 |  | −7.306 | 1.001 | STIH18 |
|  |  | −262.645 | 0.203 |  |

|  |  | L810 | Aspherical surface 15 | 13.495 | 0.369 | MBACD12 |
|  |  |  | Aspherical surface 16 | 17.582 | 1.784 |  |
|  |  | F8 |  | ∞ | 0.580 | NBK7 |
|  |  |  |  | ∞ | 0.151 |  |
|  |  | CG8 |  | ∞ | 0.500 | NBK7 |
|  |  |  |  | ∞ | 0.541 |  |
|  |  | IM8 |  | ∞ | — | — |

| Aspherical surface data | | | | | |
|---|---|---|---|---|---|
| Aspherical surface 11 | Aspherical surface 12 | Aspherical surface 13 | Aspherical surface 14 | Aspherical surface 15 | Aspherical surface 16 |
| −40° C. | | | | | |
| k | −9.243E+00 | −6.687E−01 | 3.263E−01 | −3.754E+00 | −1.000E+01 | −8.320E+00 |
| A | 6.243E−04 | −1.709E−03 | 1.981E−05 | 1.273E−04 | −1.143E−04 | −3.629E−03 |
| B | −6.172E−05 | −4.920E−05 | 6.402E−06 | 1.087E−05 | 5.093E−05 | 2.042E−04 |
| C | 1.580E−06 | 4.329E−06 | −5.241E−07 | −7.039E−07 | −3.343E−06 | −9.140E−06 |
| D | −2.056E−08 | −1.291E−07 | 4.019E−08 | 5.280E−08 | 1.238E−07 | 2.922E−07 |
| E | 1.411E−10 | 1.846E−09 | −1.388E−09 | −1.756E−09 | −2.483E−09 | −5.486E−09 |
| F | −4.071E−13 | −8.635E−12 | 1.896E−11 | 2.348E−11 | 2.094E−11 | 4.442E−11 |
| +25° C. | | | | | |
| k | −9.243E+00 | −6.687E−01 | 3.263E−01 | −3.754E+00 | −1.000E+01 | −8.320E+00 |
| A | 6.236E−04 | −1.707E−03 | 1.979E−05 | 1.271E−04 | −1.141E−04 | −3.625E−03 |
| B | −6.159E−05 | −4.910E−05 | 6.389E−06 | 1.085E−05 | 5.083E−05 | 2.038E−04 |
| C | 1.575E−06 | 4.316E−06 | −5.226E−07 | −7.019E−07 | −3.333E−06 | −9.114E−06 |
| D | −2.048E−08 | −1.286E−07 | 4.004E−08 | 5.261E−08 | 1.233E−07 | 2.911E−07 |
| E | 1.405E−10 | 1.837E−09 | −1.382E−09 | −1.748E−09 | −2.472E−09 | −5.461E−09 |
| F | −4.050E−13 | −8.589E−12 | 1.886E−11 | 2.336E−11 | 2.083E−11 | 4.419E−11 |
| +85° C. | | | | | |
| k | −9.243E+00 | −6.687E−01 | 3.263E−01 | −3.754E+00 | −1.000E+01 | −8.320E+00 |
| A | 6.227E−04 | −1.704E−03 | 1.976E−05 | 1.270E−04 | −1.140E−04 | −3.620E−03 |
| B | −6.145E−05 | −4.899E−05 | 6.374E−06 | 1.083E−05 | 5.071E−05 | 2.033E−04 |
| C | 1.570E−06 | 4.302E−06 | −5.209E−07 | −6.996E−07 | −3.323E−06 | −9.085E−06 |
| D | −2.040E−08 | −1.281E−07 | 3.987E−08 | 5.239E−08 | 1.228E−07 | 2.899E−07 |
| E | 1.398E−10 | 1.828E−09 | −1.375E−09 | −1.740E−09 | −2.459E−09 | −5.434E−09 |
| F | −4.026E−13 | −8.538E−12 | 1.875E−11 | 2.322E−11 | 2.071E−11 | 4.393E−11 |

Numerical Example 9

|  |  | r | d | Material |
|---|---|---|---|---|
| Surface data (−40° C.) | | | | |
| Object surface |  | — | ∞ |  |
| L91 | Aspherical surface 11 | 8.996 | 3.837 | MBACD12 |
|  | Aspherical surface 12 | 5.016 | 1.240 |  |
| L92 |  | 28.821 | 0.999 | STIH53W |
|  |  | 17.614 | 1.527 |  |
| L93 |  | −10.154 | 1.000 | S-LAH60V |
| L94 |  | ∞ | 5.217 | S-LAH60MQ |
|  |  | −17.070 | 0.205 |  |
| S9 |  | ∞ | 1.502 |  |
| L95 | Aspherical surface 13 | 10.376 | 6.497 | MBACD12 |
|  | Aspherical surface 14 | −22.281 | 3.176 |  |
| L96 |  | 33.255 | 3.162 | SPHM53 |
| L97 |  | −11.300 | 1.000 | STIM35 |
|  |  | 223.278 | 0.195 |  |
| L98 |  | 14.168 | 4.877 | SPHM52 |
| L99 |  | −9.032 | 1.000 | STIH18 |
|  |  | 73.054 | 0.197 |  |
| L910 | Aspherical surface 15 | 16.002 | 0.380 | MBACD12 |
|  | Aspherical surface 16 | 19.911 | 1.767 |  |
| F9 |  | ∞ | 0.580 | NBK7 |
|  |  | ∞ | 0.149 |  |
| CG9 |  | ∞ | 0.500 | NBK7 |
|  |  | ∞ | 0.539 |  |
| IM9 |  | ∞ | — | — |

| Surface data (25° C.) | | | | | |
|---|---|---|---|---|---|
| Object surface | | — | ∞ | | |
| L91 | Aspherical surface 11 | 9.000 | 3.838 | MBACD12 | |
| | Aspherical surface 12 | 5.018 | 1.242 | | |
| L92 | | 28.837 | 1.000 | STIH53W | |
| | | 17.623 | 1.541 | | |
| L93 | | −10.157 | 1.000 | S-LAH60V | |
| L94 | | ∞ | 5.220 | S-LAH60MQ | |
| | | −17.079 | 0.200 | | |
| S9 | | ∞ | 1.511 | | |
| L95 | Aspherical surface 13 | 10.380 | 6.500 | MBACD12 | |
| | Aspherical surface 14 | −22.290 | 3.184 | | |
| L96 | | 33.280 | 3.164 | SPHM53 | |
| L97 | | −11.306 | 1.000 | STIM35 | |
| | | 223.136 | 0.200 | | |
| L98 | | 14.178 | 4.880 | SPHM52 | |
| L99 | | −9.037 | 1.000 | STIH18 | |
| | | 73.058 | 0.200 | | |
| L910 | Aspherical surface 15 | 16.009 | 0.380 | MBACD12 | |
| | Aspherical surface 16 | 19.919 | 1.771 | | |
| F9 | | ∞ | 0.580 | NBK7 | |
| | | ∞ | 0.150 | | |
| CG9 | | ∞ | 0.500 | NBK7 | |
| | | ∞ | 0.540 | | |
| IM9 | | ∞ | — | — | |
| Surface data (85° C.) | | | | | |
| Object surface | | — | ∞ | | |
| L91 | Aspherical surface 11 | 9.004 | 3.840 | MBACD12 | |
| | Aspherical surface 12 | 5.020 | 1.244 | | |
| L92 | | 28.853 | 1.001 | STIH53W | |
| | | 17.633 | 1.554 | | |
| L93 | | −10.161 | 1.000 | S-LAH60V | |
| L94 | | ∞ | 5.223 | S-LAH60MQ | |
| | | −17.088 | 0.195 | | |
| S9 | | ∞ | 1.519 | | |
| L95 | Aspherical surface 13 | 10.385 | 6.503 | MBACD12 | |
| | Aspherical surface 14 | −22.300 | 3.192 | | |
| L96 | | 33.305 | 3.165 | SPHM53 | |
| L97 | | −11.312 | 1.000 | STIM35 | |
| | | 222.992 | 0.205 | | |
| L98 | | 14.188 | 4.883 | SPHM52 | |
| L99 | | −9.042 | 1.001 | STIH18 | |
| | | 73.063 | 0.203 | | |
| L910 | Aspherical surface 15 | 16.016 | 0.380 | MBACD12 | |
| | Aspherical surface 16 | 19.928 | 1.774 | | |
| F9 | | ∞ | 0.580 | NBK7 | |
| | | ∞ | 0.151 | | |
| CG9 | | ∞ | 0.500 | NBK7 | |
| | | ∞ | 0.541 | | |
| IM9 | | ∞ | — | — | |

| Aspherical surface data | | | | | |
|---|---|---|---|---|---|
| Aspherical surface 11 | Aspherical surface 12 | Aspherical surface 13 | Aspherical surface 14 | Aspherical surface 15 | Aspherical surface 16 |
| −40° C. | | | | | |
| k  −9.242E+00 | −8.314E−01 | −4.902E−01 | −3.026E+00 | −1.000E+01 | 6.923E+00 |
| A  5.110E−04 | −2.169E−03 | −7.933E−05 | 1.210E−04 | −4.950E−04 | −4.388E−03 |
| B  −7.052E−05 | −4.438E−05 | 4.082E−06 | 3.922E−06 | 7.011E−05 | 2.558E−04 |
| C  2.222E−06 | 6.090E−06 | −2.080E−07 | −1.934E−07 | −3.978E−06 | −1.124E−05 |
| D  −3.525E−08 | −2.352E−07 | 8.728E−09 | 1.537E−08 | 1.233E−07 | 3.248E−07 |
| E  2.947E−10 | 4.574E−09 | −6.091E−11 | −7.005E−10 | −1.988E−09 | −5.447E−09 |
| F  −1.036E−12 | −3.368E−11 | −2.003E−12 | 1.412E−11 | 1.088E−11 | 3.745E−11 |
| +25° C. | | | | | |
| k  −9.242E+00 | −8.314E−01 | −4.902E−01 | −3.026E+00 | −1.000E+01 | 6.923E+00 |
| A  5.104E−04 | −2.166E−03 | −7.923E−05 | 1.208E−04 | −4.944E−04 | −4.383E−03 |
| B  −7.038E−05 | −4.429E−05 | 4.074E−06 | 3.914E−06 | 6.997E−05 | 2.553E−04 |
| C  2.216E−06 | 6.072E−06 | −2.074E−07 | −1.928E−07 | −3.966E−06 | −1.121E−05 |

-continued

| | | | | | |
|---|---|---|---|---|---|
| D | −3.512E−08 | −2.344E−07 | 8.696E−09 | 1.532E−08 | 1.228E−07 | 3.236E−07 |
| E | 2.933E−10 | 4.554E−09 | −6.064E−11 | −6.974E−10 | −1.979E−09 | −5.423E−09 |
| F | −1.031E−12 | −3.350E−11 | −1.992E−12 | 1.404E−11 | 1.082E−11 | 3.725E−11 |

+85° C.

| | | | | | |
|---|---|---|---|---|---|
| k | −9.242E+00 | −8.314E−01 | −4.902E−01 | −3.026E+00 | −1.000E+01 | 6.923E+00 |
| A | 5.097E−04 | −2.163E−03 | −7.912E−05 | 1.206E−04 | −4.938E−04 | −4.377E−03 |
| B | −7.022E−05 | −4.419E−05 | 4.065E−06 | 3.905E−06 | 6.981E−05 | 2.547E−04 |
| C | 2.209E−06 | 6.053E−06 | −2.068E−07 | −1.922E−07 | −3.954E−06 | −1.117E−05 |
| D | −3.498E−08 | −2.334E−07 | 8.660E−09 | 1.525E−08 | 1.223E−07 | 3.223E−07 |
| E | 2.919E−10 | 4.531E−09 | −6.033E−11 | −6.939E−10 | −1.969E−09 | −5.396E−09 |
| F | −1.024E−12 | −3.330E−11 | −1.981E−12 | 1.396E−11 | 1.076E−11 | 3.703E−11 |

Numerical Example 10

| | r | d | Material |
|---|---|---|---|
| Surface data (−40° C.) | | | |
| Object surface | ∞ | — | |
| L101 | 16.653 | 4.805 | S-LAH58 |
| | 59.919 | 0.550 | |
| L102 | 61.725 | 0.800 | S-BSL7 |
| | 9.999 | 2.179 | |
| S1 | — | 1.688 | |
| L103 | −13.531 | 0.800 | S-TIL6 |
| L104 | 17.040 | 4.887 | S-LAM73 |
| | −14.443 | 0.823 | |
| L105 | −11.983 | 0.800 | S-NBH56 |
| L106 | 18.356 | 6.411 | S-LAH59 |
| | −21.048 | 0.197 | |
| L107 | 15.428 | 5.854 | S-FPM2 |
| | 124.906 | 0.989 | |
| L108 | 19.240 | 0.800 | S-LAH63 |
| L109 | 6.978 | 10.032 | S-LAH63Q |
| | 1231.366 | 1.690 | |
| L1010 | −14.169 | 0.800 | S-TIH57 |
| | −47.258 | 1.000 | |
| CG10 | ∞ | 1.076 | N-BK7 |
| | ∞ | 0.757 | |
| IM10 | — | | |
| Surface data (25° C.) | | | |
| Object surface | ∞ | — | |
| L101 | 16.660 | 4.807 | S-LAH58 |
| | 59.943 | 0.555 | |
| L102 | 61.752 | 0.800 | S-BSL7 |
| | 10.003 | 2.170 | |
| S1 | — | 1.700 | |
| L103 | −13.537 | 0.800 | S-TIL6 |
| L104 | 17.049 | 4.889 | S-LAM73 |
| | −14.452 | 0.830 | |
| L105 | −11.989 | 0.800 | S-NBH56 |
| L106 | 18.364 | 6.413 | S-LAH59 |
| | −21.056 | 0.200 | |
| L107 | 15.439 | 5.858 | S-FPM2 |
| | 124.994 | 1.000 | |
| L108 | 19.249 | 0.800 | S-LAH63 |
| L109 | 6.981 | 10.037 | S-LAH63Q |
| | 1222.507 | 1.690 | |
| L1010 | −14.175 | 0.800 | S-TIH57 |
| | −47.279 | 1.000 | |
| CG10 | ∞ | 1.080 | N-BK7 |
| | ∞ | 0.760 | |
| IM10 | — | | |
| Surface data (85° C.) | | | |
| Object surface | ∞ | — | |
| L101 | 16.667 | 4.809 | S-LAH58 |
| | 59.968 | 0.562 | |
| L102 | 61.781 | 0.800 | S-BSL7 |
| | 10.008 | 2.175 | |
| S1 | — | 1.705 | |
| L103 | −13.544 | 0.800 | S-TIL6 |
| L104 | 17.058 | 4.892 | S-LAM73 |
| | −14.460 | 0.842 | |
| L105 | −11.995 | 0.800 | S-NBH56 |
| L106 | 18.372 | 6.416 | S-LAH59 |
| | −21.063 | 0.202 | |
| L107 | 15.451 | 5.863 | S-FPM2 |
| | 125.089 | 1.011 | |
| L108 | 19.259 | 0.800 | S-LAH63 |
| L109 | 6.984 | 10.042 | S-LAH63Q |
| | 1213.642 | 1.698 | |
| L1010 | −14.182 | 0.800 | S-TIH57 |
| | −47.302 | 1.000 | |
| CG10 | ∞ | 1.081 | N-BK7 |
| | ∞ | 0.763 | |
| IM10 | — | | |

Numerical Example 11

| | r | d | Material |
|---|---|---|---|
| Surface data (−40° C.) | | | |
| Object surface | ∞ | — | |
| L111 | 16.473 | 4.448 | S-LAH58 |
| | 73.272 | 0.569 | |
| L112 | 146.134 | 0.799 | S-BSL7 |
| | 9.595 | 2.175 | |
| S3 | — | 1.700 | |
| L113 | −14.596 | 0.799 | S-TIL6 |
| L114 | 16.191 | 4.881 | S-LAM73 |
| | −16.979 | 0.978 | |
| L115 | −13.191 | 0.799 | S-NBH56 |
| L116 | 21.941 | 5.658 | S-LAH59 |
| | −20.534 | 0.200 | |
| L117 | 16.463 | 5.716 | S-FPM2 |
| | 165.699 | 1.899 | |
| L118 | 20.738 | 0.800 | S-TIH13 |
| | 11.009 | 0.500 | |
| L119 | 11.378 | 11.062 | S-LAH60MQ |
| | −1052.316 | 1.655 | |
| L1110 | −16.608 | 0.800 | S-TIH57 |
| | −56.579 | 1.000 | |
| CG11 | ∞ | 1.076 | N-BK7 |
| | ∞ | 0.757 | |
| IM11 | — | | |
| Surface data (25° C.) | | | |
| Object surface | ∞ | — | |
| L111 | 16.480 | 4.450 | S-LAH58 |
| | 73.301 | 0.569 | |
| L112 | 146.197 | 0.800 | S-BSL7 |
| | 9.599 | 2.175 | |

-continued

|      | r         | d     | Material   |
|------|-----------|-------|------------|
| S3   | —         | 1.700 |            |
| L113 | −14.603   | 0.800 | S-TIL6     |
| L114 | 16.199    | 4.884 | S-LAM73    |
|      | −16.988   | 0.978 |            |
| L115 | −13.198   | 0.800 | S-NBH56    |
| L116 | 21.950    | 5.660 | S-LAH59    |
|      | −20.541   | 0.200 |            |
| L117 | 16.475    | 5.720 | S-FPM2     |
|      | 165.816   | 1.899 |            |
| L118 | 20.749    | 0.801 | S-TIH13    |
|      | 11.014    | 0.500 |            |
| L119 | 11.384    | 11.068| S-LAH60MQ  |
|      | −1052.857 | 1.655 |            |
| L1110| −16.615   | 0.800 | S-TIH57    |
|      | −56.604   | 1.000 |            |
| CG11 | ∞         | 1.080 | N-BK7      |
|      | ∞         | 0.760 |            |
| IM11 | —         |       |            |

Surface data (85° C.)

| Object surface | — | ∞ | |
| L111 | 16.487 | 4.451 | S-LAH58 |
|      | 73.333 | 0.575 | |
| L112 | 146.266 | 0.800 | S-BSL7 |
|      | 9.604 | 2.172 | |
| S3   | — | 1.710 | |
| L113 | −14.610 | 0.800 | S-TIL6 |
| L114 | 16.208 | 4.886 | S-LAM73 |
|      | −16.998 | 0.986 | |
| L115 | −13.204 | 0.800 | S-NBH56 |
| L116 | 21.960 | 5.662 | S-LAH59 |
|      | −20.548 | 0.202 | |
| L117 | 16.488 | 5.724 | S-FPM2 |
|      | 165.942 | 1.904 | |
| L118 | 20.760 | 0.801 | S-TIH13 |
|      | 11.020 | 0.507 | |
| L119 | 11.390 | 11.074 | S-LAH60MQ |
|      | −1053.437 | 1.659 | |
| L1110 | −16.623 | 0.800 | S-TIH57 |
|      | −56.632 | 1.000 | |
| CG11 | ∞ | 1.081 | N-BK7 |
|      | ∞ | 0.763 | |
| IM11 | — | | |

An optical system according to each numerical example is a fixed focal length optical system having an unchanged focal length (not performing zooming), and employs a configuration of not performing focusing. In other words, intervals between lenses consisting of an optical system according to each numerical example are always fixed. It is therefore possible to avoid a variation in optical performance that is caused in accordance with the movement of each lens. Nevertheless, an optical system may be enabled to perform at least either of zooming and focusing as necessary, and an interval between lenses may be made changeable for the zooming or focusing.

An optical system according to each numerical example is assumed to be used in a visible range (486.1 nm to 656.27 nm), and is configured to perform good aberration correction in the entire visible range, but a wavelength range in which aberration correction is to be performed may be changed as necessary. For example, each optical system may be configured to perform aberration correction only in a specific wavelength range in the visible range, or may be configured to perform aberration correction in an infrared wavelength range other than the visible range.

The following table lists values in inequalities for optical systems according to Examples and Reference Examples described above.

TABLE 1

|  |  | Example 1 | Example 2 | Example 3 | Example 4 | Example 5 | Example 6 |
|---|---|---|---|---|---|---|---|
| NA |  | 1.83 | 1.79 | 1.60 | 1.70 | 1.85 | 1.57 |
| NB |  | 1.83 | 1.83 | 1.62 | 1.70 | 1.81 | 1.70 |
| νA |  | 37.21 | 28.43 | 67.74 | 51.11 | 24.80 | 52.95 |
| νB |  | 39.58 | 37.17 | 63.32 | 41.24 | 22.76 | 41.24 |
| dnA/dt | [10E−06/° C.] | 9.20 | 4.80 | −6.10 | −1.20 | 4.40 | −0.50 |
| dnB/dt | [10E−06/° C.] | −0.10 | −0.10 | −0.70 | 4.50 | −0.10 | 4.50 |
| αA | [10E−06/° C.] | 5.80 | 7.40 | 11.70 | 9.00 | 7.70 | 9.50 |
| αB | [10E−06/° C.] | 8.50 | 8.50 | 8.80 | 6.40 | 8.30 | 6.40 |
| βA | [10E−06/° C.] | −5.23 | 1.31 | 21.95 | 10.72 | 2.55 | 10.38 |
| βB | [10E−06/° C.] | 8.62 | 8.62 | 9.93 | −0.01 | 8.42 | −0.01 |
| R | [mm] | 19.70 | 10.19 | −88.76 | 8.38 | 2653.27 | −6858.71 |
| Dk | [mm] | 4.00 | 7.74 | 4.04 | 4.05 | 3.86 | 4.01 |
| (1) DAB | [mm] | 0.00 | 0.00 | 0.00 | 0.00 | 0.00 | 0.00 |
| (2) RA/RB |  | 1.00 | 1.00 | 1.00 | 1.00 | 1.00 | 1.00 |
| (3) |NA − NB| |  | 0.00 | 4.52E−02 | 2.28E−02 | 2.24E−03 | 4.67E−02 | 0.13 |
| (4) |νA − νB| |  | 2.37 | 8.74 | 4.42 | 9.87 | 2.04 | 11.71 |
| (5) |dnA/dt − dnB/dt| | [10E−06/° C.] | 9.30 | 4.90 | 5.40 | 5.70 | 4.50 | 5.00 |
| (6) |βA − βB| | [10E−06/° C.] | 13.85 | 7.31 | 12.02 | 10.73 | 5.87 | 10.39 |
| (7) |Dk/R| |  | 0.20 | 0.76 | 0.05 | 0.48 | 1.45E−03 | 5.85E−04 |

|  |  | Example 7 | Example 8 | Example 9 | Reference Example 1 | Reference Example 2 |
|---|---|---|---|---|---|---|
| NA |  | 1.72 | 1.78 | 1.83 | 1.80 | 1.74 |
| NB |  | 1.59 | 1.70 | 1.83 | 1.80 | 1.83 |
| νA |  | 47.92 | 23.91 | 37.21 | 39.59 | 27.79 |
| νB |  | 61.15 | 30.13 | 39.58 | 39.58 | 37.17 |
| dnA/dt | [10E−06/° C.] | −0.10 | −4.10 | 9.20 | 7.20 | 2.50 |
| dnB/dt | [10E−06/° C.] | 4.70 | 3.70 | −0.10 | 1.50 | −0.10 |
| αA | [10E−06/° C.] | 8.00 | 10.90 | 5.80 | 5.80 | 8.30 |
| αB | [10E−06/° C.] | 6.60 | 7.50 | 8.50 | 7.90 | 8.50 |
| βA | [10E−06/° C.] | 8.14 | 16.17 | −5.23 | −3.15 | 4.93 |

TABLE 1-continued

| | | | | | | |
|---|---|---|---|---|---|---|
| βB | [10E−06/° C.] | −1.38 | 2.21 | 8.62 | 6.04 | 8.62 |
| R | [mm] | 1.00E+18 | 24.36 | 8.69 | 6.98 | — |
| Dk | [mm] | 4.01 | 4.05 | 3.88 | 6.94 | — |
| (1) DAB | [mm] | 0.00 | 0.00 | 0.00 | 0.00 | 0.50 |
| (2) RA/RB | | 1.00 | 1.00 | 1.00 | 1.00 | 0.97 |
| (3) \|NA − NB\| | | 0.13 | 0.08 | 0.00 | 2.00E−06 | 9.32E−02 |
| (4) \|vA − vB\| | | 13.23 | 6.22 | 2.37 | 0.01 | 9.38 |
| (5) \|dnA/dt − dnB/dt\| | [10E−06/° C.] | 4.80 | 7.80 | 9.30 | 5.70 | 2.60 |
| (6) \|βA − βB\| | [10E−06/° C.] | 9.52 | 13.96 | 13.85 | 9.19 | 3.69 |
| (7) \|Dk/R\| | | 4.01E−18 | 0.17 | 0.45 | 0.99 | — |

[Imaging Apparatus]

Figure 23:
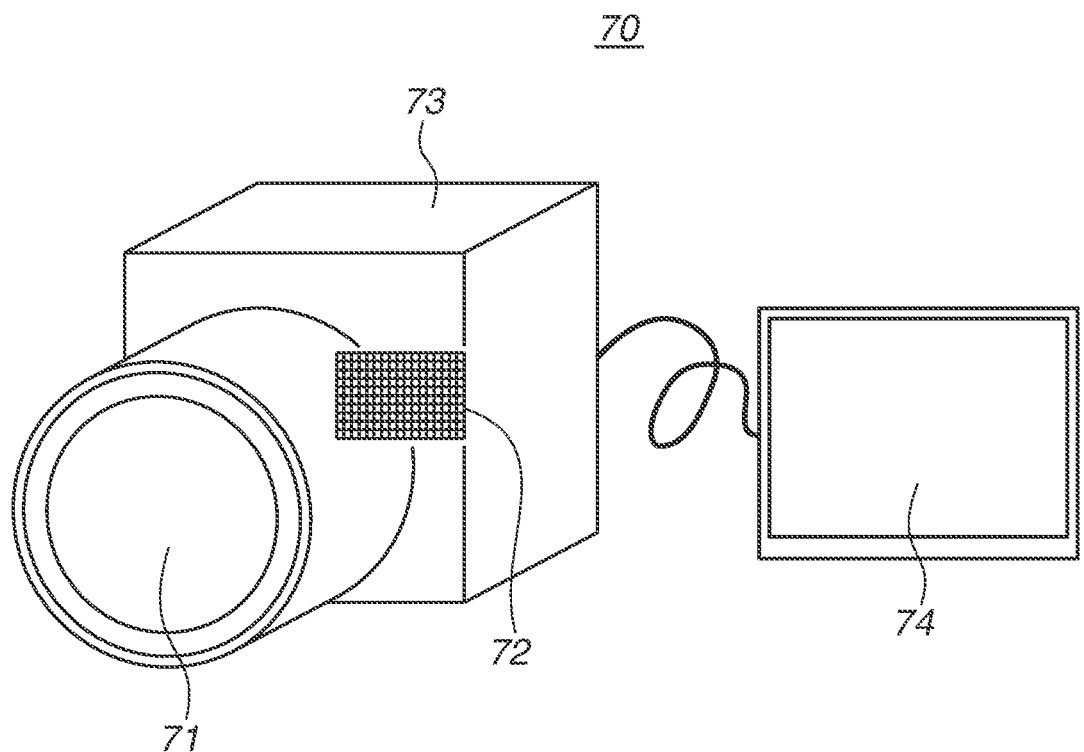
FIG. 23 is a schematic diagram of an imaging apparatus according to an exemplary embodiment.

FIG. 23 is a schematic diagram of a main portion in an imaging apparatus 70 according to an exemplary embodiment of the present invention. The imaging apparatus 70 according to the present exemplary embodiment includes an optical system (imaging optical system) 71 according to any of the above-described examples, a light receiving element 72 that photoelectrically converts an image of an object formed by the optical system 71, and a camera main body (casing) 73 that holds the light receiving element 72. The optical system 71 is held by a lens barrel (holding member), and connected to the camera main body 73. As illustrated in FIG. 23, a display unit 74 that displays an image acquired by the light receiving element 72 may be connected to the camera main body 73. An image sensor (photoelectric conversion element), such as a charge-coupled device (CCD) sensor and a complementary metal-oxide semiconductor (CMOS) sensor, can be used as the light receiving element 72.

In a case where the imaging apparatus 70 is used as a distance measuring apparatus, an image sensor (imaging plane phase difference sensor) including pixels configured to divide light rays from an object into two and perform photoelectric conversion, for example, can be employed as the light receiving element 72. When a subject is present on a front side focal plane of the optical system 71, a positional shift between images corresponding to the divided two light rays does not occur on an image plane of the optical system 71. Nevertheless, when a subject is present at a position other than the front side focal plane of the optical system 71, a positional shift between images occurs. At this time, because the positional shift between images corresponds to an amount of displacement from the front side focal plane of the subject. Thus, an amount of positional shift between images and a direction of the positional shift are obtained using an imaging plane phase difference sensor, thus measuring a distance to the subject.

The optical system 71 and the camera main body 73 may be detachably attached to each other. In other words, the optical system 71 and the lens barrel may be formed as an interchangeable lens (lens apparatus). An optical system according to each of the examples described above is applicable to various optical apparatuses, such as a telescope, binoculars, a projector (projection apparatus), and a digital copying machine in addition to an imaging apparatus, such as a digital still camera, a silver-halide film camera, a video camera, an in-vehicle camera, and a monitoring camera.

[In-Vehicle System]

Figure 24:
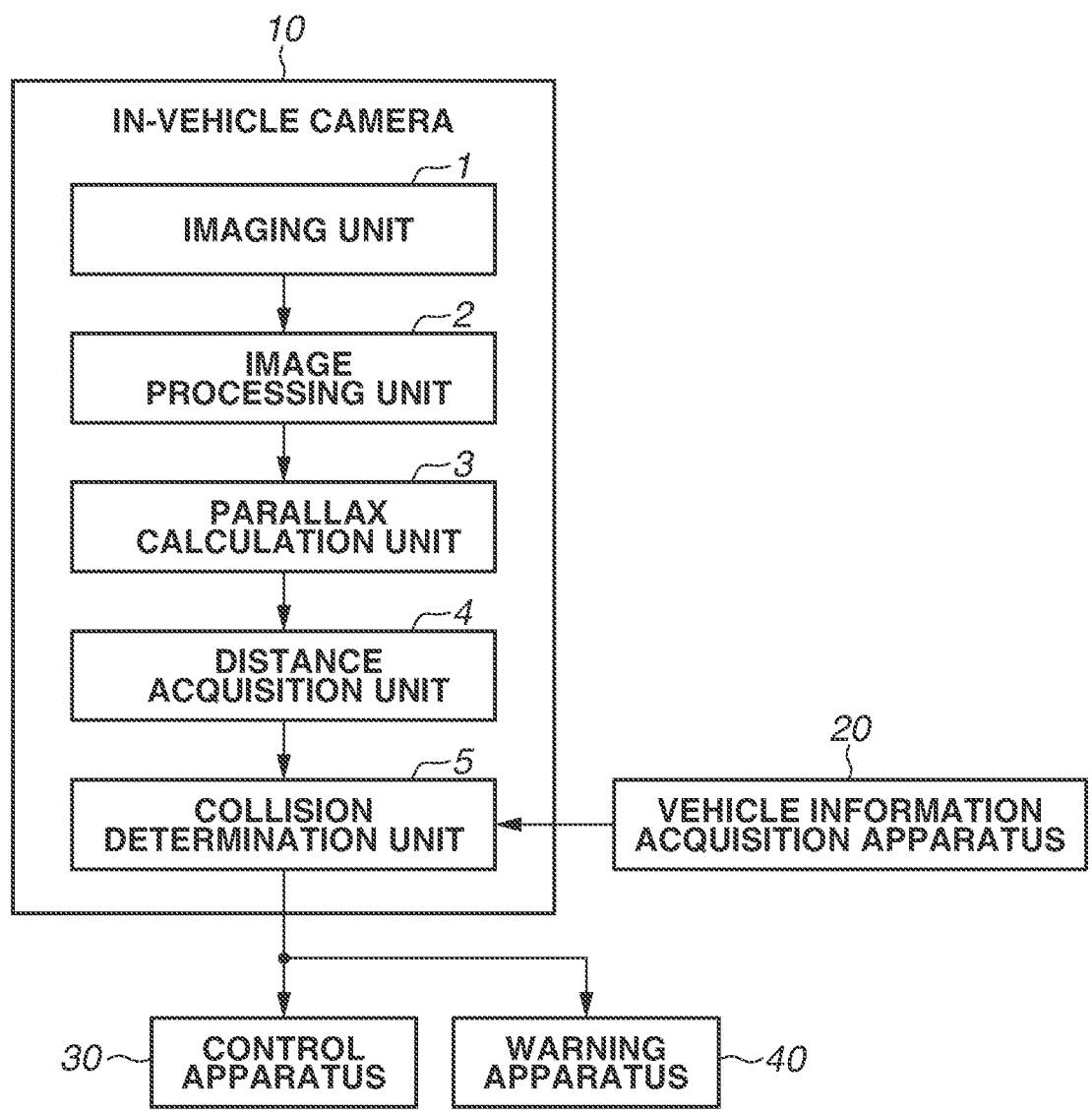
FIG. 24 is a functional block diagram of an in-vehicle system according to an exemplary embodiment.
Figure 25:
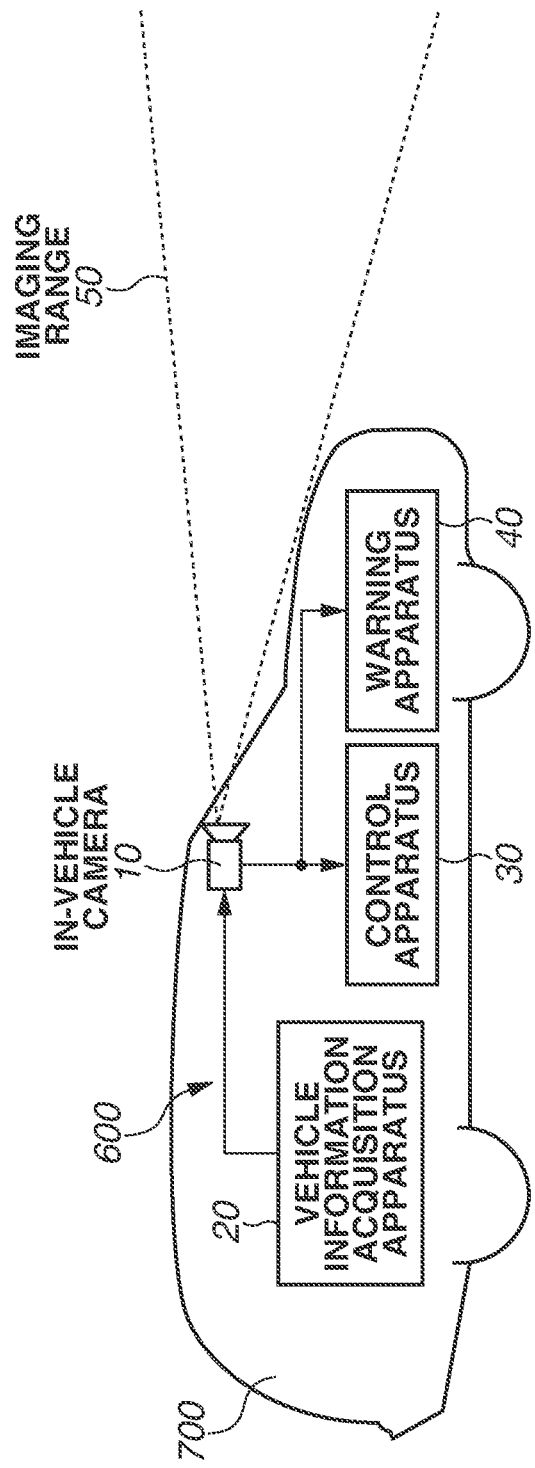
FIG. 25 is a schematic diagram of a vehicle according to an exemplary embodiment.

FIG. 24 is a configuration diagram of an in-vehicle camera 10 according to the present exemplary embodiment, and an in-vehicle system (drive assist apparatus) 600 including the in-vehicle camera 10. The in-vehicle system 600 is held by a movable member (movable apparatus), such as an automobile (vehicle), and assists the driving (handling) of a vehicle based on vehicle surrounding image information acquired by the in-vehicle camera 10. FIG. 25 is a schematic diagram of a vehicle (movable apparatus) 700 serving as a movable apparatus and including the in-vehicle system 600. FIG. 25 illustrates a case where an imaging range 50 of the in-vehicle camera 10 is set on a front part of the vehicle 700, but the imaging range 50 may be set on a rear part or a lateral part of the vehicle 700.

As illustrated in FIG. 24, the in-vehicle system 600 includes the in-vehicle camera 10, a vehicle information acquisition apparatus 20, a control apparatus (control unit, electronic control unit (ECU)) 30, and a warning apparatus (warning unit) 40. The in-vehicle camera 10 includes an imaging unit 1, an image processing unit 2, a parallax calculation unit 3, a distance acquisition unit (acquisition unit) 4, and a collision determination unit 5. The image processing unit 2, the parallax calculation unit 3, the distance acquisition unit 4, and the collision determination unit 5 constitute a processing unit. The imaging unit 1 includes an optical system according to any of the examples described above, and an imaging plane phase difference sensor.

Figure 26:
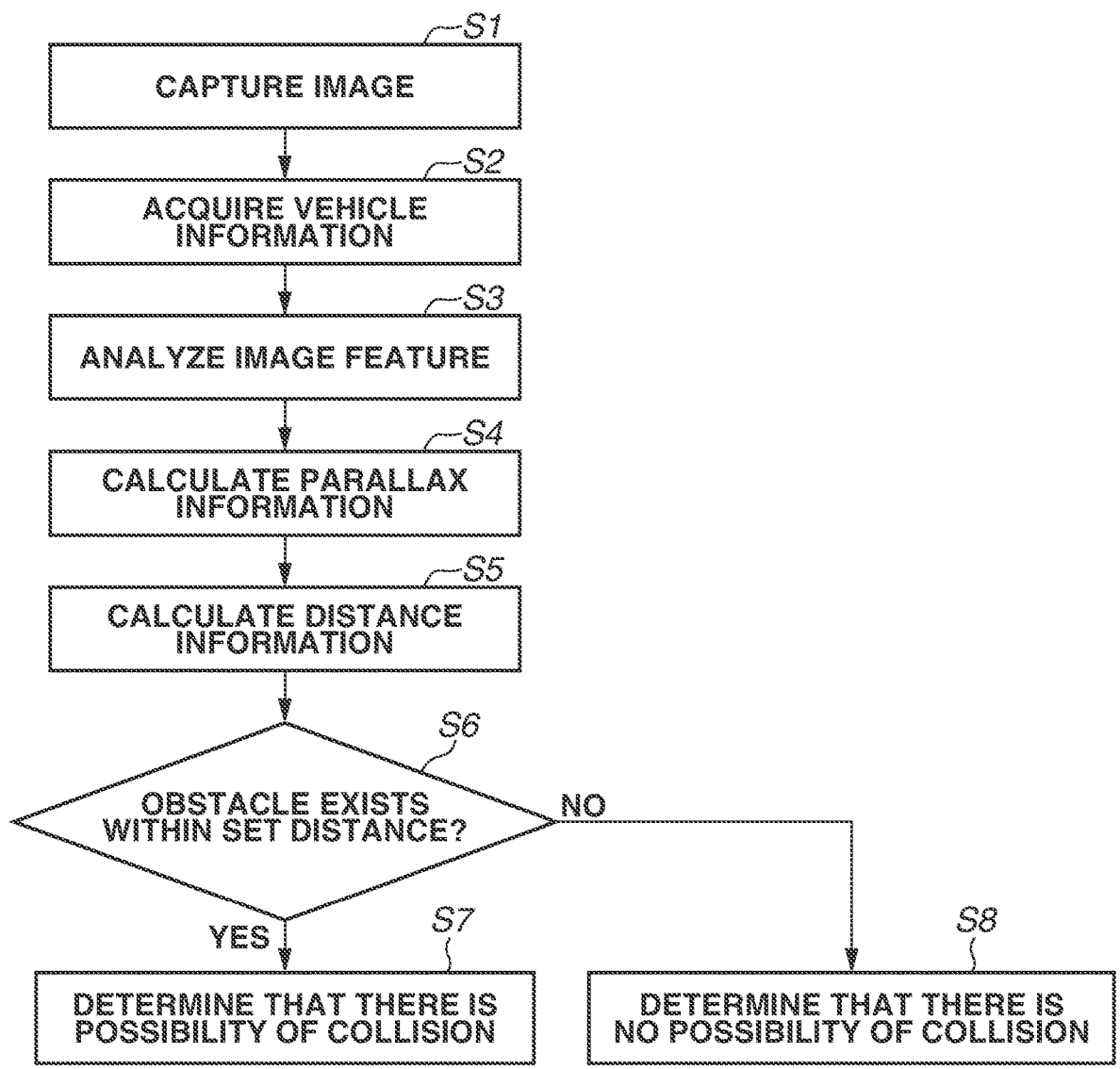
FIG. 26 is a flowchart illustrating an operation example of an in-vehicle system according to an exemplary embodiment.

FIG. 26 is a flowchart illustrating an operation example of the in-vehicle system 600 according to the present exemplary embodiment. Hereinafter, an operation of the in-vehicle system 600 will be described with reference to the flowchart.

Initially, in step S1, a plurality of pieces of image data (parallax image data) is acquired by capturing images of a target object (subject), such as an obstacle or a pedestrian around a vehicle, using the imaging unit 1.

In step S2, vehicle information is acquired by the vehicle information acquisition apparatus 20. The vehicle information is information including a vehicle speed, a yaw rate, and a steering angle of a vehicle.

In step S3, the image processing unit 2 performs image processing on the plurality of pieces of image data acquired by the imaging unit 1. More specifically, the image processing unit 2 performs image feature analysis of analyzing a feature amount, such as an amount and directions of edges in image data, and a concentration value. The image feature analysis may be performed on each of the plurality of pieces of image data, or may be performed only on part of the plurality of pieces of image data.

In step S4, the parallax calculation unit 3 calculates parallax (image shift) information between the plurality of pieces of image data acquired by the imaging unit 1. A known method, such as a sequential similarity detection algorithm (SSDA) and an area correlation method, is usable as a calculation method of parallax information, and thus, a description of the calculation method is omitted in the present exemplary embodiment. The operations in steps S2, S3, and S4 may be performed in the above-described order, or may be concurrently performed.

In step S5, the distance acquisition unit 4 acquires (calculates) information regarding an interval from the target object in the images captured by the imaging unit 1. Distance information can be calculated based on the parallax information resulting from the calculation of the parallax calculation unit 3, and an internal parameter and an external parameter of the imaging unit 1. The distance information refers to information regarding a relative position of the target object, such as an interval from the target object, a defocus amount, and an image shift amount. The distance information may directly indicate a distance value of the target object in an image, or may indirectly indicate information corresponding to a distance value.

In step S6, using the vehicle information acquired by the vehicle information acquisition apparatus 20, and distance information resulting from the calculation of the distance acquisition unit 4, the collision determination unit 5 determines whether a distance to the target object falls within a preset range of set distance. This configuration determines whether the target object is present within the set distance around the vehicle, thus determining the possibility of collision between the vehicle and the target object. If the target object is present within the set distance (YES in step S6), the processing proceeds to step S7. In step S7, the collision determination unit 5 determines that "there is a possibility of collision". If the target object is not present within the set distance (NO in step S6), the processing proceeds to step S8. In step S8, the collision determination unit 5 determines that "there is no possibility of collision".

If the collision determination unit 5 determines that "there is a possibility of collision", the collision determination unit 5 notifies the control apparatus 30 and/or the warning apparatus 40 of the determination result (transmits the determination result to the control apparatus 30 and/or the warning apparatus 40). At this time, the control apparatus 30 controls the vehicle based on the determination result obtained by the collision determination unit 5. The warning apparatus 40 issues a warning to a user (driver, occupant, user) of the vehicle based on the determination result obtained by the collision determination unit 5. The notification of the determination result is only required to be performed to at least either one of the control apparatus 30 and the warning apparatus 40.

The control apparatus 30 controls the movement of the vehicle by outputting a control signal to a drive unit (engine, motor, etc.) of the vehicle. For example, the control apparatus 30 performs control of the vehicle, such as applying the brakes, releasing a gas pedal, turning a steering wheel, or controlling engine and/or motor output by generating a control signal for causing wheels to generate braking force. The warning apparatus 40 issues a warning to a user by providing a warning sound (alarm call), displaying warning information on a screen of a car navigation system, and/or vibrating a seatbelt or a steering wheel, for example.

As described above, the in-vehicle system 600 according to the present exemplary embodiment enables an efficient detection of a target object through the above-described processing, thus avoiding collision between a vehicle and a target object. In particular, application of an optical system according to any of the above-described examples to the in-vehicle system 600 makes it possible to perform target object detection and collision determination over a wide field angle while downsizing the entire in-vehicle camera 10 and enhancing a degree of flexibility in arrangement.

In the present exemplary embodiment, a configuration in which the in-vehicle camera 10 includes only one imaging unit 1 including an imaging plane phase difference sensor is used, but the configuration is not limited to this, and a stereo camera including two imaging units may be employed as the in-vehicle camera 10. In this case, it is possible to perform processing similar to the above-described processing without using an imaging plane phase difference sensor by simultaneously acquiring image data pieces by synchronized two imaging units and using the two image data pieces. If a difference between image capturing times of the two imaging units is known, the two imaging units need not be synchronized.

Various exemplary embodiments can be considered as for the calculation of distance information. As an example, a case where an image sensor of pupil division type, including a plurality of pixel portions regularly arrayed in a two-dimensional array is employed as an image sensor included in the imaging unit 1 will be described. In the image sensor of pupil division type, one pixel portion includes a microlens and a plurality of photoelectric conversion units, and receives a pair of light rays passing through different regions of a pupil of an optical system, and outputs a pair of image data pieces from each photoelectric conversion unit.

An image shift amount of each region is calculated through calculation of correlation between the pair of image data pieces, and image shift map data indicating a distribution of image shift amounts is calculated by the distance acquisition unit 4. Alternatively, the distance acquisition unit 4 may further convert the image shift amount into a defocus amount, and generate defocus map data indicating a distribution of defocus amounts (distribution on a two-dimensional surface of a captured image). The distance acquisition unit 4 may acquire distance map data indicating intervals from the target object that are converted from defocus amounts.

The in-vehicle system 600 and the movable apparatus 700 may include a notification apparatus (notification unit) for notifying a manufacturer (maker) of the in-vehicle system 600 and/or a distribution source (dealer) of the movable apparatus 700 of collision in a case where the movable apparatus 700 collides with an obstacle by any possibility. For example, a notification apparatus that transmits information (collision information) regarding collision between the movable apparatus 700 and an obstacle to a preset external notification destination by e-mail or the like can be employed as the notification apparatus.

In this manner, by employing a configuration of automatically notifying an external notification destination of collision information using the notification apparatus, it is possible to promptly take measures, such as inspection and repair, after collision has occurred. A notification destination of collision information may be an insurance company, a medical agency, police, or any notification destination set by a user. Information is not limited to collision information, and the notification apparatus may be configured to notify a notification destination of malfunction information of each component or consumption information of consumables. The detection of collision may be performed using distance information acquired based on output from the imaging unit 1, or may be performed by another detection unit (sensor).

In the present exemplary embodiment, the in-vehicle system 600 is applied to drive assist (collision damage reduction), but the application is not limited to this, and the in-vehicle system 600 may be applied to cruise control (with all vehicle speed tracking function) or automated driving. The application of the in-vehicle system 600 is not limited to a vehicle, such as an automobile. The in-vehicle system 600 is applicable to a movable member, such as a vessel, an airplane, or an industrial robot, for example. The application of the in-vehicle system 600 is not limited to a movable member, and the in-vehicle system 600 is applicable to various devices that use object recognition, such as an intelligent transport system (ITS).

MODIFIED EXAMPLE

An exemplary embodiment and Examples of the present invention have been described above, but the present invention is not limited to the exemplary embodiment and Examples. Various combinations, modifications, and changes can be made within the scope of the gist thereof.

For example, in the above-described exemplary embodiment, the description has been provided of a case where a second control unit has a function as a collision determination unit (determination unit), but the configuration is not limited to this. For example, in an in-vehicle system, a collision determination unit different from the second control unit may be provided. In other words, the second control unit is only required to have at least a function as a distance calculation unit (distance information acquisition unit). As necessary, a first control unit and a second control unit may be provided on the outside of a distance measuring apparatus (e.g., the inside of a vehicle).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-042501, filed Mar. 17, 2022, and No. 2023-003119, filed Jan. 12, 2023, which are hereby incorporated by reference herein in their entirety.

What is claimed is:

1. An optical system, comprising:
a negative lens and a positive lens adjacent to each other, wherein the following inequalities are satisfied:

$$0.00 \leq DAB \leq 1.00, \text{ and}$$

$$0.80 \leq RA/RB \leq 1.20,$$

where $DAB$[mm] denotes a distance on an optical axis between the negative lens and the positive lens, and $RA$ and $RB$ denote curvature radii of facing lens surfaces of the negative lens and the positive lens, respectively, and
wherein the following inequalities are satisfied:

$$0.00 \leq |NA-NB| \leq 0.20,$$

$$0.00 \leq |vA-vB| \leq 20.00, \text{ and}$$

$$4.2 \leq |dnA/dt - dnB/dt|,$$

where $NA$ and $NB$ denote refractive indices of the negative lens and the positive lens, respectively, with respect to a d-line, $vA$ and $vB$ denote Abbe numbers of the negative lens and the positive lens, respectively, with respect to the d-line, and $dnA/dt$ [$10^{-6}$/° C.] and $dnB/dt$ [$10^{-6}$/° C.] denote temperature coefficients of refractive indices of the negative lens and the positive lens, respectively, with respect to the d-line at 20° C. to 40° C., and either $dnA/dt$ or $dnB/dt$ has a negative sign.

2. The optical system according to claim 1, wherein the following inequality is satisfied:

$$2.9 < |\beta A - \beta B| < 20.9,$$

where $\alpha A$ [$10^{-6}$/° C.] and $\alpha B$ [$10^{-6}$/° C.] denote linear expansion coefficients of the negative lens and the positive lens, respectively, $\beta A = \alpha A - dnA/dt/(NA-1)$, and $\beta B = \alpha B - dnB/dt/(NB-1)$.

3. The optical system according to claim 1, wherein a largest value of either one of $\beta A$ and $\beta B$ is greater than or equal to 8.0, where $\alpha A$ [$10^{-6}$/° C.] and $\alpha B$ [$10^{-6}$/° C.] denote linear expansion coefficients of the negative lens and the positive lens, respectively, $\beta A = \alpha A - dnA/dt/(NA-1)$, and $\beta B = \alpha B - dnB/dt/(NB-1)$.

4. The optical system according to claim 1, wherein the negative lens and the positive lens are cemented to each other.

5. The optical system according to claim 4, wherein the following inequality is satisfied:

$$0.10 \times 10^{-3} < |Dk/R| < 1.00,$$

where $R$ denotes a curvature radius of a cemented surface of the negative lens and the positive lens, and $Dk$ denotes an effective diameter.

6. The optical system according to claim 1, wherein the facing lens surfaces of the negative lens and the positive lens each have a convex shape protruding toward an object side.

7. The optical system according to claim 1, further comprising a first cemented lens and a second cemented lens consecutively arranged in order from an object side to an image side.

8. The optical system according to claim 7, wherein the first cemented lens and the second cemented lens each include a negative lens having a concave surface on an object side, and a positive lens cemented to the negative lens, which are arranged in order from the object side to an image side.

9. The optical system according to claim 7, wherein a cemented surface of the first cemented lens and the second cemented lens each has a convex shape protruding toward the object side.

10. The optical system according to claim 1, further comprising an aperture stop arranged closest to an object.

11. An imaging apparatus comprising:
the optical system according to claim 1; and
an image sensor configured to capture an image of an object via the optical system.

12. An in-vehicle system comprising:
the imaging apparatus according to claim 11; and
a determination unit configured to determine a possibility of collision between a vehicle and the object based on distance information for the object that has been acquired by the imaging apparatus.

13. The in-vehicle system according to claim 12, further comprising a control apparatus configured to output a control signal for causing a drive unit of the vehicle to generate braking force, in a case where it is determined that there is a possibility of collision between the vehicle and the object.

14. The in-vehicle system according to claim 12, further comprising a warning apparatus configured to issue a warning to a user of the vehicle in a case where it is determined that there is a possibility of collision between the vehicle and the object.

15. The in-vehicle system according to claim 12, further comprising a notification apparatus configured to transmit information regarding collision between the vehicle and the object to an external destination.

16. A movable apparatus, comprising the imaging apparatus according to claim 11, wherein the movable apparatus is movable while holding the imaging apparatus.

17. The movable apparatus according to claim 16, further comprising a determination unit configured to determine a possibility of collision with the object based on distance information for the object that has been acquired by the imaging apparatus.

18. The movable apparatus according to claim 17, further comprising a control unit configured to output a control signal for controlling a movement in a case where it is determined that there is a possibility of collision with the object.

19. The movable apparatus according to claim 17, further comprising a warning unit configured to issue a warning to a user of the movable apparatus in a case where it is determined that there is a possibility of collision with the object.

20. The movable apparatus according to claim 16, further comprising a notification unit configured to transmit information regarding collision with the object to an external destination.

* * * * *